(12) United States Patent
Hidaka et al.

(10) Patent No.: US 7,640,948 B2
(45) Date of Patent: Jan. 5, 2010

(54) INTEGRATED PIPING PLATE, MACHINING METHOD FOR SAME, MACHINING APPARATUS FOR SAME, AND MACHINING EQUIPMENT FOR SAME

(75) Inventors: Haretaro Hidaka, Mihara (JP); Michio Tsukamoto, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/892,869

(22) Filed: Aug. 28, 2007

(65) Prior Publication Data

US 2008/0011374 A1 Jan. 17, 2008

Related U.S. Application Data

(62) Division of application No. 10/883,760, filed on Jul. 6, 2004, now abandoned, which is a division of application No. 10/058,223, filed on Jan. 29, 2002, now Pat. No. 7,017,792.

(30) Foreign Application Priority Data

| Feb. 2, 2001 | (JP) | ............................. 2001-026881 |
| Jun. 12, 2001 | (JP) | ............................. 2001-176898 |
| Jul. 6, 2001 | (JP) | ............................. 2001-205831 |
| Sep. 4, 2001 | (JP) | ............................. 2001-267095 |

(51) Int. Cl.
*F16K 11/20* (2006.01)

(52) U.S. Cl. .................................. 137/884; 285/334.5

(58) Field of Classification Search ................. 137/884; 285/248, 249, 334.5
See application file for complete search history.

(56) References Cited

U.S. PATENT DOCUMENTS 1,582,714 A 4/1926 Wells (Continued)

FOREIGN PATENT DOCUMENTS

DE 299 18 765 12/1999

(Continued)

OTHER PUBLICATIONS

Patent Abstracts of Japan, vol. 006, No. 055, Apr. 10, 1982 & JP 56 167276 (Sanyo Electric Co. Ltd.), Dec. 22, 1981.

(Continued)

*Primary Examiner*—John Fox
(74) *Attorney, Agent, or Firm*—Kratz, Quintos & Hanson, LLP

(57) ABSTRACT

A machining method for an integrated piping plate, for example, composed of a plurality of plates joined together, and in which an instrument and a component constituting an apparatus, or the instrument, or the component are or is disposed on one surface or both surfaces of the integrated piping plate, and the instrument and the component, or the instrument, or the component are or is connected by fluid channel grooves formed in joining surfaces of the plates, and communication holes formed in the plates. The machining method welds the joining surfaces of the plates around the entire periphery of the fluid channel grooves, for example, by an FSW welding machine, to join the plates. Compared with joining of the plates by an adhesive, the machining method can increase the durability of the plate joining portion and increase pressure resistance. Also, the method can increase work efficiency and further downsize the integrated piping plate.

1 Claim, 51 Drawing Sheets

U.S. PATENT DOCUMENTS

| | | | |
|---|---|---|---|
| 2,244,475 A | 6/1941 | Raskin | 62/126 |
| 2,871,886 A | 2/1959 | Obrebski et al. | |
| 3,631,881 A | 1/1972 | Bowditch | 137/271 |
| 3,646,963 A | 3/1972 | Klee | 137/608 |
| 4,110,140 A | 8/1978 | Laakaniemi et al. | 156/87 |
| 4,458,841 A | 7/1984 | Laakaniemi et al. | 236/49 |
| 4,613,839 A | 9/1986 | Foglesonger et al. | 333/239 |
| 4,648,546 A | 3/1987 | Gellert | 228/161 |
| 4,849,308 A | 7/1989 | Schmitten et al. | 429/37 |
| 4,950,563 A | 8/1990 | Stewart, Jr. et al. | 429/34 |
| 5,492,766 A | 2/1996 | Howard et al. | 428/469 |
| 5,640,995 A | 6/1997 | Packard et al. | 137/597 |
| 5,803,124 A | 9/1998 | Newton et al. | 137/884 |
| 5,899,077 A | 5/1999 | Wright et al. | 62/3.7 |
| 5,938,976 A | 8/1999 | Heimann et al. | 252/389.62 |
| 6,159,629 A | 12/2000 | Gibb et al. | 429/39 |
| 6,645,132 B2 | 11/2003 | Yoshinaga | 483/55 |
| 6,708,865 B2 | 3/2004 | Yoshinaga | 228/112.1 |
| 6,708,870 B2 | 3/2004 | Koenigsmann et al. | 228/210 |
| 6,719,184 B2 | 4/2004 | Ishida et al. | 228/112.1 |
| 6,752,552 B1 | 6/2004 | Sabato | 400/490 |
| 2002/0027153 A1 | 3/2002 | Sayama et al. | 228/112.1 |
| 2002/0050508 A1 | 5/2002 | Yoshinaga | 228/112.1 |
| 2002/0108740 A1 | 8/2002 | Hidaka et al. | 165/135 |
| 2002/0119079 A1 | 8/2002 | Breuer et al. | 422/128 |
| 2002/0153130 A1 | 10/2002 | Okamoto et al. | 165/170 |
| 2002/0193217 A1 | 12/2002 | Yoshinaga | 483/36 |
| 2003/0057258 A1 | 3/2003 | Ishida et al. | 228/104 |
| 2003/0071107 A1 | 4/2003 | Colligan | 228/114 |
| 2003/0102355 A1 | 6/2003 | Shepherd | 228/119 |
| 2003/0210527 A1 | 11/2003 | Saita et al. | 361/700 |

FOREIGN PATENT DOCUMENTS

| | | |
|---|---|---|
| EP | 0 928 659 | 7/1999 |
| EP | 1 148 565 | 10/2001 |
| FR | 2 766 878 | 2/1999 |
| GB | 885 101 | 12/1961 |
| GB | 1 351 004 | 4/1974 |
| GB | 2 017 224 | 10/1979 |
| JP | 48-029038 | 9/1973 |
| JP | 49-13651 | 4/1974 |
| JP | 49 13651 | 4/1974 |
| JP | 51-012635 | 4/1976 |
| JP | 56 36372 | 4/1981 |
| JP | 56-167276 | 12/1981 |
| JP | 57 56193 | 4/1982 |
| JP | 1 162593 | 6/1989 |
| JP | 05-38548 | 2/1993 |
| JP | 10 193140 | 7/1998 |
| JP | 10-193140 | 7/1998 |
| JP | 11-097039 | 4/1999 |
| JP | 2000 120974 | 4/2000 |
| JP | 2000-164234 | 6/2000 |
| JP | 3071744 | 6/2000 |
| JP | 2003 164981 | 6/2003 |
| WO | WO 97 48517 | 12/1997 |
| WO | WO 99/45302 | 9/1999 |

OTHER PUBLICATIONS

"Welding & Metal Fabrication", vol. 63, Jan. 1995, pp. 13, 14 and 16.
"Welding Technique", vol. 49, 2001, p. 48.
Patent Abstracts of Japan, vol. 017, No. 115, Mar. 10, 1993 & JP 4 296461 (Toshiba Corp), Oct. 20, 1992.
Patent Abstracts of Japan, vol. 012, No. 193, Jun. 4, 1988 & JP 62 296373 (Yamaha Motor Co Ltd), Dec. 23, 1987.
Patent Abstracts of Japan, vol. 003, No. 079, Jul. 6, 1979 & JP 54 053660 (Nippon Kokan KK), Apr. 27, 1979.
Patent Abstracts of Japan, vol. 009, No. 172, Jul. 17, 1985 & JP 60 044178 (Oosaka Tetsuen Kikai KK), Mar. 9, 1985.
Patent Abstracts of Japan, vol. 1999, No. 12, Oct. 29, 1999 & JP 11 197855 (Nippon Light Metal Co Ltd), Jul. 27, 1999.
Communication received from the Chines Patent Office mailed Mar. 7, 2008 with English translation (4 pages).
Canadian Office Action mailed Oct. 10, 2008, 3 pages.
Canadian Office Action mailed Oct. 27, 2008, 3 pages.

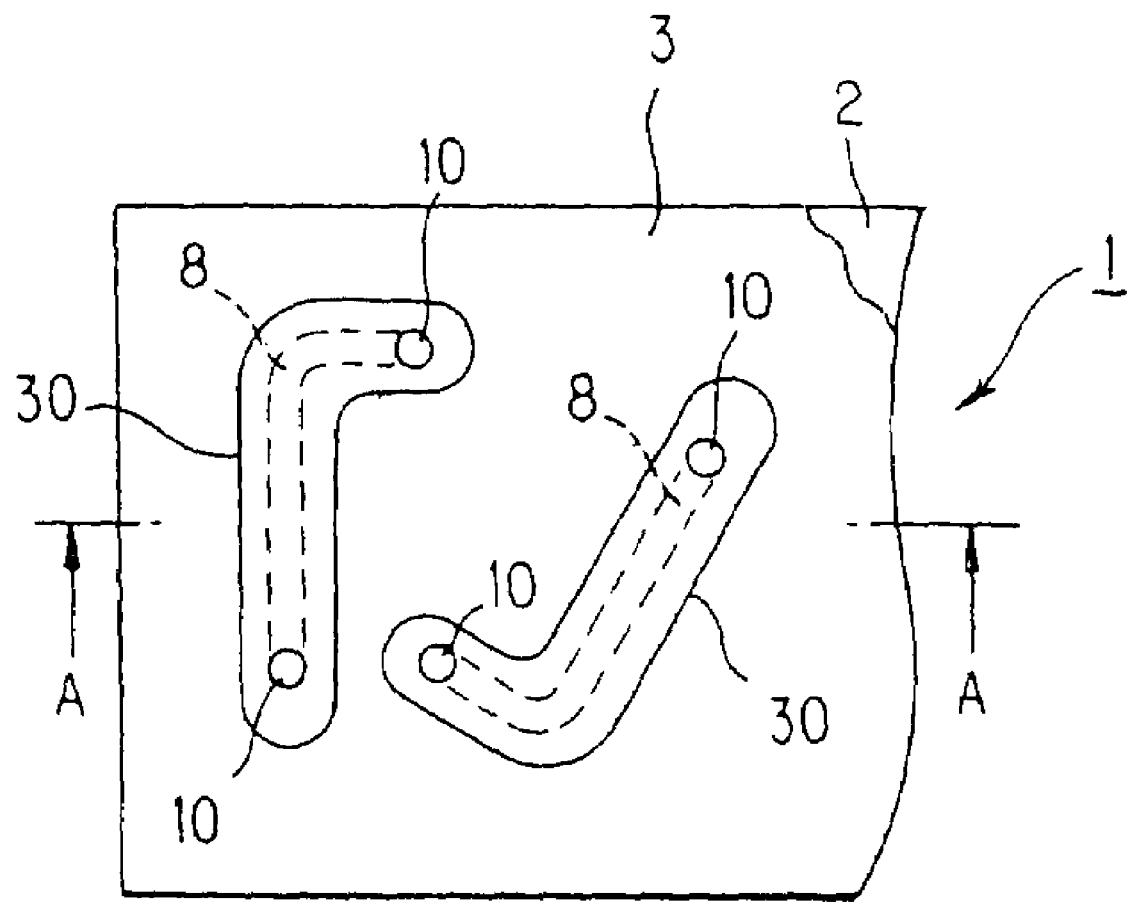

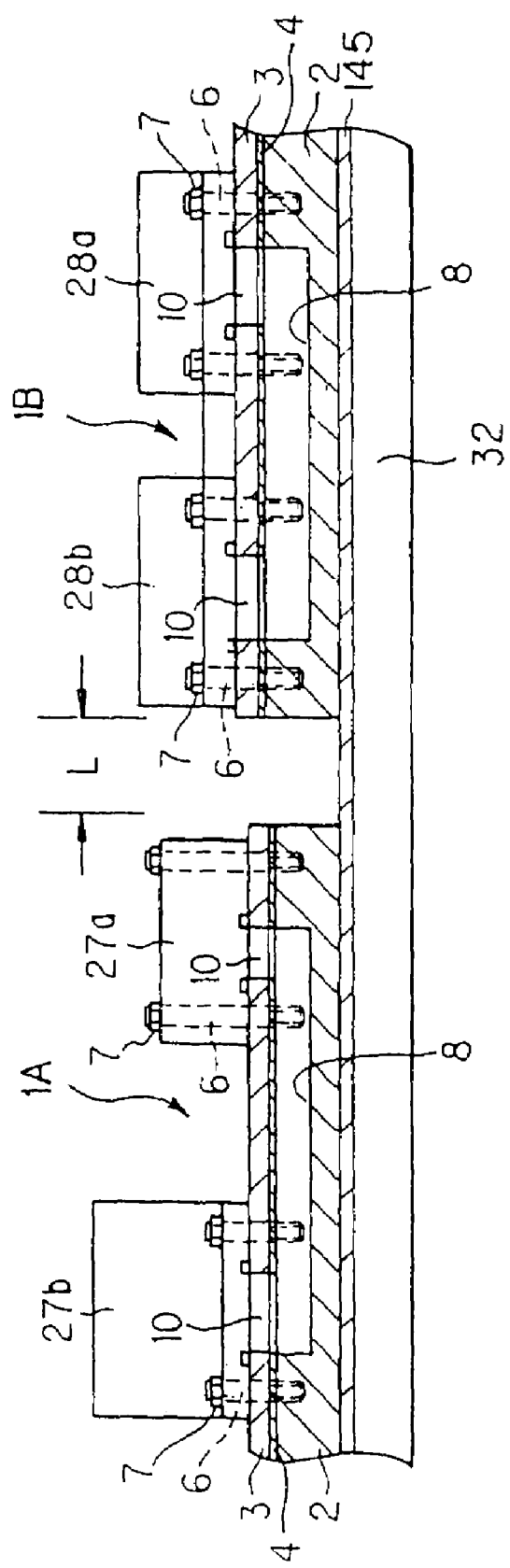

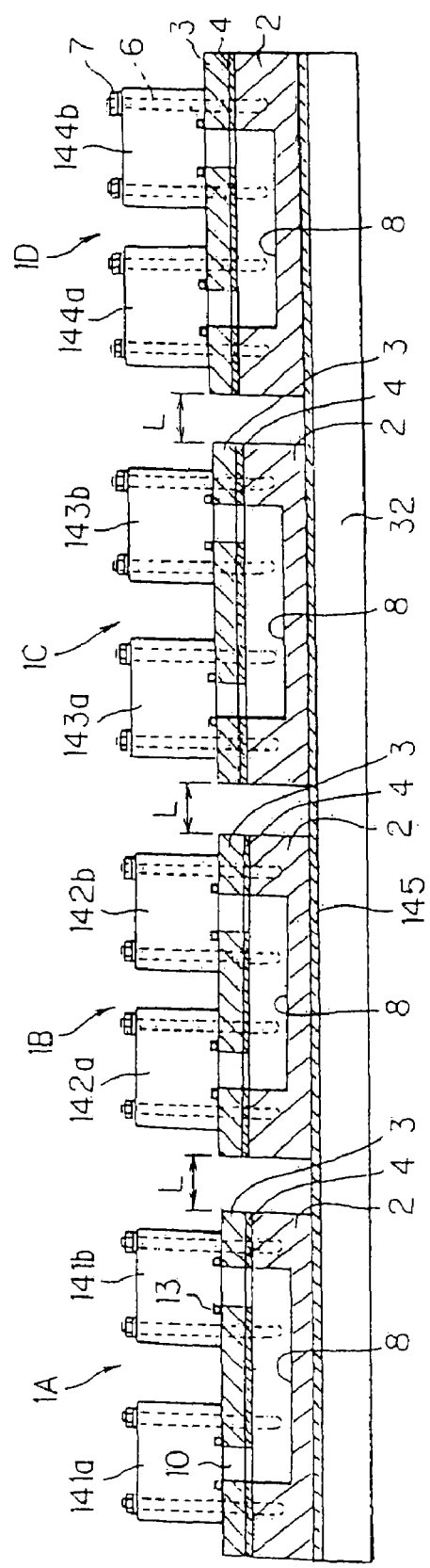

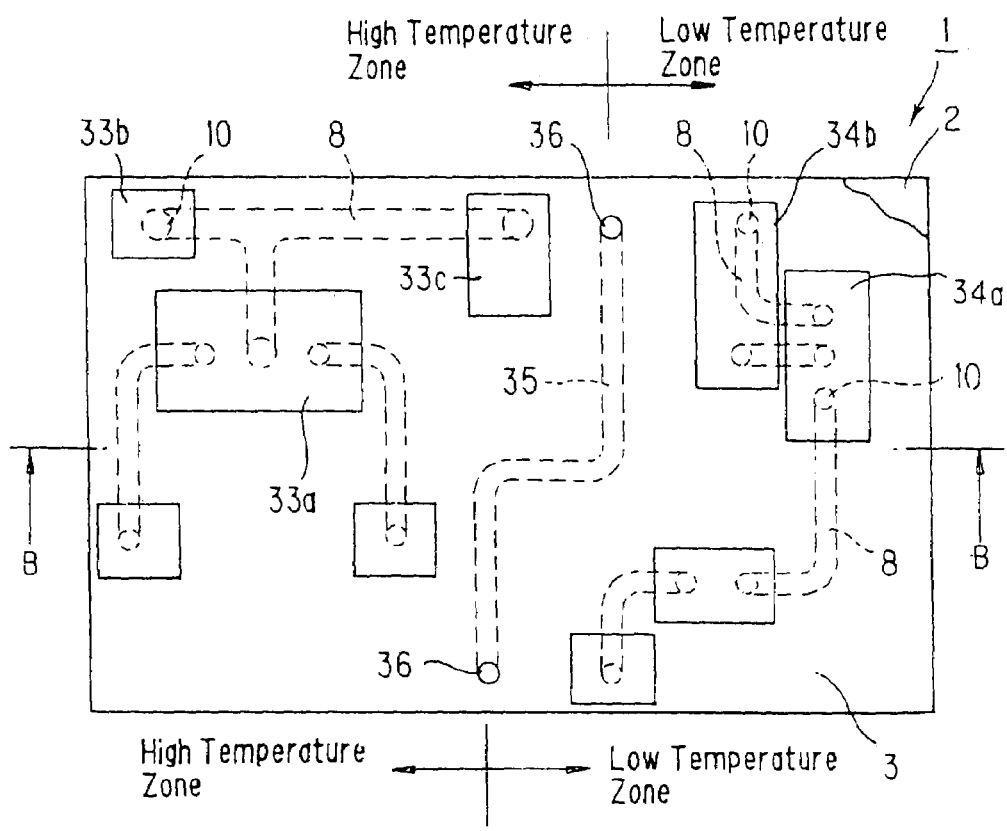

Welded (Fused) Portion

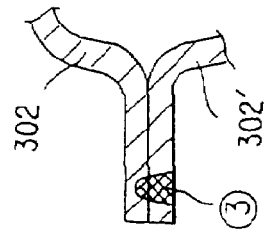
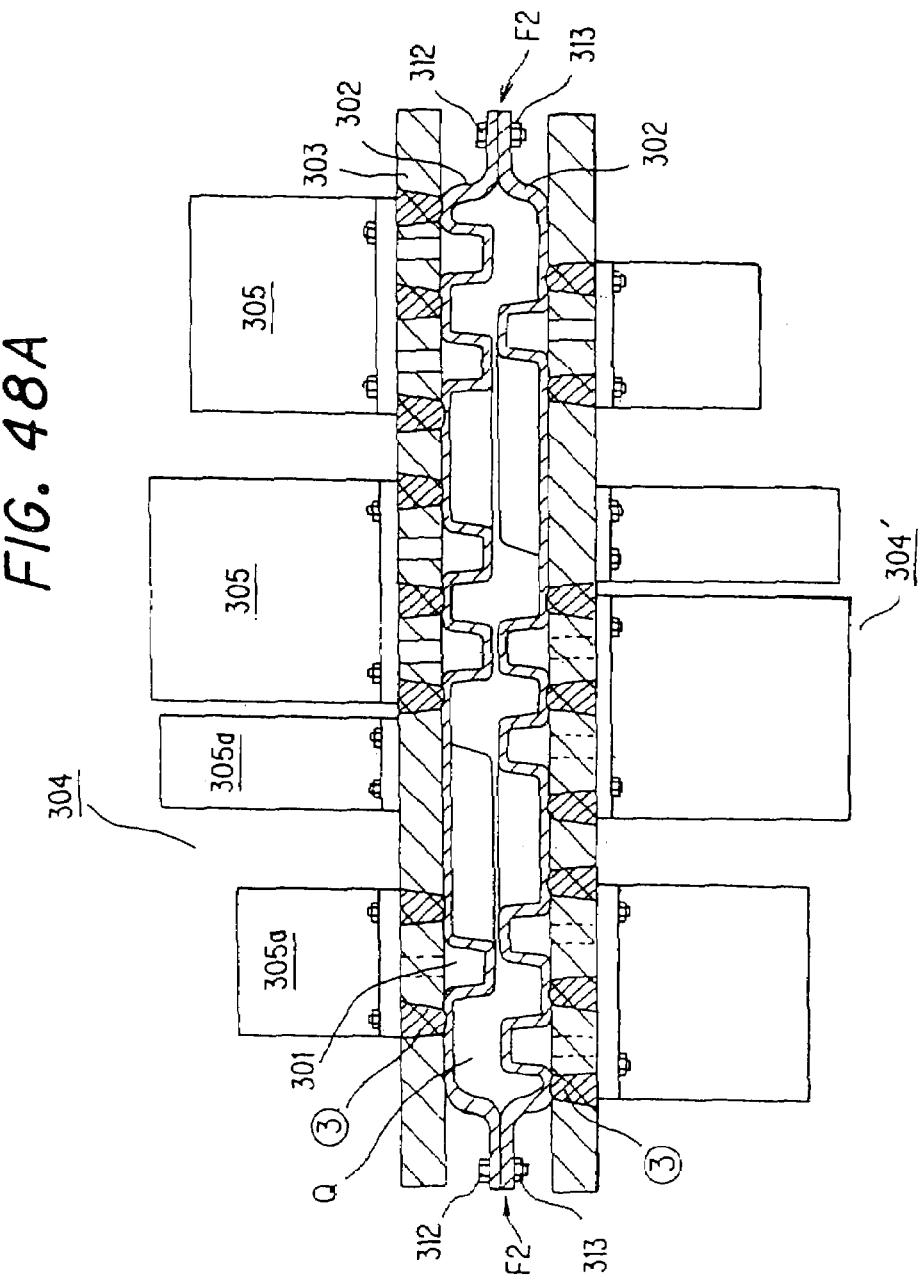
FIG. 48B
FIG. 48A

INTEGRATED PIPING PLATE, MACHINING METHOD FOR SAME, MACHINING APPARATUS FOR SAME, AND MACHINING EQUIPMENT FOR SAME

RELATED APPLICATIONS

This application is a division of U.S. patent application Ser. No. 10/883,760, filed Jul. 6, 2004, now abandoned which application is a division of Ser. No. 10/058,223, now U.S. Pat. No. 7,017,792 filed on Jan. 29, 2002 and issued on Mar. 28, 2006, which application claims priority under 35 U.S.C. § 119 of Japanese Patent Application No. 2001-026881, filed on Feb. 2, 2001, Japanese Patent Application No. 2001-176898, filed on Jun. 12, 2001, Japanese Patent Application No. 2001-205831, filed on Jul. 6, 2001, and Japanese Patent Application No. 2001-267095, filed on Sep. 4, 2001, all of which are incorporated herein by reference in their entirety.

BACKGROUND OF THE INVENTION

1. Field of the Invention

This invention relates to an integrated piping plate for use in a fixed unit incorporating piping, wiring, etc. into an apparatus, or a unit integrated so as to be transportable, and a machining method for the integrated piping plate, a machining apparatus for the integrated piping plate, and machining equipment for the integrated piping plate.

2. Description of the Related Art

An integrated piping plate is used as a subsystem for a fixed unit incorporating piping, wiring, etc. into an apparatus, or a transportable integrated unit, and is mainly responsible for controlling the supply, discharge, etc. of a fluid used in the above units.

The above units are composed of various instruments, components, piping, wiring, and so on. Large and small piping lines are provided complicatedly everywhere in order that liquids or gases with various properties, temperatures and pressures continuously flow among these instruments, etc. Sensors and control instruments for control of the apparatus are also provided, and many necessary interconnections for them are laid. With devices of which downsizing including weight reduction, in particular, is required, efforts are made to arrange numerous instruments, components, piping, etc. highly densely in a narrow space. An integrated piping plate is applied as means for constructing a fixed unit incorporating piping, wiring, etc. into an apparatus, or a transportable integrated unit.

FIGS. 50A and 50B show an example of a configurational drawing of a conventional integrated piping plate.

As shown in FIGS. 50A and 50B, the conventional integrated piping plate is composed of plates 521, 524 having grooves 531 and communication holes 534 machined therein, and complicated channels such as the grooves 531 are formed by casting. The grooves 531 may be formed by other methods, including cutting with an end mill, a milling machine, or a drilling machine. In a surface of the plate 521 in contact with the plate 524, the grooves 531 having predetermined sectional areas suitable for the velocities of the corresponding fluids and having suitable directions and lengths corresponding to the locations of the communication holes 534 are formed as channels connecting instruments 525 and components 525a arranged on the plate 524. Thus, the instruments 525 and the components 525a are brought into communication by the communication holes 534. The grooves 531 and the communication holes 534 are in charge of the function of piping through which fluids or gases flow.

The plate 521 and plate 524 machined by the above method are joined by an adhesive so as to seal the grooves 531. Concretely, joining surfaces of the plates 521 and 524 are coated with the adhesive, and then bolts 526 are screwed into tapped holes 528 of the plate 521 through bolt holes 527 of the plate 524. Pressure is imposed on the plates 521 and 524 thereby in a direction in which they are joined together. Further, the plates are heated for bonding so that the grooves 531 are sealed.

The instruments 525 and components 525a arranged on the plate 524 are mounted by screwing bolts (not shown) into tapped holes 529 of the plate 524 via a sealing material. These instruments 525 and components 525a control the fluid flowing into the grooves 531 through the communication holes 534. Pipe connectors 522 for supplying and discharging the fluid are mounted on the plate 521 to supply and discharge the fluid to and from the instruments 525 and components 525a through the grooves 531 and communication holes 534.

Such an integrated piping plate is disclosed, for example, in Japanese Patent Publication No. 1974-13651.

With the above-described conventional integrated piping plate, the plates constituting the integrated piping plate are cast into shape by simple molds, or shaped by cutting. Thus, portions which will give excess weight remain, posing problems about weight reduction and downsizing of the integrated piping plate. In order for the grooves to function as channels for fluids, there is need for the step of performing surface treatment of the groove portions, but this is not a method suitable for mass production.

Also, the adhesive is used for joining of the plates. This results in a low work efficiency, and is not very suitable for mass production. The bolts for fixing of the plates impede the downsizing of the integrated piping plate.

The excess wall thickness of the plate is present around the grooves having the function of piping. Thus, even when the fluid flowing through the grooves is to be cooled via the plate, it is difficult to raise the cooling efficiency.

In addition to the above problem, the integrated piping plate according to the present invention constitutes, for example, part of a fuel cell power generation system. Technical requirements for the integrated piping plate are volume production and low cost as in the case of the fuel cell power generation system. Further, downsizing including weight reduction, and a good response in controlling are demanded. Prompt volume production and cost reduction are demanded of the system by the market. There are not a few problems in fulfilling the requirements associated with future demand, such as actual volume production and cost reduction.

Thus, in view of the above circumstances, the present invention has as an object the provision of an integrated piping plate for apparatuses such as a fuel cell power generation system, the integrated piping plate whose assembly is facilitated by incorporating complicated piping and some components and wiring into the plate, and which is safe and permits downsizing of the apparatus.

It is another object of the invention to provide a machining method, a machining apparatus, and machining equipment for an integrated piping plate capable of improving the durability and pressure resistance of a plate joining portion, increasing work efficiency, and achieving further downsizing.

The invention also provides an integrated piping plate and a machining method for it, which can realize volume production and cost reduction, and achieve downsizing including weight reduction.

SUMMARY OF THE INVENTION

A first invention for solving the above-mentioned problems is an integrated piping plate composed of two or more plates joined together, and in which an instrument and a component constituting an apparatus are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided, and a corrosion-proof layer is formed on a surface of each of the grooves.

According to the integrated piping plate of the first invention, the channels corresponding to the conventional piping are present in the integrated piping plate, and the entire apparatus such as the fuel cell power generation system can be easily modularized, and downsized. Moreover, it suffices to assemble the respective constituent instruments and components to predetermined positions, and there is no need for a complicated pipe laying operation in a narrow space. Thus, the assembly work is easy and the work efficiency is increased. Furthermore, there are few seams, reducing the risk of fluid leakage. Since the corrosion-proof layer is formed on the surface of the groove, moreover, corrosion by the fluid flowing through the groove is prevented by the corrosion-proof layer, so that the life of the integrated piping plate can be prolonged.

The integrated piping plate of a second invention is the integrated piping plate of the first invention, wherein the corrosion-proof layer is also formed on the joining surface of each of the plates.

According to the integrated piping plate of the second invention, the corrosion-proof layer is also formed on the joining surface of the plate. Thus, corrosion by the ingredient in the adhesive for joining the plate is prevented by the corrosion-proof layer, so that the life of the integrated piping plate can be prolonged.

The integrated piping plate of a third invention is the integrated piping plate of the first or second invention, wherein the corrosion-proof layer is formed by coating with or lining with fluorocarbon resin.

The integrated piping plate of a fourth invention is the integrated piping plate of the first or second invention, wherein the corrosion-proof layer is formed by application of an aluminum oxide film.

In the integrated piping plate of the third or fourth invention as well, the corrosion-proof layer is formed by coating with or lining with fluorocarbon resin, or by application of an aluminum oxide film. Thus, corrosion by the fluid flowing through the groove, or the ingredient in the adhesive is prevented by the corrosion-proof layer, so that the life of the integrated piping plate can be prolonged.

The integrated piping plate of a fifth invention is an integrated piping plate composed of two or more plates joined together, and in which an instrument and a component constituting an apparatus are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided, each of the plates is welded at a position of a weld line surrounding a periphery of each of the grooves, and each of the fluids flowing through the groove is sealed up at a site of the weld line.

According to the integrated piping plate of the fifth invention, the plate is welded at a position of a weld line surrounding the periphery of the groove, and the fluid flowing through the groove is sealed up at the site of the weld line. Thus, sealing of the fluid can be performed reliably.

The integrated piping plate of a sixth invention is an integrated piping plate composed of two or more plates joined together, and in which an instrument and a component constituting an apparatus are disposed, or the instrument is disposed, or the component is disposed, on one of surfaces of the integrated piping plate, grooves for serving as channels for fluids are formed in joining surfaces of the plates, and the instrument and the component are connected, or the instrument is connected, or the component is connected, by the grooves, and wherein a plurality of the integrated piping plates are provided, and the plurality of integrated piping plates are integrally fixed, with back surfaces of the plurality of the integrated piping plates being superposed, to constitute a three-dimensional module.

According to the integrated piping plate of the sixth invention, the plurality of the integrated piping plates are integrally fixed, with back surfaces of the plurality of the integrated piping plates being superposed, to constitute a three-dimensional module. Thus, further downsizing of the apparatus can be achieved, the channels and control system for fluids can be shortened, response can be quickened, and control can be facilitated.

The integrated piping plate of a seventh invention is the integrated piping plate of the sixth invention, wherein a heat insulator is interposed between the back surfaces of the plurality of the integrated piping plates to constitute a heat insulating three-dimensional module.

According to the integrated piping plate of the seventh invention, a heat insulator is interposed between the back surfaces of the plurality of the integrated piping plates to constitute a heat insulating three-dimensional module. Thus, low temperature instruments, such as a control instrument, can be disposed on the other integrated piping plate in proximity to high temperature instruments disposed on one of the integrated piping plates.

The integrated piping plate of an eighth invention is the integrated piping plate of the sixth invention, wherein a separator is interposed between the back surfaces of the plurality of the integrated piping plates to constitute a heat insulating three-dimensional module.

According to the integrated piping plate of the eighth invention, a separator is interposed between the back surfaces of the plurality of the integrated piping plates to constitute a heat insulating three-dimensional module. Since the high temperature side integrated piping plate having the high temperature instruments disposed thereon, and the low temperature side integrated piping plate having the low temperature instruments disposed thereon can be separated by the separator, thermal influence from each other can be avoided.

The integrated piping plate of a ninth invention is the integrated piping plate of the eighth invention, wherein a heat insulator is interposed between the separator and one or all of the back surfaces of the plurality of the integrated piping plates.

According to the integrated piping plate of the ninth invention, a heat insulator is interposed between the back surfaces of the plurality of the integrated piping plates and the separator. Thus, a heat insulating effect is further enhanced.

The integrated piping plate of a tenth invention is the integrated piping plate of the sixth invention, wherein the instrument and the component constituting the apparatus are interposed, or the instrument is interposed, or the component is interposed, between the back surfaces of the plurality of the integrated piping plates.

According to the integrated piping plate of the tenth invention, the instrument and the component constituting the apparatus are interposed, or the instrument is interposed, or the component is interposed, between the back surfaces of the plurality of the integrated piping plates. Thus, the spacing between the integrated piping plates is effectively utilized, and the apparatus can be further downsized. Further, the constituent instrument and/or component separate(s) the integrated piping plates, and can be expected to show a heat insulating effect.

The integrated piping plate of an eleventh invention is the integrated piping plate of the tenth invention, wherein a heat insulator is interposed between the back surfaces of the plurality of the integrated piping plates and the instrument and the component, or the instrument, or the component interposed between the back surfaces.

According to the integrated piping plate of the eleventh invention, a heat insulator is interposed between the back surfaces of the plurality of the integrated piping plates and the instrument and the component, or the instrument, or the component interposed between the back surfaces. Thus, a heat insulating effect becomes marked.

The integrated piping plate of a twelfth invention is an integrated piping plate composed of two or more plates joined together, and in which an instrument and a component constituting an apparatus are disposed, or the instrument is disposed, or the component is disposed, on one of surfaces of the integrated piping plate, grooves for serving as channels for fluids are formed in joining surfaces of the plates, and the instrument and the component are connected, or the instrument is connected, or the component is connected, by the grooves, and wherein a plurality of the integrated piping plates are provided, and the plurality of the integrated piping plates are disposed on a same rest, with heat insulating intervals being kept between each other.

According to the integrated piping plate of the twelfth invention, the plurality of the integrated piping plates are disposed on the same rest, with heat insulating intervals being kept between each other. Thus, these integrated piping plates can ignore (prevent) thermal influence from each other.

The integrated piping plate of a thirteenth invention is the integrated piping plate of the twelfth invention, wherein a heat insulator is interposed between the plurality of the integrated piping plates and the rest.

According to the integrated piping plate of the thirteenth invention, a heat insulator is interposed between the plurality of the integrated piping plates and the rest. Thus, a heat insulating effect is further improved.

The integrated piping plate of a fourteenth invention is an integrated piping plate composed of two or more plates joined together, and in which an instrument and a component constituting an apparatus are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided, and a heat shutoff groove is provided between a high temperature zone where the instrument and the component at a high temperature are disposed, or the instrument at a high temperature is disposed, or the component at a high temperature is disposed, and a low temperature zone where the instrument and the component at a low temperature are disposed, or the instrument at a low temperature is disposed, or the component at a low temperature is disposed.

According to the integrated piping plate of the fourteenth invention, a heat shutoff groove is provided between a high temperature zone where the instrument and the component, or the instrument, or the component at a high temperature are or is disposed, and a low temperature zone where the instrument and the component, or the instrument, or the component at a low temperature are or is disposed. Thus, heat from the high temperature zone is shut off, whereby the influence of heat on the low temperature zone cannot be exerted.

The integrated piping plate of a fifteenth invention is the integrated piping plate of the fourteenth invention, wherein a heat insulator is filled into the heat shutoff groove.

According to the integrated piping plate of the fifteenth invention, a heat insulator is filled into the heat shutoff groove. Thus, the effect of heat shut off between the high temperature zone and the low temperature zone can be further increased.

The integrated piping plate of a sixteenth invention is the integrated piping plate of the fourteenth invention, wherein a refrigerant is flowed through the heat shutoff groove.

According to the integrated piping plate of the sixteenth invention, a refrigerant is flowed through the heat shutoff groove. Thus, the effect of heat shut off between the high temperature zone and the low temperature zone can be further increased.

The integrated piping plate of a seventeenth invention is an integrated piping plate composed of two or more plates joined together, and in which an instrument and a component constituting an apparatus are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided, and the instrument or component constituting the apparatus, a control instrument, or electrical wiring is incorporated into one of or all of the plates.

According to the integrated piping plate of the seventeenth invention, the instrument or component constituting the apparatus, a control instrument, or electrical wiring is incorporated into one of or all of the plates. Thus, the entire apparatus such as a fuel cell power generation system can be further downsized.

The integrated piping plate of an eighteenth invention is an integrated piping plate composed of two or more plates joined together, and in which an instrument and a component constituting an apparatus are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided, corrosion resistant piping is accommodated in some of or all of the grooves, and a corrosive fluid is flowed through the corrosion resistant piping.

According to the integrated piping plate of the eighteenth invention, corrosion resistant piping is accommodated in some of or all of the grooves, and a corrosive fluid is flowed through the corrosion resistant piping. Thus, even if the grooves (channels) are numerous and complicated, corrosion resistance to the corrosive fluid can be easily ensured, without need for an advanced machining technology. Moreover, it is possible to select and use the corrosion resistant piping of a material adapted for the properties of the corrosive fluid, so that the reliability of corrosion resisting performance is increased. Furthermore, treatment for corrosion resistance (channel formation using corrosion resistant piping) can be restricted to the channels for the corrosive fluid. Thus, machining man-hours are reduced, and the integrated piping plate can be provided for a low price. Besides, when corrosion resisting performance declines because of secular changes, corrosion resisting performance can be resumed simply by replacing the corrosion resistant piping accommodated in the integrated piping plate, rather than replacing the integrated piping plate. Thus, the cost of maintenance can be reduced.

The integrated piping plate of a nineteenth invention is the integrated piping plate of the eighteenth invention, wherein a flexible material is used as a material for the corrosion resistant piping.

According to the integrated piping plate of the nineteenth invention, a flexible material is used as a material for the corrosion resistant piping. Thus, after integration of the integrated piping plate, the corrosion resistant piping can be inserted into the groove, or the corrosion resistant piping can be replaced. Hence, workability can be increased.

The integrated piping plate of a twentieth invention is the integrated piping plate of the eighteenth or nineteenth invention, wherein each of end portions of the corrosion resistant piping is joined by use of a first joining member having a through-hole having a conical surfaced formed in an inner peripheral surface thereof, and a second joining member having a conical surface formed in an outer peripheral surface thereof, in such a manner that an outer diameter side of the end portion is supported by the conical surface of the first joining member, and an inner diameter side of the end portion is supported by the conical surface of the second joining member.

According to the integrated piping plate of the twentieth invention, a joining operation for the corrosion resistant piping can be performed easily, and leakage of the fluid can be prevented reliably.

The integrated piping plate of a twenty-first invention is the integrated piping plate of the twentieth invention, wherein the first joining member is formed integrally with the plate.

The integrated piping plate of a twenty-second invention is the integrated piping plate of the twentieth invention, wherein the second joining member is formed integrally with the instrument and the component, or the instrument, or the component.

The integrated piping plate of a twenty-third invention is the integrated piping plate of the twentieth invention, wherein the first joining member is formed integrally with the plate, and the second joining member is formed integrally with the instrument and the component, or the instrument, or the component.

According to the integrated piping plate of the twenty-first, twenty-second or twenty-third invention, the first joining member is formed integrally with the plate, or the second joining member is formed integrally with the instrument and the component, or the instrument, or the component, or the first joining member is formed integrally with the plate, and the second joining member is formed integrally with the instrument and the component, or the instrument, or the component. Thus, the number of the components is decreased, and the joining operation is facilitated.

The integrated piping plate of a twenty-fourth invention is the integrated piping plate of the twentieth invention, wherein the first joining member is divided into a plurality of portions.

The integrated piping plate of a twenty-fifth invention is the integrated piping plate of the twenty-second invention, wherein the first joining member is divided into a plurality of portions.

According to the integrated piping plate of the twenty-fourth or twenty-fifth invention, the first joining member is divided into a plurality of portions. Thus, the efficiency of the joining operation can be increased, particularly if the corrosion resistant piping of a highly rigid material is used, or if the path of the piping is complicated.

The integrated piping plate of a twenty-sixth invention is an integrated piping plate composed of three or more plates joined together, and in which an instrument and a component constituting an apparatus are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided.

According to the integrated piping plate of the twenty-sixth invention, even when many grooves are provided in agreement with many instruments and components, the layout of the grooves is simplified, and the instruments and components can be arranged compactly.

The integrated piping plate of a twenty-seventh invention is the integrated piping plate of the twenty-sixth invention, wherein the grooves in a plurality of stages formed in the joining surfaces of the respective plates are allocated to a high temperature zone and a low temperature zone.

According to the integrated piping plate of the twenty-seventh invention, the grooves in a plurality of stages are allocated to a high temperature zone and a low temperature zone. Consequently, thermal influence from each other can be eliminated.

The integrated piping plate of a twenty-eighth invention is an integrated piping plate for use in a fuel cell power generation system, the integrated piping plate being composed of two or more plates joined together, and in which an instrument and a component constituting the fuel cell power generation system are disposed, or the instrument is disposed, or the component is disposed, on one of or both of surfaces of the integrated piping plate, grooves for serving as channels for fluids are formed in joining surfaces of the plates, and the instrument and the component are connected, or the instrument is connected, or the component is connected, by the grooves, and wherein the integrated piping plate is provided singly, or a plurality of the integrated piping plates are provided.

According to the integrated piping plate for use in a fuel cell power generation system recited in the twenty-eighth invention, downsizing of the fuel cell power generation system can be achieved.

Embodiments of the first to twenty-eighth inventions will be described, mainly, in Embodiment 1 to be indicated later.

The machining method for an integrated piping plate of a twenty-ninth invention is a machining method for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising welding the joining surfaces of the plates around entire periphery of the fluid channel grooves, thereby joining the plates.

The machining method for an integrated piping plate of a thirtieth invention is the machining method for an integrated piping plate of the twenty-ninth invention, further comprising the steps of forming grooves for weld grooves in the plates so as to extend along entire periphery of the fluid channel grooves, and successively welding the grooves for the weld grooves to weld the joining surfaces of the plates around the entire periphery of the fluid channel grooves, thereby joining the plates.

The machining apparatus for an integrated piping plate of a thirty-first invention is a machining apparatus for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising weld groove machining means for forming grooves for weld grooves in the plates so as to extend along entire periphery of the fluid channel grooves, and welding means which, in succession to machining of the grooves for the weld grooves by the weld groove machining means, welds the grooves for the weld grooves to weld the joining surfaces of the plates around the entire periphery of the fluid channel grooves, thereby joining the plates.

According to the machining methods and machining apparatus of the twenty-ninth, thirtieth and thirty-first inventions, the joining surfaces of the plates are welded around the entire periphery of the fluid channel grooves, thereby joining the plates. Thus, this type of welding, compared with joining of the plates by an adhesive, increases the durability of the plate joining portion, and constructs a firm weld structure, thus increasing pressure resistance. Also, the coupling bolts for the plates become unnecessary, so that the entire integrated piping plate can be further downsized. Furthermore, the machining methods facilitate the line operation of joining procedure, and thus can increase the work efficiency, contributing to a low cost.

The machining equipment for an integrated piping plate of a thirty-second invention is machining equipment for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising plate supply means for supplying the plates having the fluid channel grooves, or the communication holes, or the fluid channel grooves and the communication holes, formed therein beforehand, weld groove machining means for forming grooves for weld grooves in the plates, which have been supplied by the plate supply means, so as to extend along entire periphery of the fluid channel grooves, and welding means which, in succession to machining of the grooves for the weld grooves by the weld groove machining means, welds the grooves for the weld grooves to weld the joining surfaces of the plates around the entire periphery of the fluid channel grooves, thereby joining the plates.

The machining equipment for an integrated piping plate of a thirty-third invention is machining equipment for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising plate supply means for supplying the plates, machining means for forming the fluid channel grooves, or the communication holes, or the fluid channel grooves and the communication holes, in the plates supplied by the plate supply means, weld groove machining means for forming grooves for weld grooves in the plates, which have been machined by the machining means, so as to extend along entire periphery of the fluid channel grooves, and welding means which, in succession to machining of the grooves for the weld grooves by the weld groove machining means, welds the grooves for the weld grooves to weld the joining surfaces of the plates around the entire periphery of the fluid channel grooves, thereby joining the plates.

According to the machining equipments of the thirty-second and thirty-third inventions, the plate supply means, weld groove machining means, and welding means are provided, or the plate supply means, machining means for fluid channel grooves and communication holes, weld groove machining means, and welding means are provided. Thus, coherent machining of the plates constituting the integrated piping plate can be easily performed, thus increasing the work efficiency and contributing to further cost reduction.

The machining method for an integrated piping plate of a thirty-fourth invention is the machining method for an integrated piping plate of the twenty-ninth invention, further comprising welding the joining surfaces of the plates, by friction stir welding, around entire periphery of the fluid channel grooves, thereby joining the plates.

The machining apparatus for an integrated piping plate of a thirty-fifth invention is a machining apparatus for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising friction stir welding means for welding the joining surfaces of the plates around entire periphery of the fluid channel grooves, thereby joining the plates.

According to the machining method and machining apparatus of the thirty-fourth and thirty-fifth inventions, the joining surfaces of the plates are welded around the entire periphery of the fluid channel grooves, thereby joining the plates. Thus, this type of welding, compared with joining of the plates by an adhesive, increases the durability of the plate joining portion, and constructs a firm weld structure, thus increasing pressure resistance. Also, the coupling bolts for the plates become unnecessary, so that the entire integrated piping plate can be further downsized. Furthermore, the machining method facilitates the line operation of joining procedure, and thus can increase the work efficiency, contributing to a low cost. Furthermore, the adoption of friction stir welding obviates the need for machining of the grooves for weld grooves, thus achieving further cost reduction.

The machining equipment for an integrated piping plate of a thirty-sixth invention is machining equipment for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising plate supply means for supplying the plates having the fluid channel grooves, or the communication holes, or the fluid channel grooves and the communication holes, formed therein beforehand, and friction stir welding means for welding the joining surfaces of the plates, which have been supplied by the plate supply means, around entire periphery of the fluid channel grooves, thereby joining the plates.

The machining equipment for an integrated piping plate of a thirty-seventh invention is machining equipment for an integrated piping plate composed of a plurality of plates joined together, and in which an instrument and a component constituting an apparatus are disposed, or the instrument is disposed, or the component is disposed, on one of or both of surfaces of the integrated piping plate, and the instrument and the component are connected, or the instrument is connected, or the component is connected, by fluid channel grooves formed in joining surfaces of the plates, and communication holes formed in the plates, and comprising plate supply means for supplying the plates, machining means for forming the fluid channel grooves, or the communication holes, or the fluid channel grooves and the communication holes, in the plates supplied by the plate supply means, and friction stir welding means for welding the joining surfaces of the plates, which have been machined by the machining means, around entire periphery of the fluid channel grooves, thereby joining the plates.

According to the machining equipments of the thirty-sixth and thirty-seventh inventions, coherent machining of the plates constituting the integrated piping plate can be easily performed, thus increasing the work efficiency and contributing to further cost reduction. Furthermore, the adoption of friction stir welding obviates the need for machining of the grooves for weld grooves, thus achieving further cost reduction.

The machining method for an integrated piping plate of a thirty-eighth invention is the machining method for the integrated piping plate of the twenty-ninth, thirtieth or thirty-fourth invention, further comprising performing numerical control as tracer means for machining.

The machining apparatus for an integrated piping plate of a thirty-ninth invention is the machining apparatus for the integrated piping plate of the thirty-first or thirty-fifth invention, further comprising control means for performing numerical control as tracer means for machining.

The machining equipment for an integrated piping plate of a fortieth invention is the machining equipment for the integrated piping plate of the thirty-second, thirty-third, thirty-sixth or thirty-seventh invention, further comprising control means for performing numerical control as tracer means for machining.

According to the machining method, machining apparatus and machining equipment of the thirty-eighth, thirty-ninth and fortieth inventions, coherent machining of the plates constituting the integrated piping plate can be easily performed by tracer control relying on numerical control.

Embodiments of the twenty-ninth to fortieth inventions will be described, mainly, in Embodiment 2 to be indicated later.

The integrated piping plate of a forth-first invention is an integrated piping plate comprising a first plate having grooves, which serves as channels for fluids, formed therein by press working, and a second plate having an instrument and a component, or the instrument, or the component mounted thereon, and having communication holes formed therein, the communication holes communicating with the instrument and the component, or the instrument, or the component, and wherein the first plate and the second plate are joined such that the instrument and the component are connected, or the instrument is connected, or the component is connected, by the grooves and the communication holes.

The integrated piping plate of a forty-second invention is an integrated piping plate comprising a first plate having grooves, which serves as channels for fluids, formed therein by precision casting, and a second plate having an instrument and a component, or the instrument, or the component mounted thereon, and having communication holes formed therein, the communication holes communicating with the instrument and the component, or the instrument, or the component, and wherein the first plate and the second plate are joined such that the instrument and the component are connected, or the instrument is connected, or the component is connected, by the grooves and the communication holes.

According to the integrated piping plate of the forty-first or forty-second invention, the integrated piping plate can be constituted from plates with thin walls formed by press working or precision casting, so that marked weight reduction of the integrated piping plate becomes possible.

In detail, the plates having fluid channel grooves are shaped by press working or precision casting, whereby the wall thicknesses of the plates can be decreased compared with the conventional integrated piping plate, and marked weight reduction is realized. Thus, downsizing of the integrated piping plate, including weight reduction, can be achieved. Moreover, press working or precision casting is suitable for mass production, and the machining steps can be simplified in comparison with the conventional integrated piping plate, thereby contributing to a marked cost decrease. Hence, the work efficiency for machining of the integrated piping plate increases, actualizing volume production and cost reduction.

The machining method for an integrated piping plate of a forty-third invention comprises the steps of forming grooves, which serve as channels for fluids, in a first plate by press working, mounting an instrument and a component, or the instrument, or the component on a second plate, and forming communication holes in the second plate, the communication holes communicating with the instrument and the component, or the instrument, or the component, and joining the first plate and the second plate, which have been so machined, by welding such that the instrument and the component are connected, or the instrument is connected, or the component is connected, by the grooves and the communication holes.

The machining method for an integrated piping plate of a forty-fourth invention comprises the steps of forming grooves, which serve as channels for fluids, in a first plate by precision casting, mounting an instrument and a component, or the instrument, or the component on a second plate, and forming communication holes in the second plate, the communication holes communicating with the instrument and the component, or the instrument, or the component, and joining the first plate and the second plate, which have been so machined, by welding such that the instrument and the component are connected, or the instrument is connected, or the component is connected, by the grooves and the communication holes.

According to the machining method of the forty-third or forty-fourth invention, the use of press working or precision casting as a method for machining grooves of the plates themselves can result in the steps capable of markedly reducing the weight of the plates. Consequently, downsizing including weight reduction of the integrated piping plate becomes possible.

Furthermore, the method of joining the plates uses welding, rather than the use of an adhesive. Thus, coupling bolts for the plates of the integrated piping plate are unnecessary, and the entire integrated piping plate can be downsized. Moreover, excess steps, such as heating and pressurization during bonding, as with the use of an adhesive, are not necessary. Thus, the machining step can be simplified in comparison with the machining method for the conventional integrated piping plate, thereby contributing to a marked cost decrease. Press working, precision casting and welding are suitable for mass production, thus increasing the work efficiency of machining of the integrated piping plate, achieving volume production and cost reduction. Furthermore, bonding by welding is adopted. Hence, there is no concern for leakage due to deterioration of the adhesive, and durability increases, imparting resistance to high temperatures and high pressures.

The machining method for an integrated piping plate of a forty-fifth invention is the machining method of the forty-third or forty-fourth invention, further comprising joining the first plate and the second plate by friction stir welding.

According to the machining method of the forty-fifth invention, the use of press working or precision casting as a method for machining grooves of the plates themselves can result in the steps capable of markedly reducing the weight of the plates. Consequently, downsizing including weight reduction of the integrated piping plate becomes possible.

Furthermore, the method of joining the plates uses friction stir welding, rather than the use of an adhesive. Thus, coupling bolts for the plates of the integrated piping plate are unnecessary, and the grooves for weld grooves are also unnecessary, so that the entire integrated piping plate can be downsized. Moreover, excess steps, such as heating and pressurization during bonding, as with the use of an adhesive, are not necessary. Nor is weld groove machining means, such as other welding method, needed. Thus, the machining step can be simplified in comparison with the machining method for the conventional integrated piping plate, thereby contributing to a marked cost decrease. Press working, precision casting and friction stir welding are suitable for mass production, thus increasing the work efficiency of machining of the integrated piping plate, achieving volume production and cost reduction. Furthermore, bonding by welding is adopted. Hence, there is no concern for leakage due to deterioration of the adhesive, and durability increases, imparting resistance to high temperatures and high pressures.

The integrated piping plate of a forty-sixth invention is the integrated piping plate of the forty-first or forty-second invention, wherein a plurality of the first plates having the grooves, which serve as the channels for the fluids, machined therein are fixed so as to be opposed to each other, and peripheries of the plates in contact with each other are sealed to constitute a three-dimensional configuration.

According to the integrated piping plate of the forty-sixth invention, the plates are joined into a three-dimensional configuration such that their face side and back side become integral. Instruments and components are arranged on the face side and back side of the integrated piping plate. Thus, a system comprising complicated lines can be constituted compactly, downsizing including weight reduction of the integrated piping plate can be realized, and a satisfactory response can be obtained.

The integrated piping plate of a forty-seventh invention is the integrated piping plate of the forty-sixth invention, wherein the plurality of the first plates having the grooves, which serve as the channels for the fluids, machined therein are brought into contact with each other so as to be opposed to each other, whereby a space portion is created, and the space portion is used as a channel for flow of a refrigerant.

According to the integrated piping plate of the forty-seventh invention, the portions exposed to high temperatures can be appropriately cooled, a system comprising complicated lines can be constituted compactly, and downsizing including weight reduction of the integrated piping plate can be realized.

Particularly in this invention, the plates subjected to press working or precision casting are used. Thus, the plates themselves have no excess volume acting as a heat storage portion, and a wide surface area for the refrigerant can be secured. Hence, a high temperature fluid can be cooled with high efficiency. Because of such advantages, an excess space for cooling is unnecessary, and a system comprising complicated lines can be constituted compactly.

Embodiments of the forty-first to forty-seventh inventions will be described, mainly, in Embodiment 3 to be indicated later.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 5 is a configurational drawing of the integrated piping plate with a weld structure;

FIG. 14 is a configurational drawing of an integrated piping plate having a high temperature portion and a low temperature portion separated on the same rest;

FIG. 15 is a configurational drawing of four of the integrated piping plates disposed on the same rest;

FIG. 16 is a configurational drawing of the integrated piping plate having heat shutoff grooves;

FIG. 48A is a side view of the integrated piping plate representing an embodiment in which the integrated piping plate according to the present invention is constituted three-dimensionally;

FIG. 48B is an enlarged view of an F2 portion in FIG. 48A;

DESCRIPTION OF THE PREFERRED EMBODIMENTS

Embodiments of the present invention will be described in detail with reference to the accompanying drawings.

Embodiment 1

Details of the configuration of an integrated piping plate according to an embodiment of the present invention will be described based on FIG. 1, with a fuel cell power generation system taken as an example.

Figure 1:
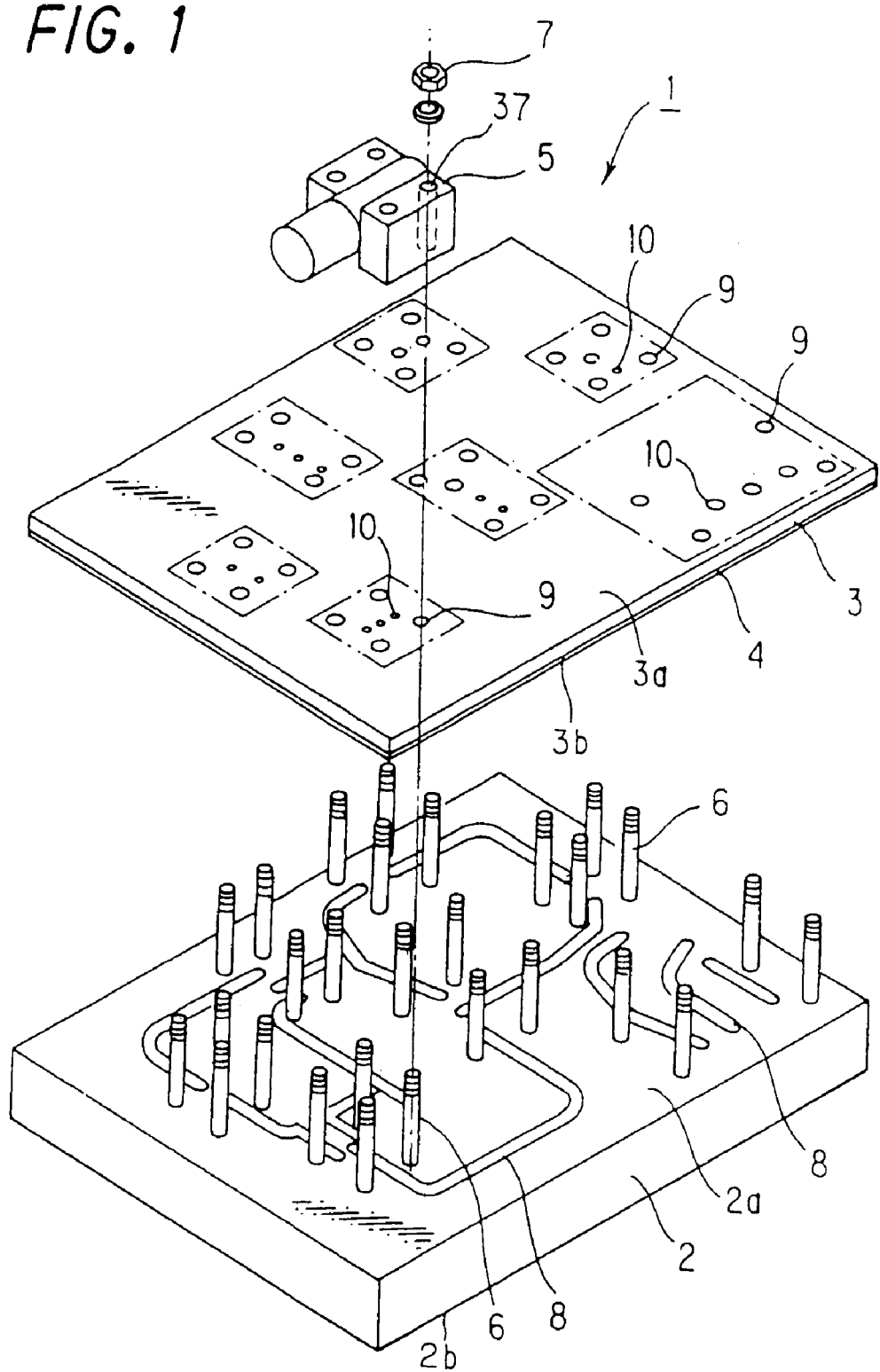
FIG. 1 is a configurational drawing of an integrated piping plate according to an embodiment of the present invention.

As shown in FIG. 1, an integrated piping plate 1 comprises a plate 2 and a plate 3 joined by a suitable adhesive 4. The integrated piping plate 1 is constituted by fixing constituent instruments and components of a fuel cell power generation system (indicated by one-dot chain lines in FIG. 1), which are disposed on a surface (upper surface in FIG. 1) 3a of the plate 3 and include a constituent instrument 5, by stud bolts 6 and nuts 7 integrally with the plates 2, 3.

In a joining surface (an upper surface in FIG. 1) of the plate 2 to be joined to the plate 3, grooves 8 are formed, the grooves 8 having predetermined sectional area suitable for the velocities of corresponding fluids and having suitable lengths and directions adapted for the positions of piping ports of the constituent instruments and components, such as the instrument 5 arranged on the surface 3a of the plate 3. The grooves 8 have the function of piping through which liquids or gases necessary for the fuel cell power generation system flow. Thus, the sectional areas of the grooves 8 are determined by the properties, flow velocities and pressure losses of flowing fluids, while the lengths and directions of the grooves 8 are determined by the arrangement of the respective constituent instruments and components, including the instrument 5, arranged on the plate 3.

In FIG. 1, the grooves 8 are provided in the plate 2, but the grooves 8 may be provided in the plate 3. That is, the grooves 8 may be provided in a joining surface (lower surface in FIG. 1) 3b of the plate 3 joined to the plate 2. The constituent instruments and components of the fuel cell power generation system may be disposed on a surface (lower surface in FIG. 1) 2b of the plate 2, as well as on the surface 3a of the plate 3, although a concrete example will be described later on (see FIG. 3). That is, the constituent instruments and components may be disposed on one of, or both of the surface 2b of the plate 2 and the surface 3a of the plate 3.

The materials for the plates 2, 3 are not restricted, but an aluminum plate and an aluminum alloy plate are the most effective materials for the purpose of decreasing the weight for transportation, and for ease of machining of the grooves 8. Castings are also effective because of high resistance to heat and for ease of formation of the grooves 8. Moreover, further weight reduction can be achieved by using synthetic resin or the like as the material for the plates 2, 3.

According to the present embodiment, the constituent instruments and components, such as the instrument 5, are mounted on the plate 3, and the stud bolts 6 are provided for clamping the plates 2 and 3 to prevent leakage of the fluid flowing through the grooves 8. However, this method of fixing is not limitative, and the fixing of the constituent instruments and components onto the plate 3, and the fixing of the plates 2 and 3 can be performed by through bolts, which pierce through the plates 2, 3, or other fixing means.

The plate 3 is a flat plate with a thickness of a suitable magnitude, and bolt holes 9 for insertion of the stud bolts 6 at predetermined positions are bored in the plate thickness direction. Through-holes 37 for insertion of the stud bolts 6 are formed in the respective constituent instruments and components, including the instrument 5. In the plate 3, communication holes 10 are also disposed for establishing communication between the respective constituent instruments and components, including the instrument 5, to be mounted on the surface 3a and the grooves 8 of the plate 2 to permit the flow of the fluid.

To assemble such an integrated piping plate 1, the first step is to bond the plate 2 and the plate 3 via the adhesive 4. Usually, a commercially available thermosetting adhesive is used as the adhesive 4, but the method of joining the plates 2 and 3 by joining means, such as fusing, brazing or welding, is also effective depending on the type of fuel used for the fuel cell, or the material for the plates 2, 3.

Then, the stud bolts 6 are inserted through the bolt holes 9 of the plate 3, and implanted into the plate 2. The stud bolts 6 are inserted through the through-holes 37 of the instrument 5, and then the nuts 7 are screwed to the end portions of the stud bolts 6, whereby the instrument 5 is fastened to the integrated piping plate 1. The other constituent instruments and components are also sequentially subjected to the same procedure to complete assembly.

Figure 2A:
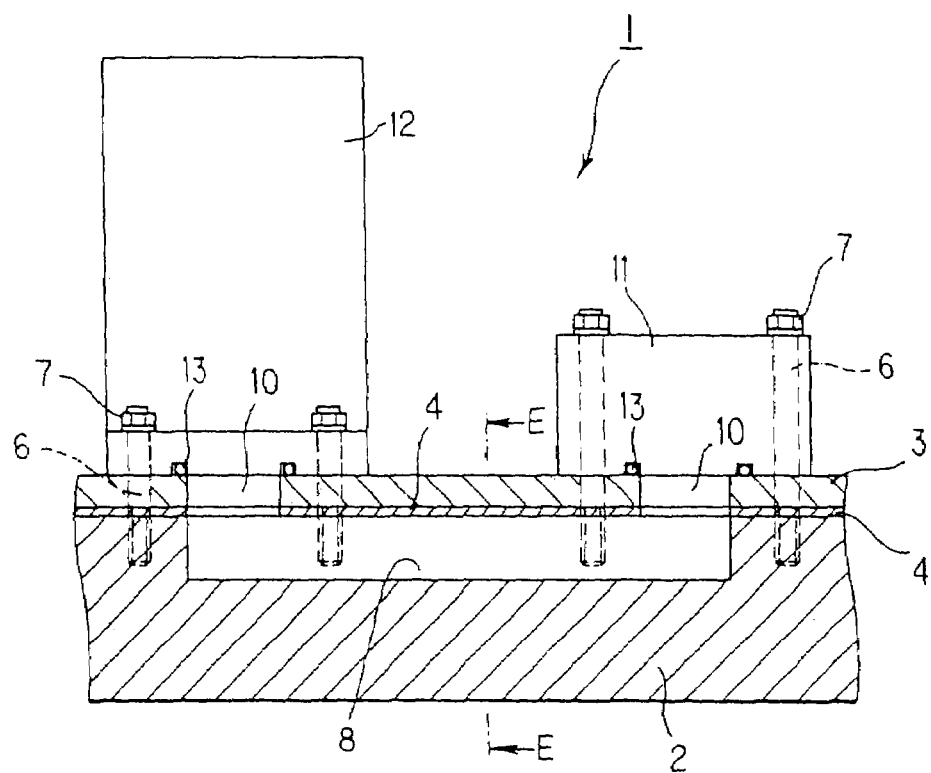
FIG. 2A is a sectional structural drawing of the integrated piping plate according to the embodiment of the present invention.
Figure 2B:
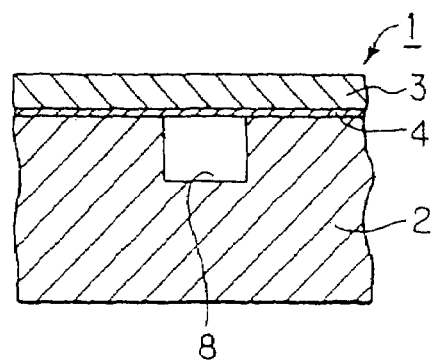
FIG. 2B is a sectional view taken on line E-E of FIG. 2A.

FIGS. 2A and 2B generally explain the configuration of the integrated piping plate based on its sectional structure. An integrated piping plate 1 shown in FIGS. 2A and 2B is assembled, for example, by integrally fixing an A instrument 11, a B instrument 12, a plate 2 and a plate 3 by stud bolts 6 and nuts 7 fastened to them.

Between the A instrument 11 and the B instrument 12, a fluid can flow by a groove 8 formed in the plate 2 and communication holes 10 machined in the plate 3. That is, the A instrument 11 and the B instrument 12 are connected together by the groove 8. The plate 2 and the plat 3 are adhered by the adhesive 4, so that the fluid flowing through the groove 8 is sealed up. An O ring 13 or the like is used to seal spacing between the instruments 11, 12 and the plate 3.

Figure 3:
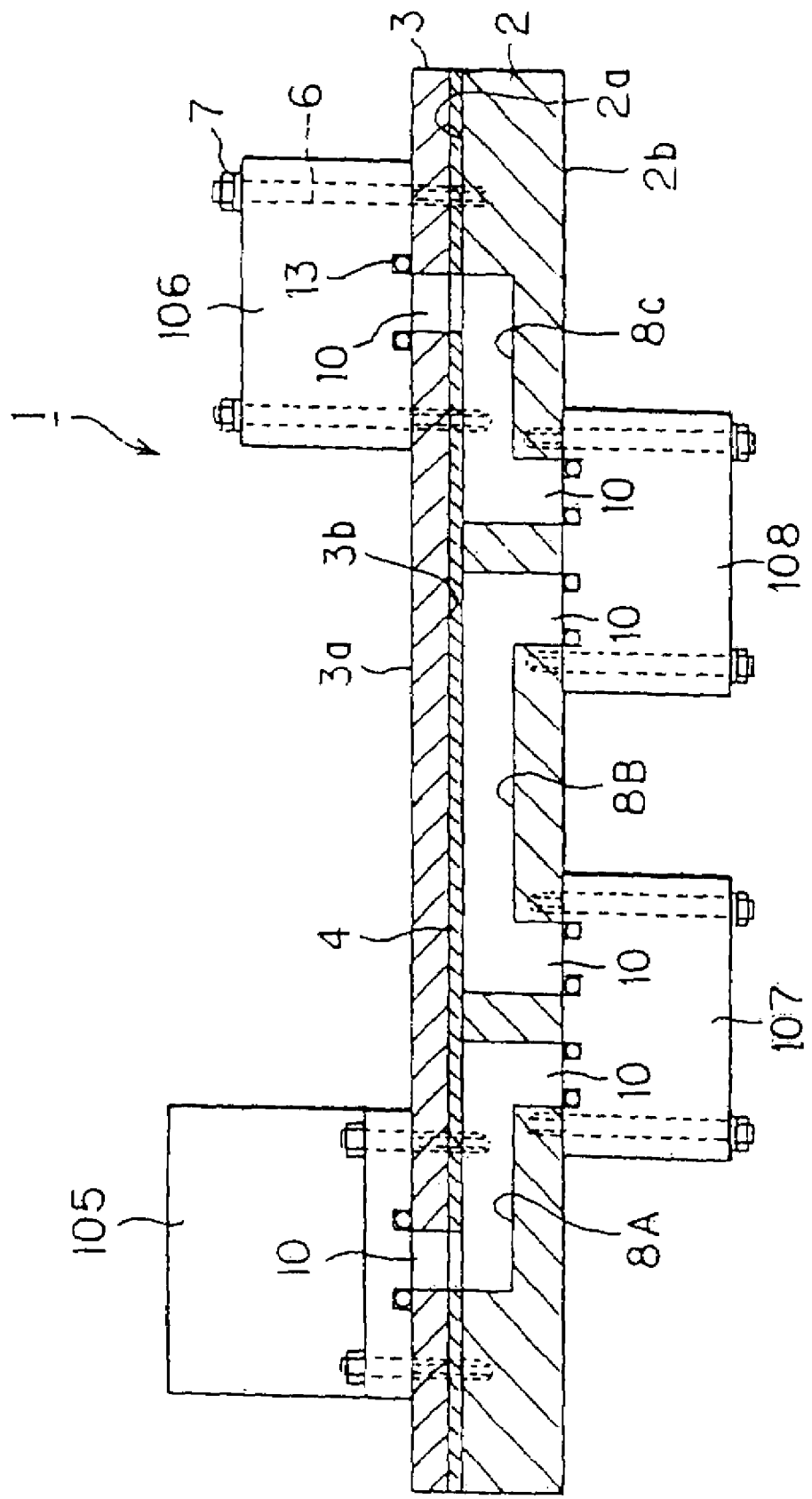
FIG. 3 is a configurational drawing of the integrated piping plate having instruments arranged on both of its face side and back side.

FIG. 3 shows an example in which instruments are arranged on both surfaces of an integrated piping plate. In an integrated piping plate 1 shown in FIG. 3, instruments 105, 106 are disposed on a surface 3a of a plate 3, and instruments 107, 108 are disposed on a surface 2b of a plate 2. Grooves 8A, 8B, 8C, which serve as channels for fluids, are formed in a joining surface 2a of the plate 2. Communication holes 10 for communication between these grooves 8A, 8B, 8C and the instruments 105, 106, 107, 108 are formed in the plate 2 and the plate 3. That is, the instrument 105 on the plate 3 and the instrument 107 on the plate 2 are connected by the groove 8A, the instruments 107, 108 on the plate 2 are connected by the groove 8B, and the instrument 106 on the plate 3 and the instrument 108 on the plate 2 are connected by the groove 8C.

It is also possible to dispose instruments and components only on the surface 2b of the plate 2, without providing instruments and components on the surface 3a of the plate 3, although they are not shown.

Figure 4A:
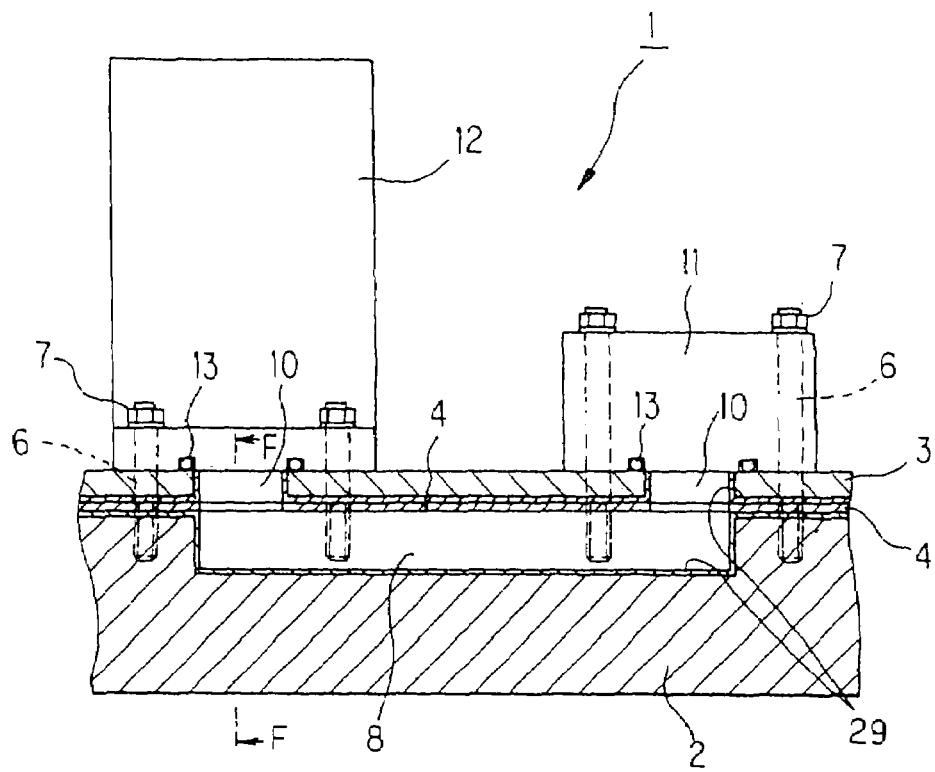
FIG. 4A is a configurational drawing of the integrated piping plate subjected to surface treatment.
Figure 4B:
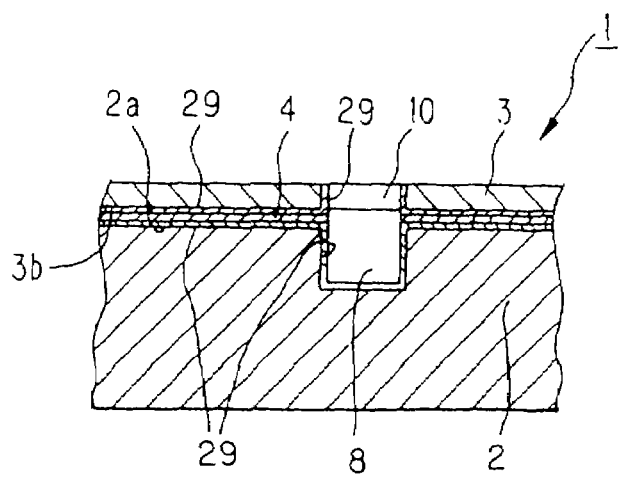
FIG. 4B is a sectional view taken on line F-F of FIG. 4A.

FIGS. 4A and 4B show an example of an integrated piping plate having a corrosion-proof layer formed by surface treatment. In an integrated piping plate 1 shown in FIGS. 4A and 4B, joining surfaces (adhesion surfaces) 2a and 3b of a plate 2 and a plate 3, and the surfaces of a groove 8 to serve as a channel for a fluid, and communication holes 10 are coated with or lined with fluorocarbon resin, such as polytetrafluoroethylene, or covered with an aluminum oxide film to form corrosion-proof layers 29. By so forming the corrosion-proof layers 29, corrosion by the fluid flowing through the groove 8 and the communication holes 10, or by ingredients contained in the adhesive 4 can be prevented, and a long life of the integrated piping plate 1 can be ensured.

Figure 6:
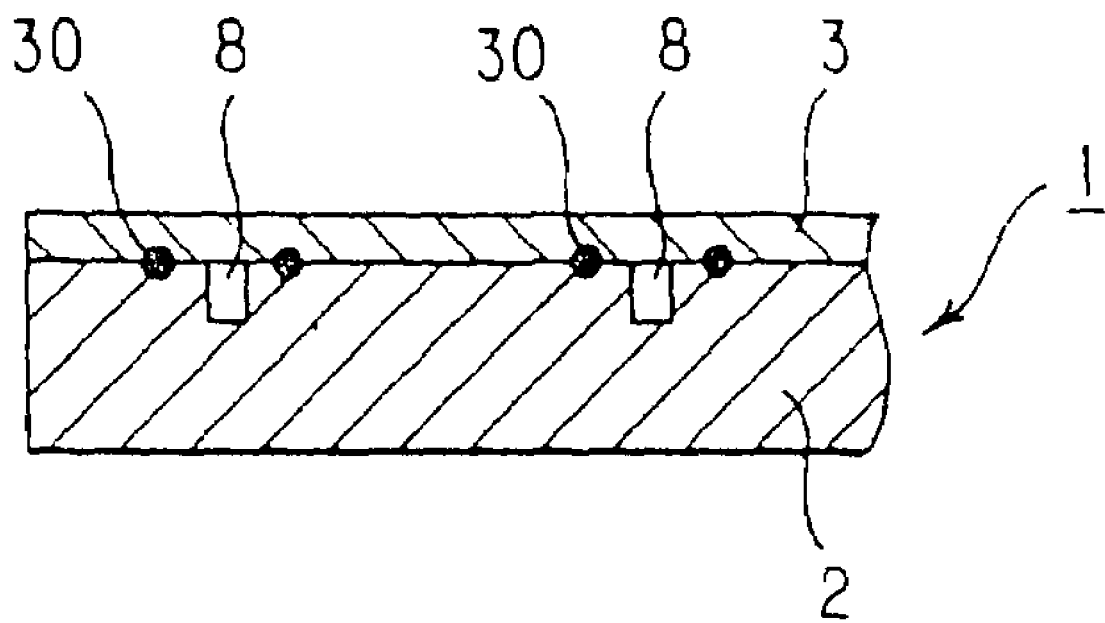
FIG. 6 is a sectional view taken on line A-A of FIG. 5.

FIGS. 5 and 6 show an example of welding a plate 2 and a plate 3. As indicated by solid lines in FIG. 5, welding is performed on weld lines 30, which surround the peripheries of grooves 8 formed in the plate 2 while keeping suitable distances from the grooves 8, by electromagnetic force-controlled hybrid welding or the like, with the plates 2 and 3 being sequentially gripped at a strong pressure. As a result, the plate 2 and the plate 3 are welded at the positions of the weld lines 30, as shown in FIG. 6. At the sites of the weld lines 30, the fluids flowing through the grooves 8 can be sealed up reliably.

Figure 7:
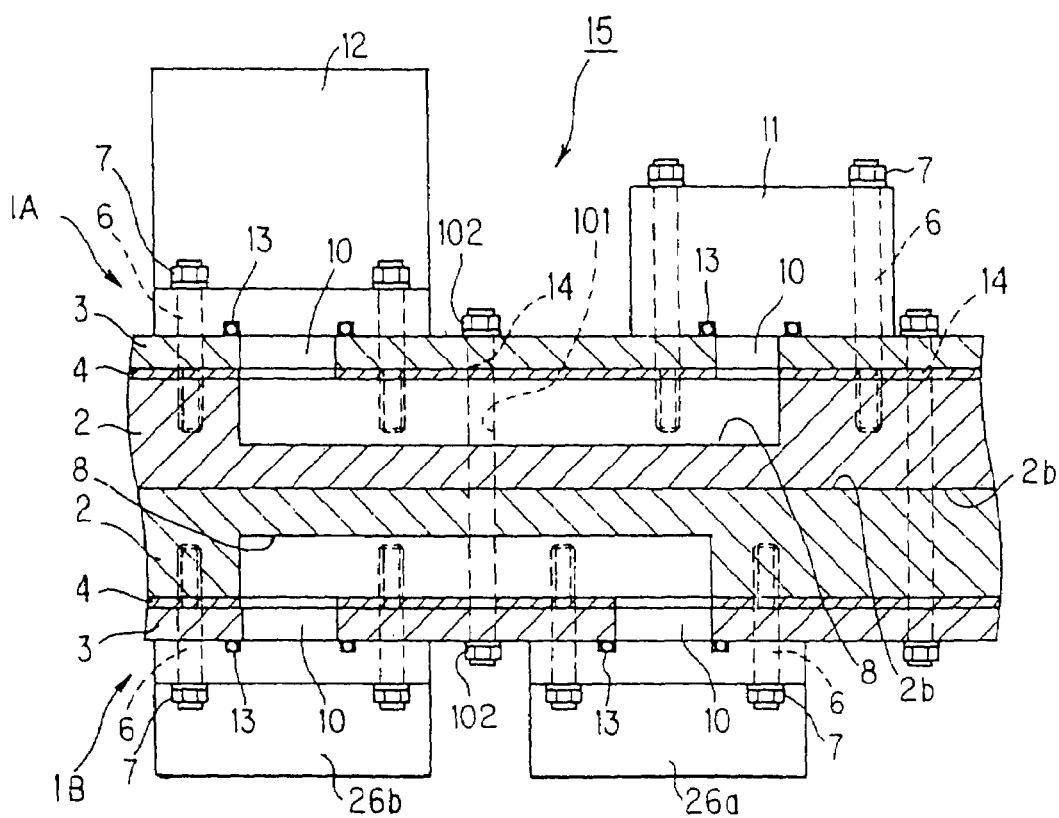
FIG. 7 is a configurational drawing of a three-dimensional module.

FIG. 7 shows an example of a three-dimensional module as an application of the above integrated piping plate. A three-dimensional module 15 shown in FIG. 7 is formed in a three-dimensional configuration by integrally fixing two integrated piping plates 1A and 1B in the following manner: Through bolts 14 are inserted through through-holes 101 piercing through the two integrated piping plates 1A and 1B (all of plates 2 and 3), and nuts 102 are screwed to opposite end portions of the through bolts 14, with the back surfaces of the two integrated piping plates 1A and 1B being superposed, namely, with a surface 2b of the plate 2 in the integrated piping plate 1A and a surface 2b of the plate 2 in the integrated piping plate 1B being superposed.

In FIG. 7, auxiliary components or auxiliary instruments 26a, 26b are disposed on the lower integrated piping plate 1B so as to be located behind instruments 11, 12 provided on the upper integrated piping plate 1A, whereby the three-dimensional structure is constructed. This makes marked downsizing possible.

In the integrated piping plate 1, if the instruments or components are arranged on the surface 2b of the plate 2, rather than on the surface 3a of the plate 3, it goes without saying that the surface 3a of the plate 3 becomes the back surface of the integrated piping plate 1, and this surface becomes a joining surface to be joined to the other integrated piping plate 1.

In FIG. 7, the two integrated piping plates 1A and 1B are integrated, but this manner is not restrictive. An arbitrary plurality of integrated piping plates, such as three or four integrated piping plates, may be integrated (made three-dimensional), with their back surfaces being superposed.

Figure 8:
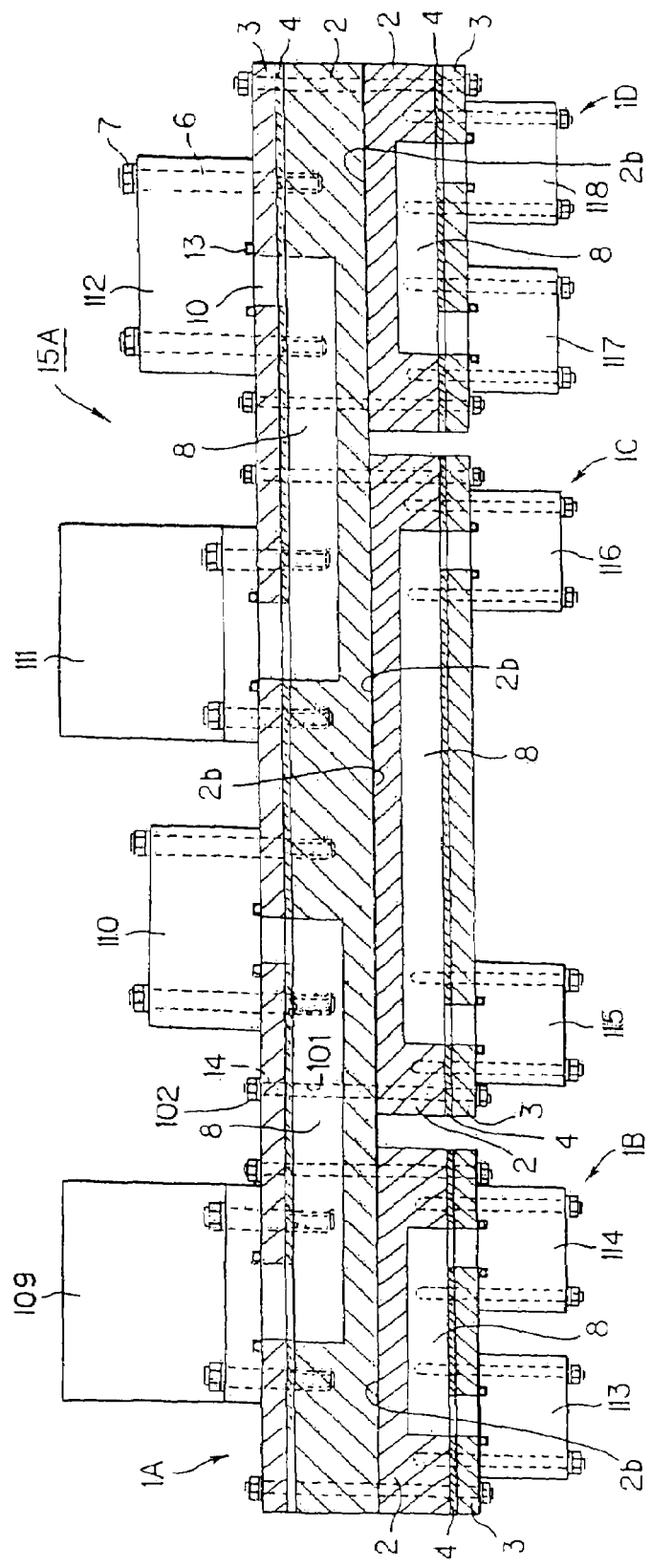
FIG. 8 is a configurational drawing of a three-dimensional module composed of four of the integrated piping plates.

In a three-dimensional module 15A shown in FIG. 8, for example, a relatively large integrated piping plate 1A having instruments 109, 110, 111, 112 disposed thereon is placed on an upper side in the drawing, while relatively small integrated piping plates 1B, 1C, 1D having instruments 113, 114, instruments 115, 116 and instruments 117, 118 disposed thereon are arranged on a lower side in the drawing. These four integrated piping plates 1A, 1B, 1C and 1D are integrally fixed, with back surfaces 2b's of the four integrated piping plates 1A, 1B, 1C and 1D being superposed, whereby the three-dimensional configuration is constituted.

Figure 9:
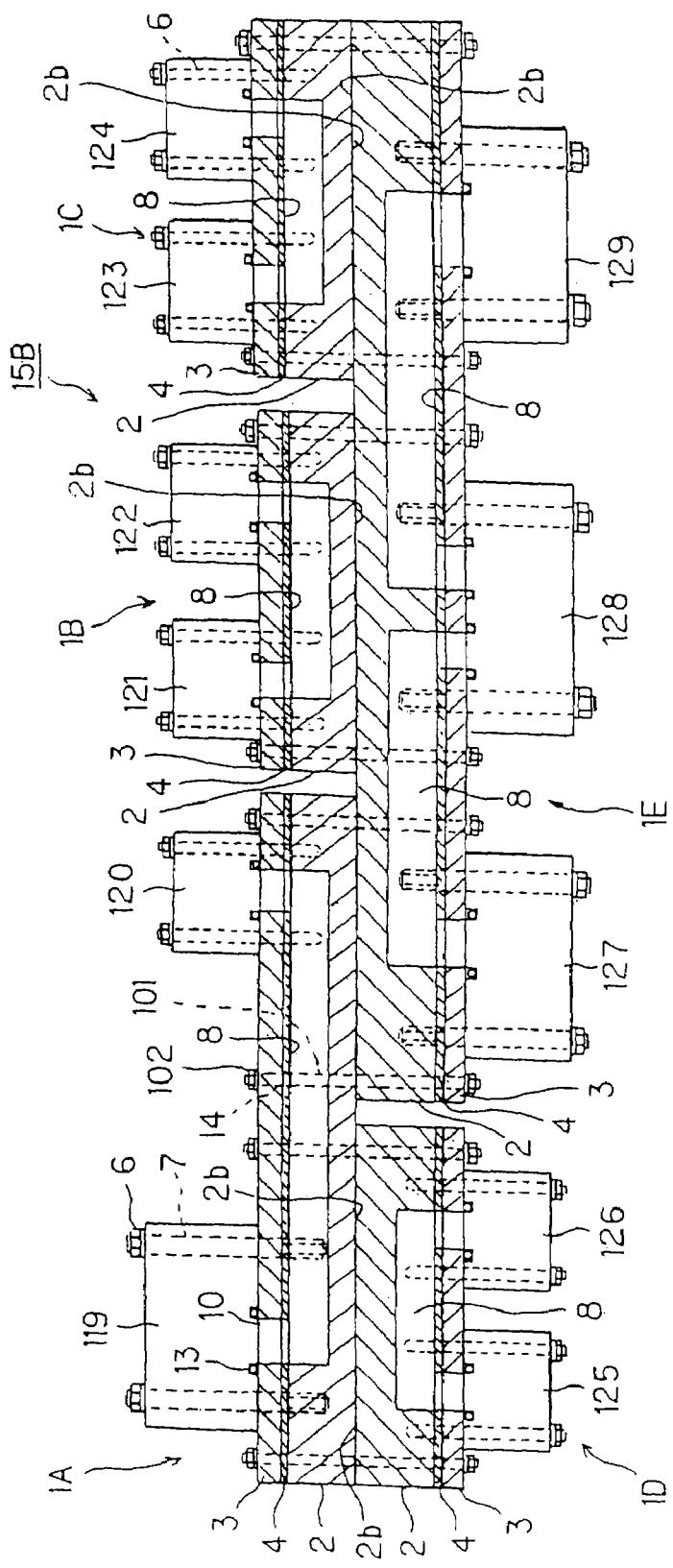
FIG. 9 is a configurational drawing of a three-dimensional module composed of five of the integrated piping plates.

In the case of a three-dimensional module 15B shown in FIG. 9, large and small integrated piping plates 1A, 1B and 1C having instruments 119, 120, instruments 121, 122, and instruments 123, 124 disposed thereon are placed on an upper side in the drawing, while large and small integrated piping plates 1D and 1E having instruments 125, 126, and instruments 127, 128, 129 disposed thereon are arranged on a lower side in the drawing. These five integrated piping plates 1A, 1B, 1C, 1D and 1E are integrally fixed, with back surfaces 2b's of the five integrated piping plates 1A, 1B, 1C, 1D and 1E being superposed, whereby the three-dimensional configuration is constituted.

Figure 10:
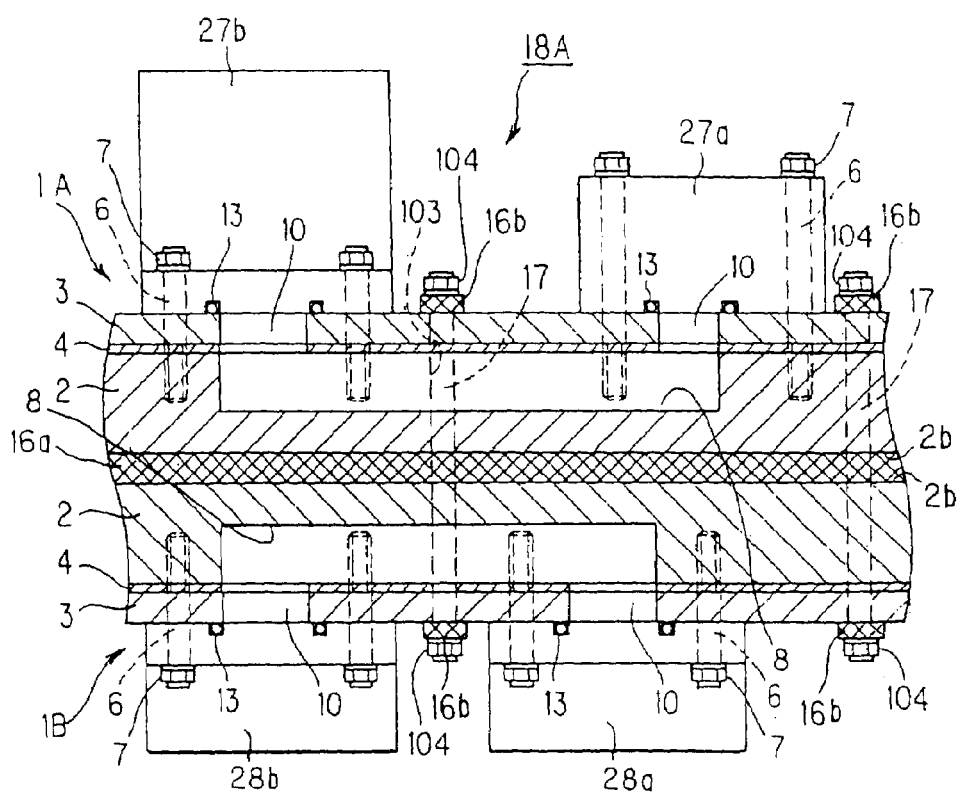
FIG. 10 is a configurational drawing of a heat insulating three-dimensional module having a heat insulating layer.

FIG. 10 shows an example of a heat insulating three-dimensional module as an application of the above integrated piping plate. An heat insulating three-dimensional module 18A shown in FIG. 10 is formed in a three-dimensional configuration by integrally fixing two integrated piping plates 1A and 1B in the following manner: Through bolts 17 are inserted through through-holes 103 piercing through the two integrated piping plates 1A and 1B (all of plates 2 and 3), and nuts 104 are screwed to opposite end portions of the through bolts 17 via heat insulators 16b's, with the back surfaces 2b's of the two integrated piping plates 1A and 1B (the surfaces of the plates 2 in the integrated piping plates 1A and 1B) being superposed, and with a suitable heat insulator 16a or the like being interposed between these back surfaces 2b's.

In this heat insulating three-dimensional module 18A, the two integrated piping plates 1A and 1B are bound together via the heat insulators 16a, 16b. Since there are such heat insulating layers, heats of high temperature instruments 27a, 27b disposed on the integrated piping plate 1A on the upper side in the drawing can be prevented from being transferred to the integrated piping plate 1B on the lower side in the drawing. Thus, other low temperature instruments 28a, 28b can be disposed on the integrated piping plate 1B in proximity to the high temperature instruments 27a, 27b disposed on the integrated piping plate 1A.

In this case as well, the two integrated piping plates 1A and 1B are not restrictive, but an arbitrary plurality of integrated piping plates can be integrated. For example, a heat insulator may be interposed between the back surfaces 2b's of the integrated piping plate 1A and the integrated piping plates 1B, 1C, 1D shown in FIG. 8, or a heat insulator may be interposed between the back surfaces 2b's of the integrated piping plates 1A, 1B, 1C and the integrated piping plates 1D, 1E shown in FIG. 9, although these modes are not shown.

Figure 11:
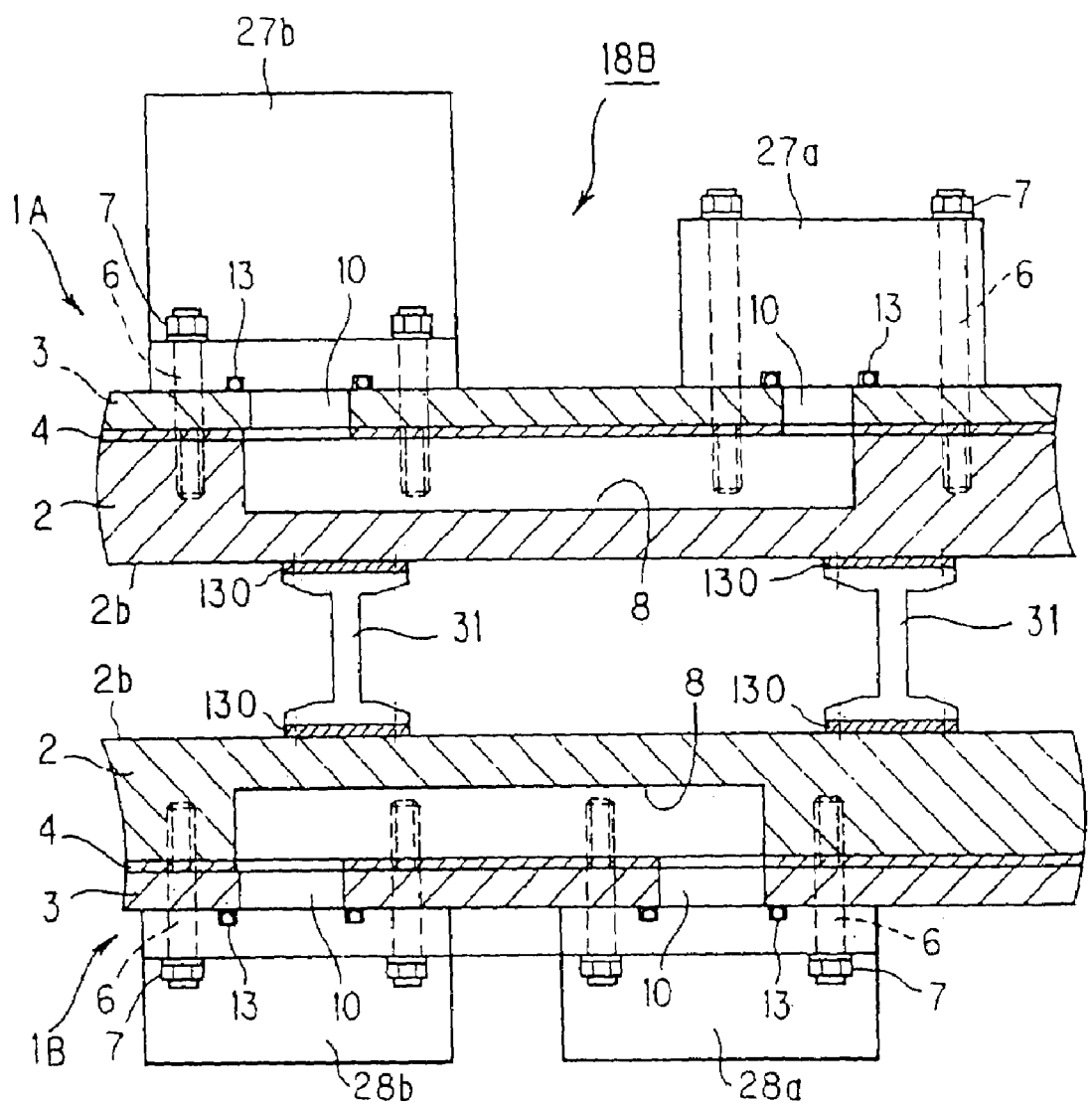
FIG. 11 is a configurational drawing of a heat insulating three-dimensional module having the integrated piping plate on a high temperature side and the integrated piping plate on a low temperature side separated from each other.

FIG. 11 shows an example of another heat insulating three-dimensional module as an application of the above integrated piping plate 1. An heat insulating three-dimensional module 18B shown in FIG. 11 is formed in a three-dimensional configuration by integrally connecting and fixing two integrated piping plates 1A and 1B by means of separators 31 of a suitable length, with the back surfaces 2b's of the two integrated piping plates 1A and 1B (the surfaces of the plates 2 in the integrated piping plates 1A and 1B) being superposed, and with the separators 31 being interposed between these back surfaces 2b's. Also, heat insulators 130 are interposed between the separator 31 and the integrated piping plates 1A, 1B.

In this heat insulating three-dimensional module 18B, a suitable spacing is maintained between the two integrated piping plates 1A and 1B by the separators 31, whereby a high temperature portion (high temperature instruments 27a, 27b) and a low temperature portion (low temperature instruments 28a, 28b) are thermally shut off from each other, and the apparatus can be downsized in a three-dimensional configuration. Moreover, a heat insulating effect can be further enhanced by interposing the heat insulators 130 between the integrated piping plates 1A, 1B and the separators 31.

That is, if a sufficient heat insulating effect is obtained by mere interposition of the separators 31, it is not absolutely necessary to provide the heat insulators 130. However, if it is necessary to cut off heat transmitted through the separators 31, the heat insulators 130 are interposed between the separators 31 and the integrated piping plates 1A, 1B. Alternatively, the heat insulators 130 may be provided either between the separators 31 and the integrated piping plate 1A or between the separators 31 and the integrated piping plate 1B.

Figure 12:
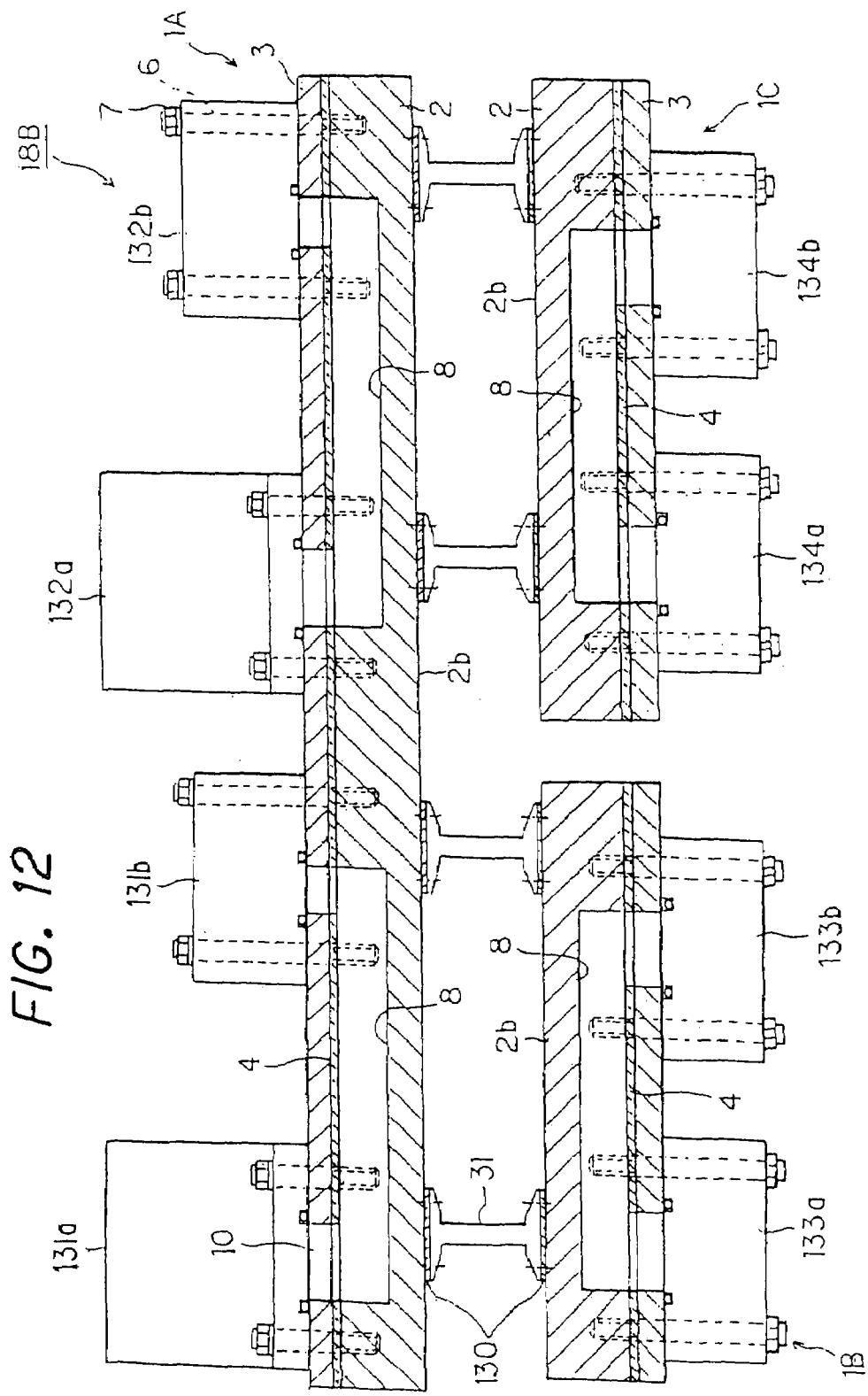
FIG. 12 is a configurational drawing of a heat insulating three-dimensional module composed of three of the integrated piping plates.

In this case as well, the two integrated piping plates 1A and 1B are not restrictive, but an arbitrary plurality of integrated piping plates can be integrated. For example, in the case of a heat insulating three-dimensional module 18B shown in FIG. 12, a relatively large integrated piping plate 1A having high temperature instruments 131a, 131b, 132a, 132b disposed thereon is placed on an upper side in the drawing, while relatively small integrated piping plates 1B and 1C having low temperature instruments 133a, 133b and low temperature instruments 134a, 134b disposed thereon are placed on a lower side in the drawing. The three integrated piping plates 1A, 1B and 1C are formed into a three-dimensional configuration by integrally connecting and fixing these integrated piping plates by separators 31, with the back surfaces 2b's of the three integrated piping plates 1A, 1B and 1C being superposed, and with the separators 31 being interposed between the back surfaces 2b's.

Figure 13A:
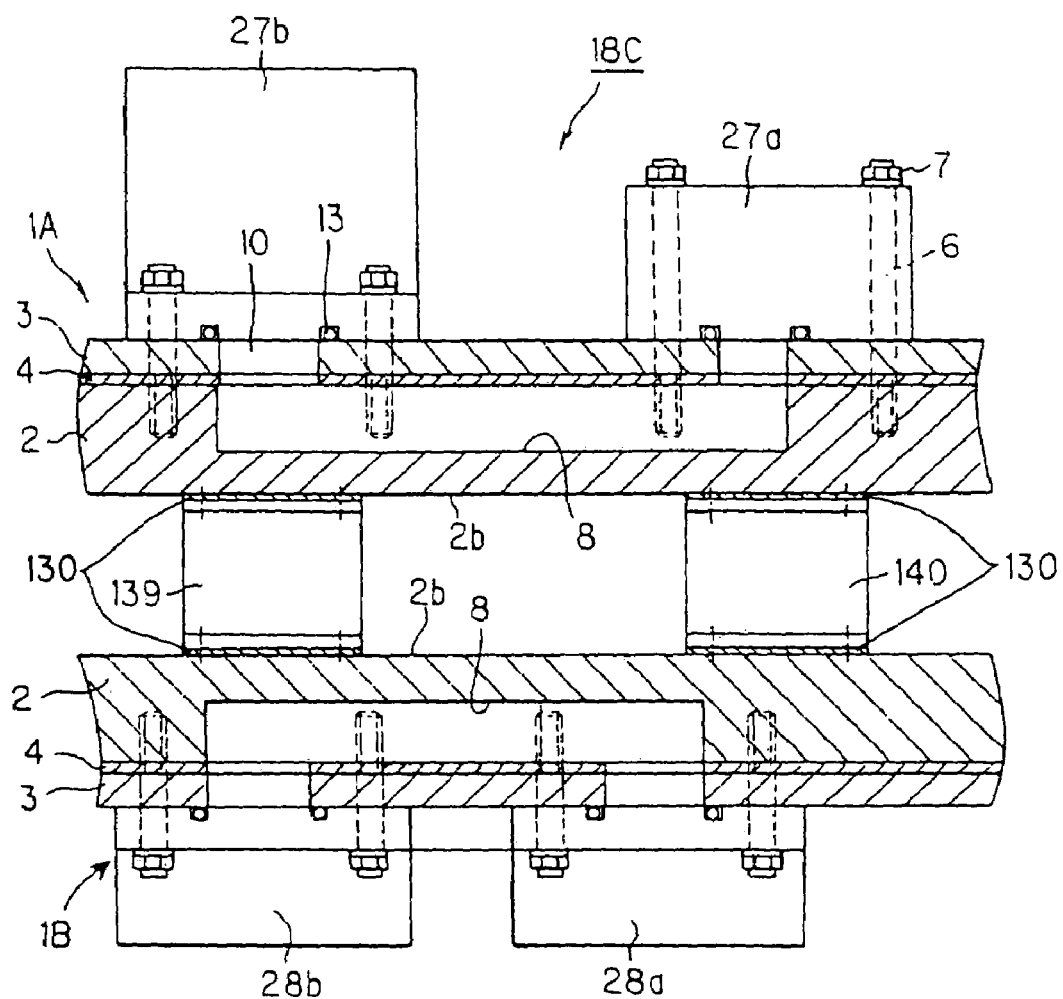
FIG. 13A is a configurational drawing of a three-dimensional module having instruments interposed between the integrated piping plates.
Figure 13B:
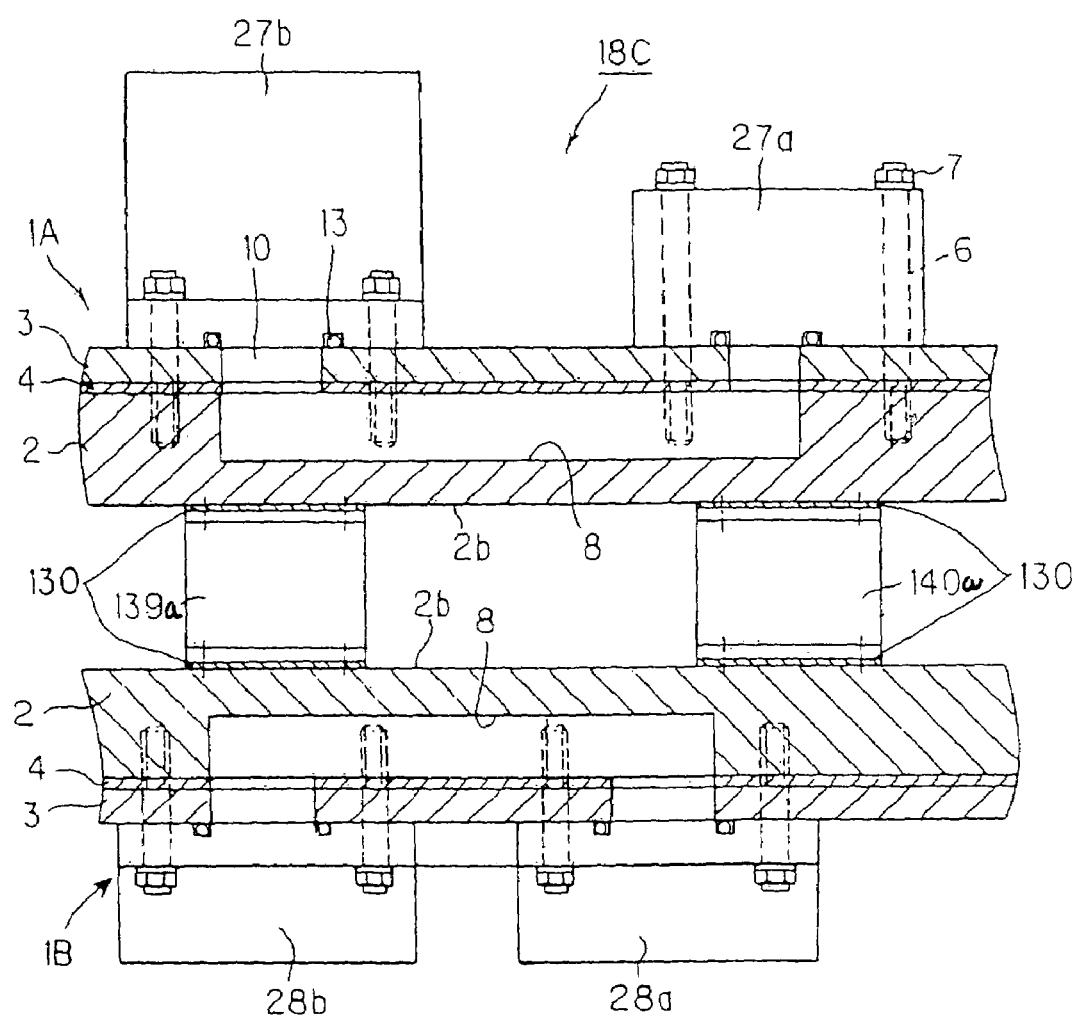
FIG. 13B is a configurational drawing of a three-dimensional module having components interposed between the integrated piping plates.

FIG. 13A shows an example in which instruments, instead of the separators, are interposed between integrated piping plates. In a three-dimensional module 18C shown in FIG. 13, instruments 139, 140 are interposed, instead of the separators 31 in the three-dimensional module 18B shown in FIG. 11, between the back surfaces 2b's of the integrated piping plates 1A and 1B. These instruments 139 and 140 may also be connected together by a groove provided in the integrated piping plate 1A or integrated piping plate 1B, although this mode is not shown. FIG. 13B shows an example in which components 139a and 140a, instead of instruments 139, 140, are interposed between integrated piping plates.

In this case as well, the integrated piping plates 1A and 1B are separated from each other by the instruments 139 and 140, as in the case of interposition of the separators 31. Thus, a heat insulating effect can be expected. A marked heat insulating effect is obtained, particularly by interposing heat insulators 130 between the instruments 139, 140 and the integrated piping plates 1A, 1B, as shown in the drawing. In this case, moreover, the spacing between the integrated piping plates 1A and 1B is effectively utilized by arranging the instruments 139, 140 between the integrated piping plates 1A and 1B. Thus, the apparatus can be further downsized.

In this case as well, the two integrated piping plates 1A and 1B are not restrictive, but an arbitrary plurality of integrated piping plates can be integrated. For example, in the heat insulating three-dimensional module 18B shown in FIG. 12, constituent instruments or components may be interposed in place of the separators 31.

FIG. 14 shows an example of a plurality of integrated piping plates disposed on the same rest, as an application of the integrated piping plate. In FIG. 14, an integrated piping plate 1A having high temperature instruments 27a, 27b disposed thereon, and an integrated piping plate 1B having low temperature instruments 28a, 28b disposed thereon are disposed on the same rest 32 with a suitable heat insulating spacing L. Fixing of the integrated piping plates 1A, 1B to the rest 32 is performed by suitable fixing means, such as bolts or welding (not shown). A heat insulator 145 is interposed between the integrated piping plates 1A, 1B and the rest 32.

By so disposing the two integrated piping plates 1A and 1B with the heat insulating spacing L maintained, these integrated piping plates 1 can ignore (prevent) thermal influence from each other. By interposing the heat insulator 145 between the integrated piping plates 1A, 1B and the rest 32, a heat insulating effect can be further enhanced.

In this case as well, the two integrated piping plates 1A and 1B are not restrictive, but an arbitrary plurality of integrated piping plates can be disposed on the same rest. For instance, in an example shown in FIG. 15, four integrated piping plates 1A, 1B, 1C and 1D, namely, the integrated piping plate 1A having high temperature instruments 141a, 141b disposed thereon, the integrated piping plate 1B having low temperature instruments 142a, 142b disposed thereon, the integrated piping plate 1C having high temperature instruments 143a, 143b disposed thereon, and the integrated piping plate 1D having low temperature instruments 144a, 144b disposed thereon are arranged on the same rest 32 at heat insulating intervals of L.

Figure 17:
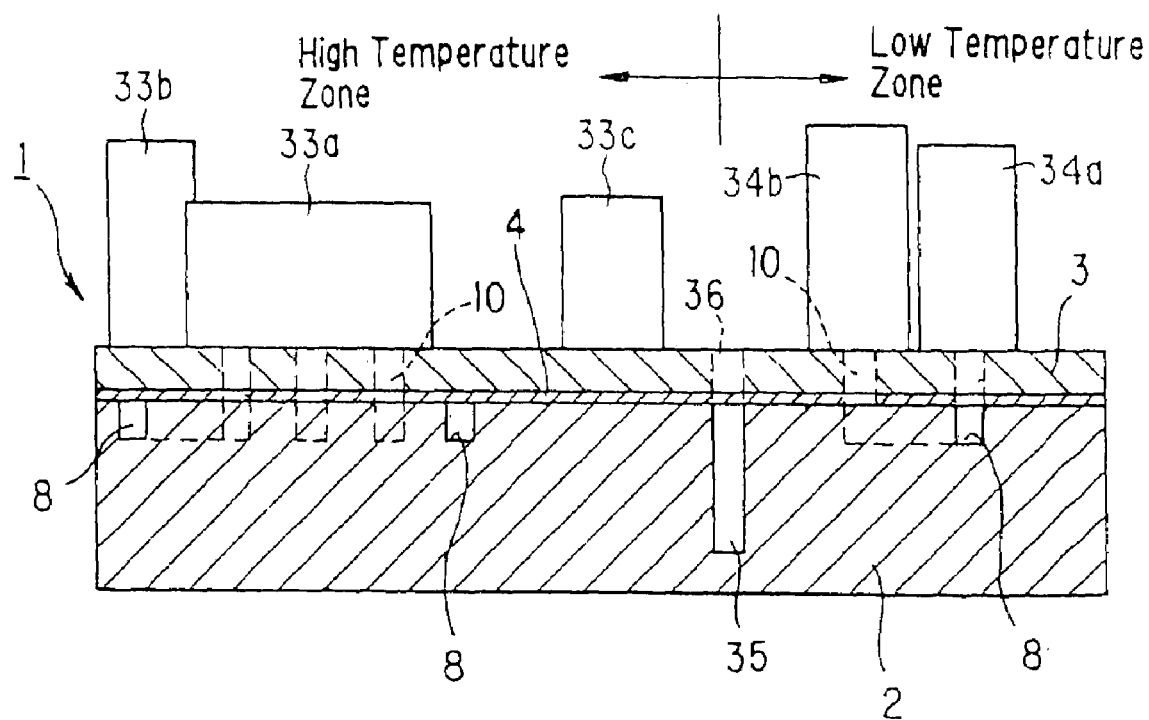
FIG. 17 is a sectional view taken on line B-B of FIG. 16.

FIGS. 16 and 17 show an example in which high temperature instruments and low temperature instruments are disposed on the same integrated piping plate. With an integrated piping plate 1 shown in FIGS. 16 and 17, a heat shutoff groove 35 is provided between a high temperature zone where high temperature instruments or components, such as high temperature instruments 33a, 33b, 33c, are disposed, and a low temperature zone where low temperature instruments or components, such as low temperature instruments 34a, 34b, are disposed, on the same integrated piping plate 1. The heat shutoff groove 35 is formed in a plate 2, and communication holes 36 communicating with opposite end portions of the heat shutoff groove 35 are formed in a plate 3.

According to this integrated piping plate 1, the heat shutoff groove 35 forms a heat barrier by air, presenting a high resistance to heat conduction from the high temperature zone to the low temperature zone. Thus, even when the low temperature instruments 34a, 34b are disposed in proximity to the high temperature instruments 33a, 33b, 33c on the same integrated piping plate 1, no thermal influence is exerted.

Filling of a suitable heat insulator into the heat shutoff groove 35 is also effective means for preventing thermal influence.

To heighten the effect of the heat shutoff groove 35, there may be a configuration in which a refrigerant, such as cooling air or cooling water, is flowed into the heat shutoff groove 35 by refrigerant reflux means (not shown) from one of the communication holes 36 toward the other communication hole 36 among the communication holes 36 provided in the opposite end portions of the heat shutoff groove 35 to cool the heat shutoff groove 35.

Figure 18:
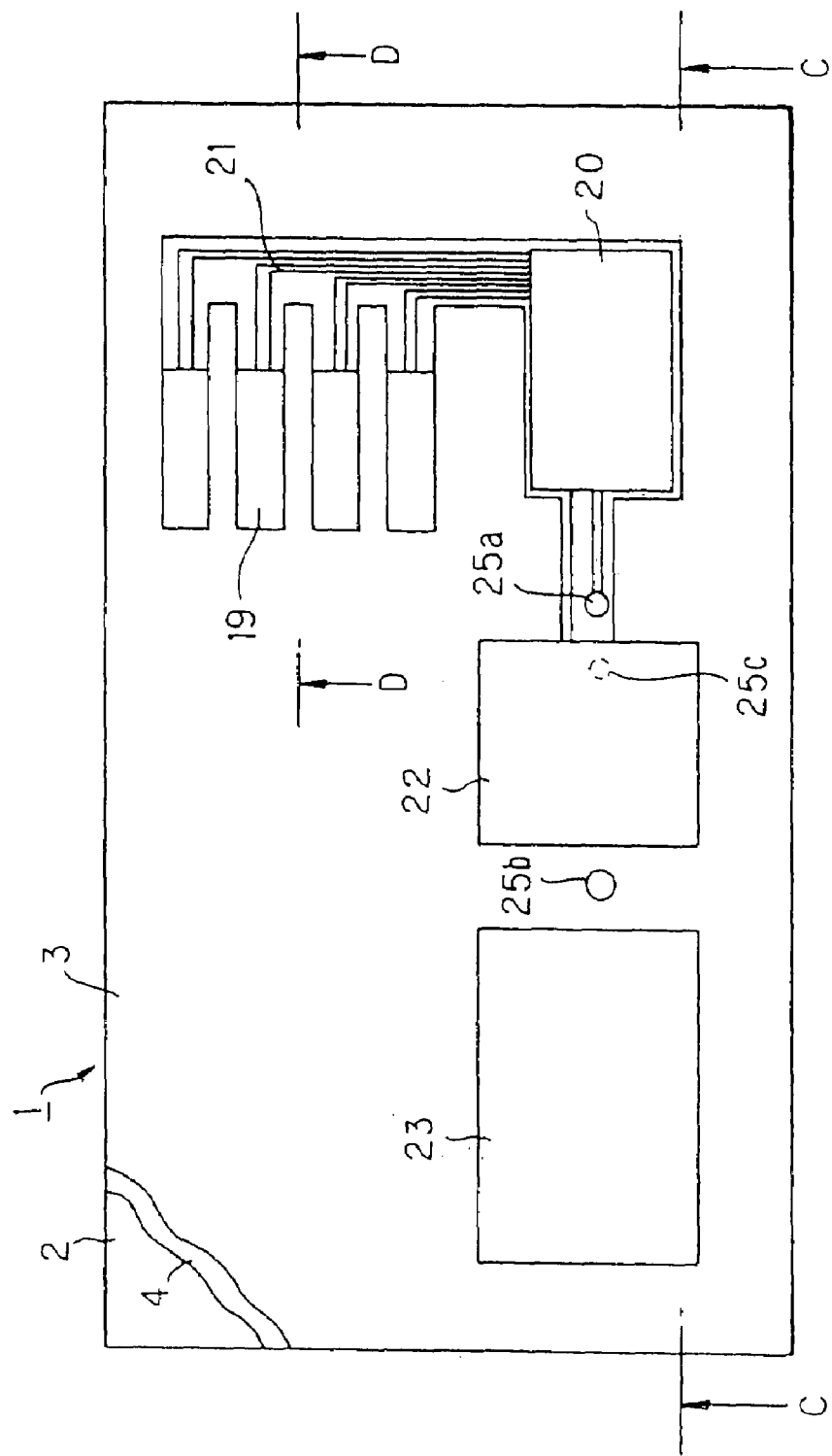
FIG. 18 is a configurational drawing of the integrated piping plate incorporating control instruments.
Figure 19:
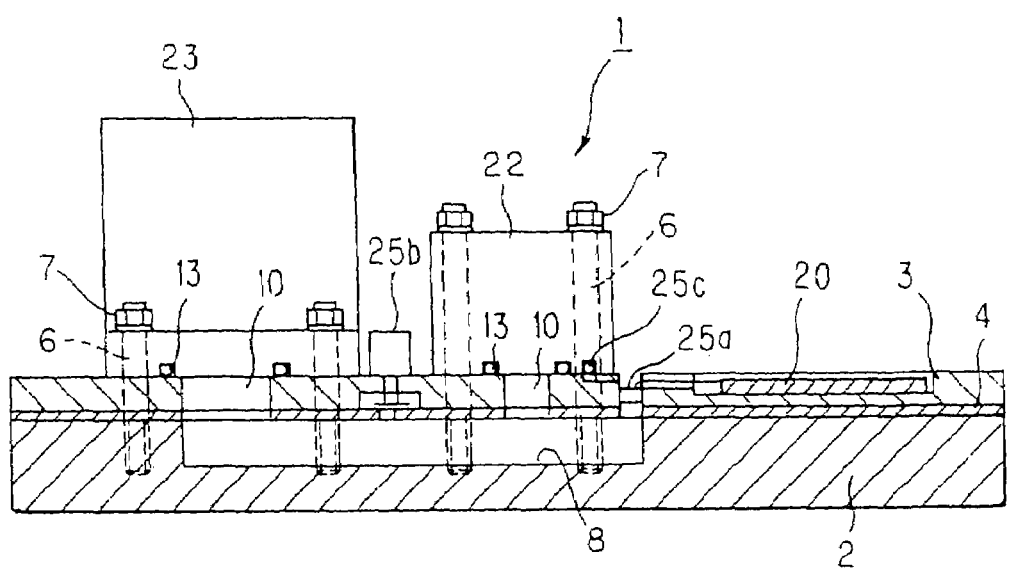
FIG. 19 is a sectional view taken on line C-C of FIG. 18.
Figure 20:
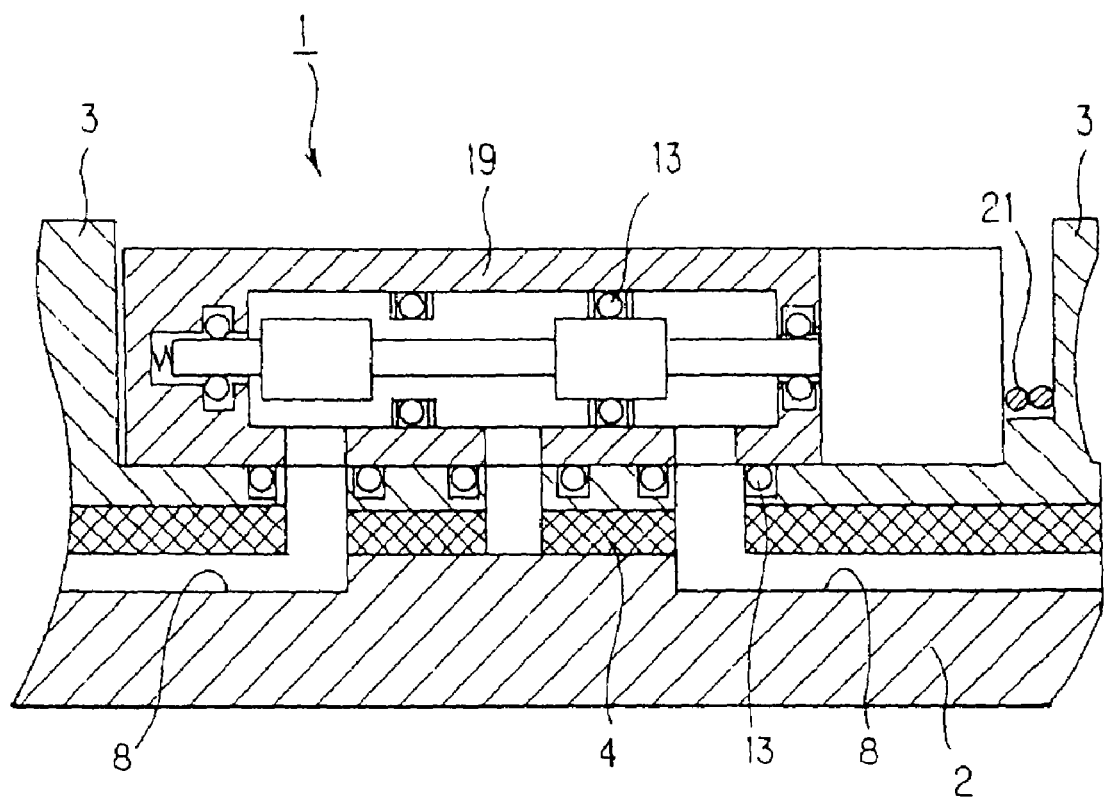
FIG. 20 is a sectional view taken on line D-D of FIG. 18.

FIGS. 18, 19 and 20 show an example in which components, such as electromagnetic valves 19, a control instrument 20, such as a printed chip, and electrical wiring 21 are built into an integrated piping plate to achieve a saving in space.

As shown in these drawings, a C instrument 22 and a D instrument 23 disposed on the integrated piping plate 1 are connected by a groove 8 provided in a plate 2. A fluid flowing through the groove 8 is detected by a pressure sensor 25a buried in a plate 3, detection signals from the pressure sensor 25a are transferred to the control instrument 20 embedded in the plate 3, and control signals from the control instrument 20 are transmitted to the electromagnetic valves 19 buried in the plate 3 via the electrical wiring 21 buried in the plate 3, thereby actuating the electromagnetic valves 19. Similarly, a flow sensor 25b for detecting the flow rate of the fluid flowing through the groove 8, and a temperature sensor 25c for detecting the temperature of the fluid are also buried in the plate 3, and detection signals from these sensors 25b and 25c are also taken into the control instrument 20.

In this manner, the electromagnetic valves 19, control instrument 20 and electrical wiring 21 are built into the integrated piping plate 1, whereby a further saving in space can be achieved. Electrical components, such as switches, may also be incorporated into the integrated piping plate 1. As the control device 20, a printed chip (printed circuit board), which can be buried in the plate 3, may be used. Some components can be incorporated into the plate 2. In this case, the plate 3 should have an opening for the purpose of assembly, inspection, etc. of the components. That is, the instruments, components, control instrument, or electrical wiring constituting the apparatus may be built into one of or both of the plates 2 and 3.

In the fuel cell power generation system or the like, as stated earlier, fluids flowing the grooves 8 as channels come in wide varieties of types, such as a high temperature fluid, a low temperature fluid, and a fluid containing a corrosive substance. Of them, the fluid containing a corrosive substance (hereinafter referred to as "a corrosive fluid") requires extra care for the channels. Thus, as explained based on FIGS. 4A and 4B, the surfaces of the grooves 8 are coated with or lined with fluorocarbon resin, such as polytetrafluoroethylene, or covered with an aluminum oxide film to form a corrosion-proof layer 29, thereby making the grooves 8 corrosion resistant to the corrosive fluid.

Figure 21:
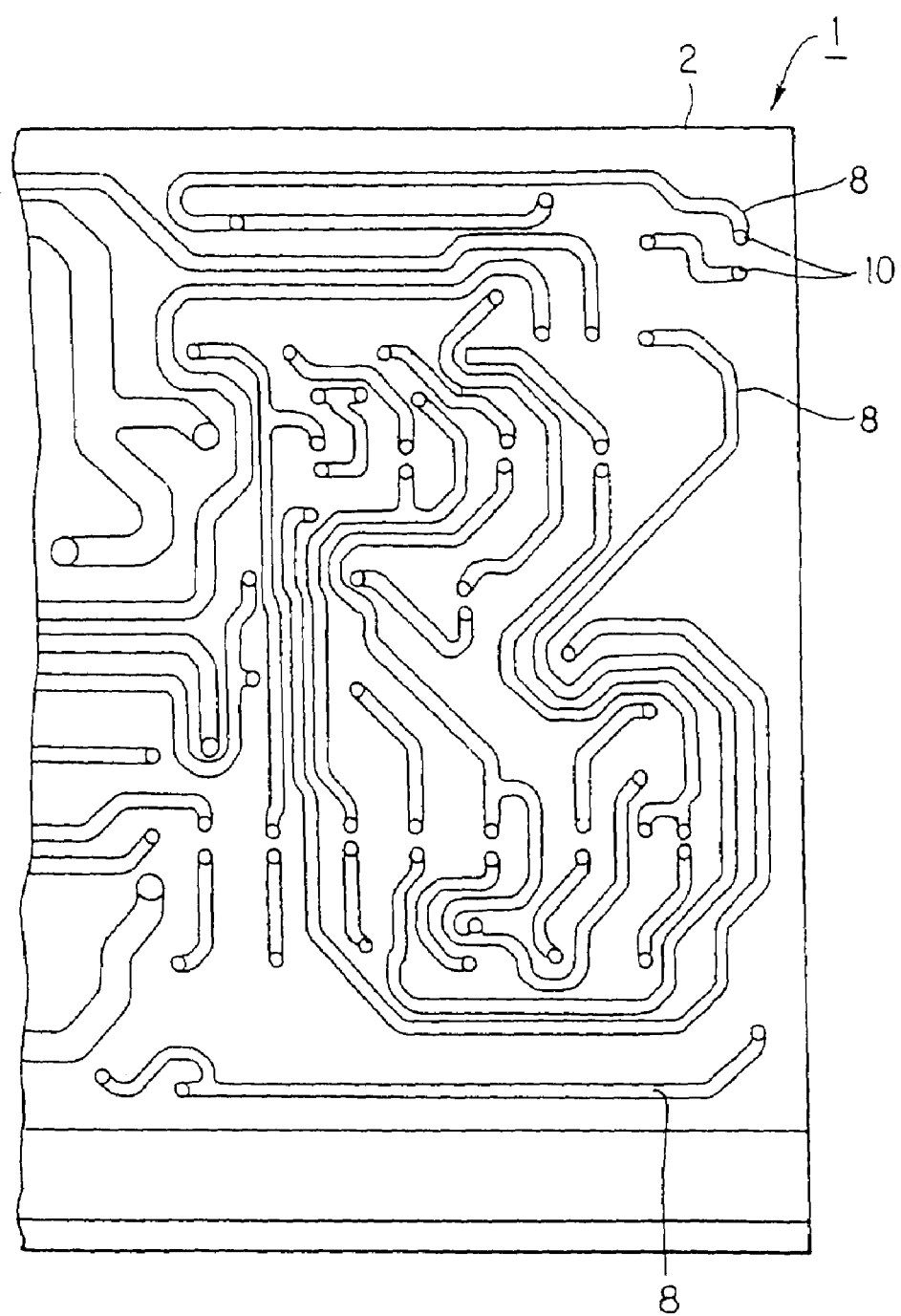
FIG. 21 is a plan view showing an example of the integrated piping plate having many grooves.
Figure 49:
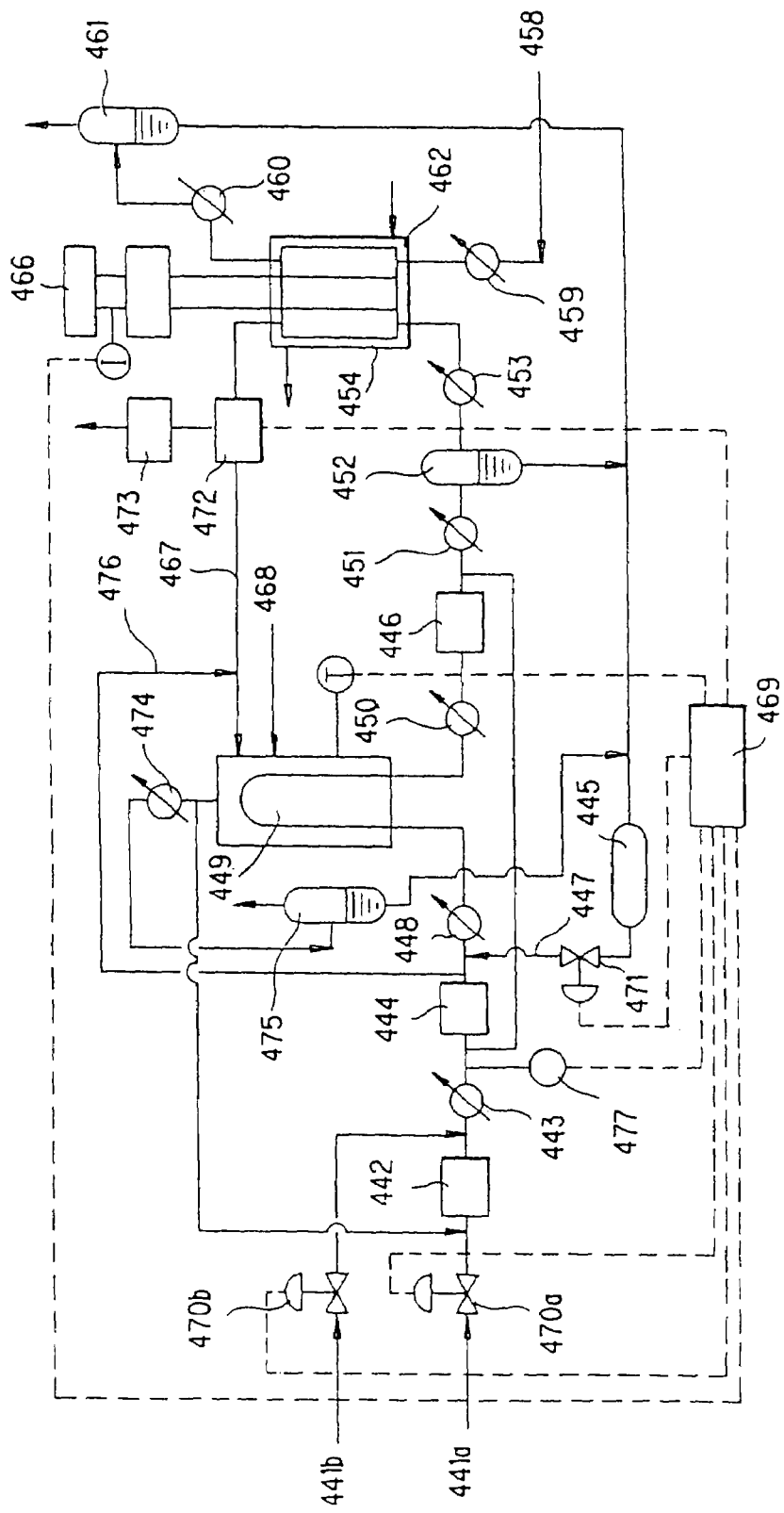
FIG. 49 is a system diagram of a general fuel cell power generation system.
Figure 50A:
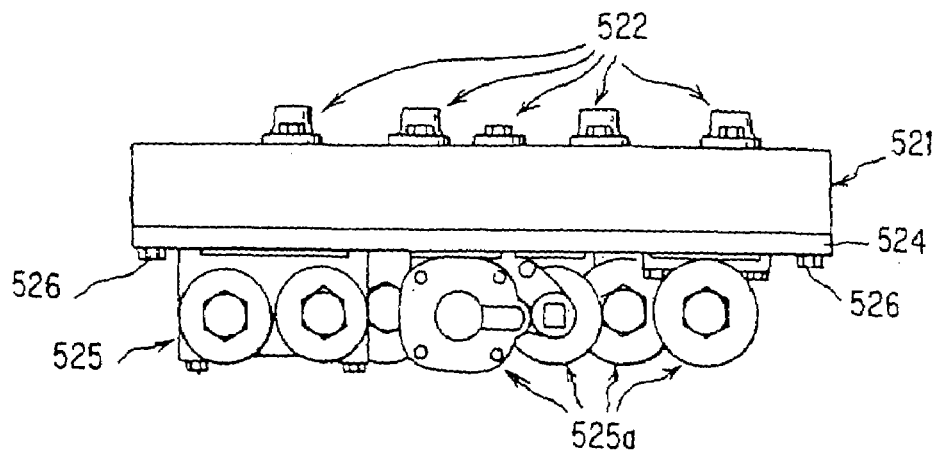
FIGS. 50(A) and 50(B) are configurational drawings of a conventional integrated piping plate.
Figure 50B:
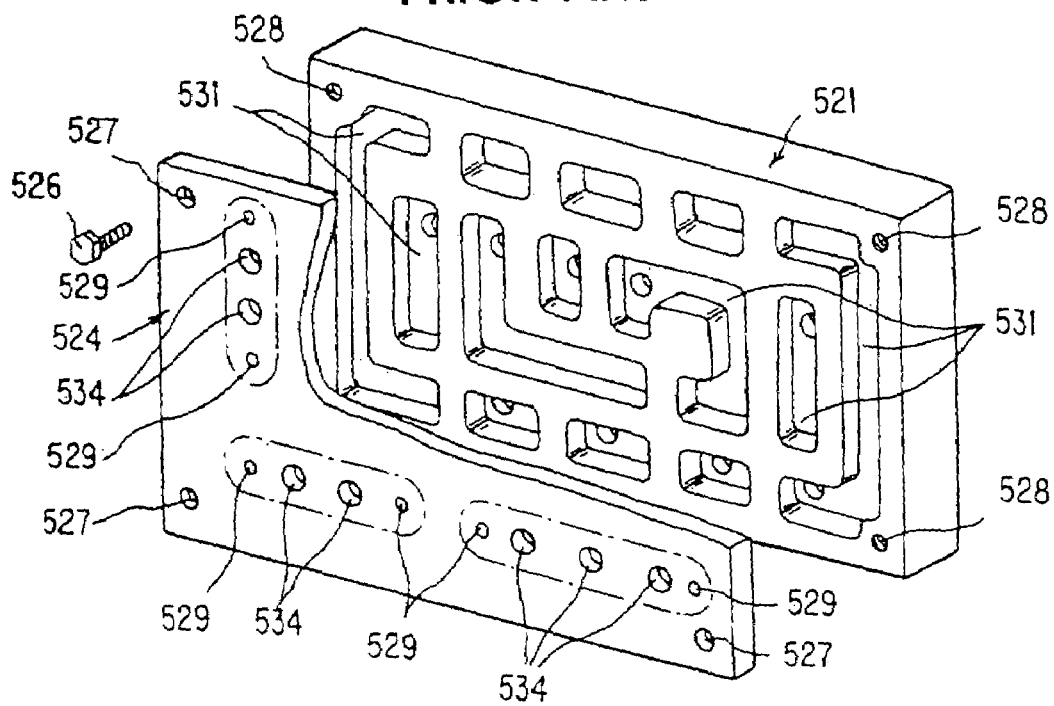

However, this technique for providing the corrosion-proof layer may be difficult to apply, if the arrangement of the grooves 8 (channels) is complicated. That is, in a unit of the fuel cell power generation system composed of many instruments and components as shown in FIG. 49, these numerous instruments and components are connected by the grooves 8, or small instruments, such as valves, electrical components, such as sensors or switches, and electrical wiring are assembled into the plate. Thus, as shown in FIG. 21, the number of the grooves 8 is very large, and some grooves 8 (channels) need to be bypassed in order to prevent interference of the grooves 8 with each other. Hence, many grooves 8 (channels) often have to run complicatedly like a maze.

The work of applying fluorocarbon resin coating, fluorocarbon resin lining, or aluminum oxide film covering to such grooves 8 requires advanced machining techniques, and huge man-hours for machining. Furthermore, if the grooves 8 (channels) are in a complicated shape, the accuracy and reliability of the product may be questioned. In such cases, it is effective to provide corrosion resistant piping, instead of forming the corrosion-proof layer 29, in the grooves 8.

Figure 22:
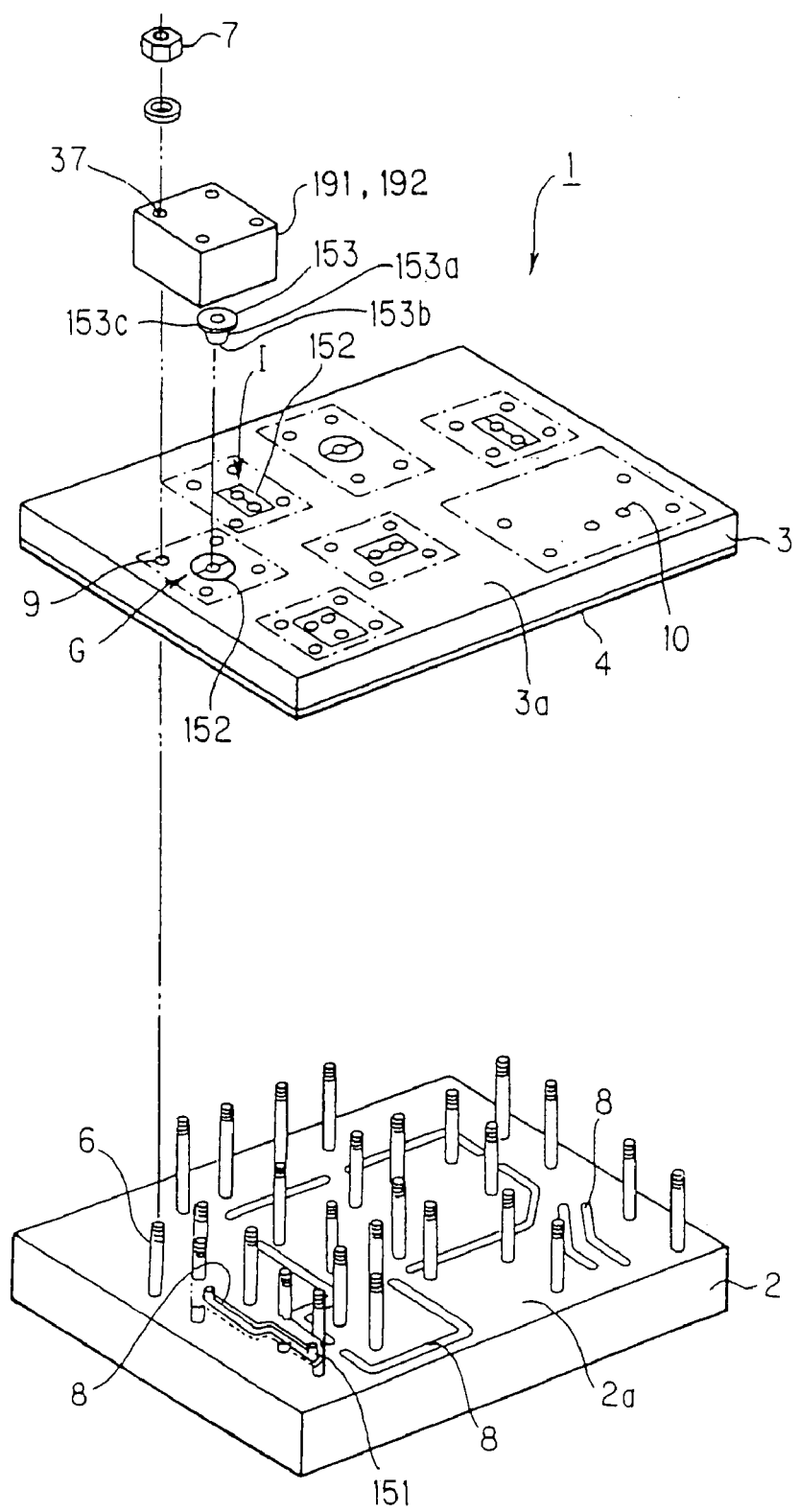
FIG. 22 is a configurational drawing of the integrated piping plate provided with corrosion resistant piping.
Figure 23A:
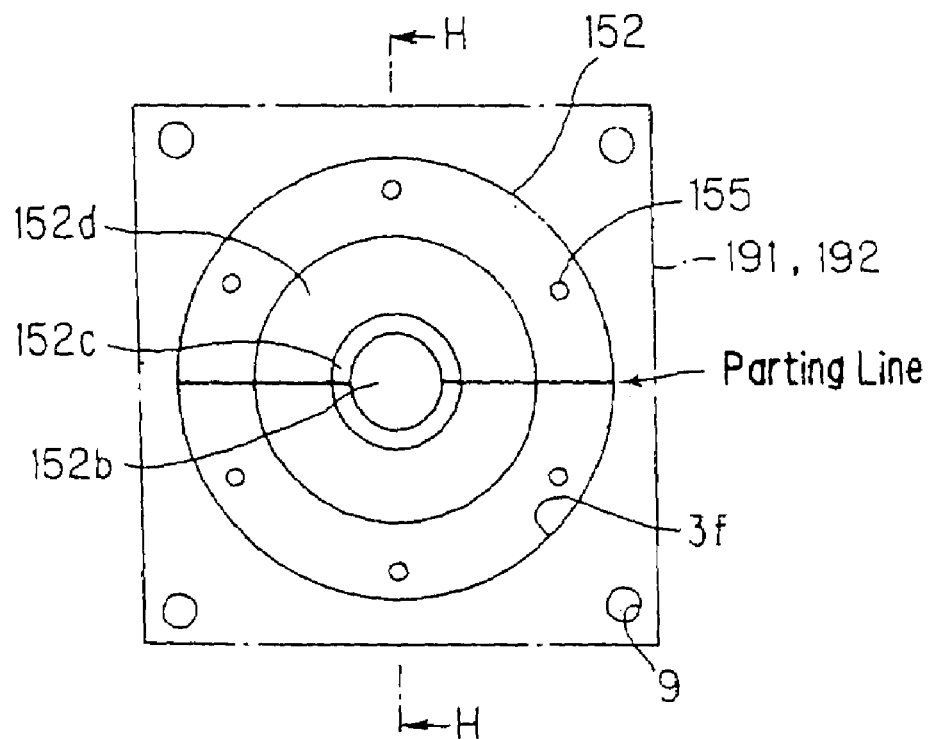
FIG. 23A is an enlarged plan view of a G portion in FIG. 22.
Figure 23B:
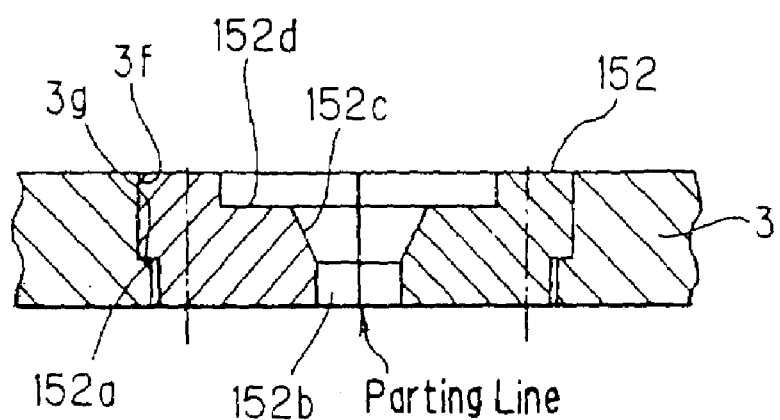
FIG. 23B is a sectional view taken on line H-H of FIG. 23A.

An integrated piping plate 1 shown in FIG. 22 is constituted by joining a plate 2 and a plate 3 by an adhesive 4 or the like. Grooves 8 are machined in a joining surface between the plate 2 and the plate 3 (an upper surface 2a of the plate 2 in the illustrated example). Various constituent instruments 191 and components 192 (also indicated by one-dot chain lines in FIG. 22) constituting a fuel cell power generation system are arranged on an upper surface 3a of the plate 3. These instruments 191 and components 192 are connected to the grooves 8 by communication holes 10 formed in the plate 3. By so doing, the instruments 191 and components 192 are tied by the grooves 8. The spacing between the instruments 191, components 192 and the plate 3 is sealed with a sealing material such as an O ring (not shown). These features are the same as for the integrated piping plate 1 shown in FIG. 1.

In the integrated piping plate 1 shown in FIG. 22, the sectional areas of the grooves 8 for flowing corrosive fluids are larger than the required sectional areas for direct flowing of the fluid through the grooves 8, and corrosion resistant piping 151, such as a fluorocarbon resin pipe of polytetrafluoroethylene or the like, is accommodated in the grooves 8 to use the corrosion resistant piping 151 as a channel for the corrosive fluid. The corrosion resistant piping 151 may be not only a fluorocarbon resin pipe, but piping made of other corrosion resistant material (such as polyvinyl chloride, synthetic rubber, or other synthetic resin) compatible with the properties of the corrosive fluid. However, the corrosion resistant piping 151 may be inserted into predetermined grooves 8 after integration of the integrated piping plate 1, or the corrosion resistant piping 151 may be replaced. Thus, it is preferred to select a flexible material as the material for the corrosion resistant piping 151.

Opposite end portions of the corrosion resistant piping 151 accommodated in the groove 8 are joined to a bearer 152 as a first joining member, and a top-shaped component 153 as a second joining member. The top-shaped component 153 has a truncated cone-shaped body portion (joining portion) 153b having a conical surface 153a formed on an outer peripheral surface thereof, and has a head portion 153c on the body portion 153b. The entire shape of the top-shaped component 153 is like a top.

Figure 24A:
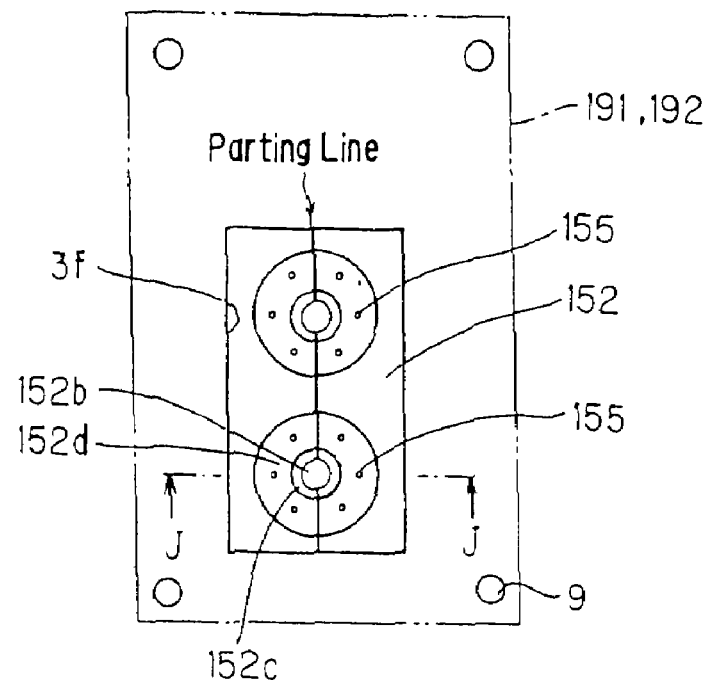
FIG. 24A is an enlarged plan view of an I portion in FIG. 22.
Figure 24B:
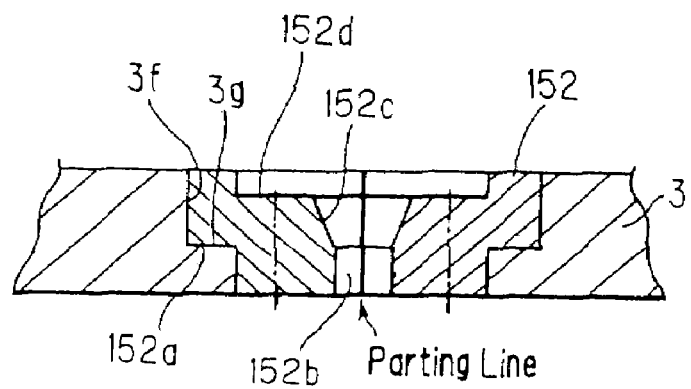
FIG. 24B is a sectional view taken on line J-J of FIG. 24A.

As shown in FIGS. 23A, 23B, 24A and 24B, there are a case in which one bearer 152 is used on one corrosion resistant piping 151 (FIGS. 23A, 23B), and a case in which one bearer 152 is used on a plurality of (two in the illustrated example) lines of corrosion resistant piping 151 (FIGS. 24A, 24B). These bearers 152 are each fitted into a fitting hole 3f provided in a plate 3, and fixed to a plate 2 by screws 155. A stepped portion 152a is formed on the outer peripheral surface of the bearer 152, and this stepped portion 152a contacts a stepped portion 3g formed in the inner peripheral surface of the fitting hole 3f. A through-hole 152b is formed at the center of the bearer 152, and a conical surface 152c is formed in part of the inner peripheral surface of the through-hole 152b. Further, a stepped portion 152d is formed above the conical surface 152c by further widening the inner peripheral surface of the through-hole 152b. The bearer 152 is halved at a position of a parting line.

Figure 25:
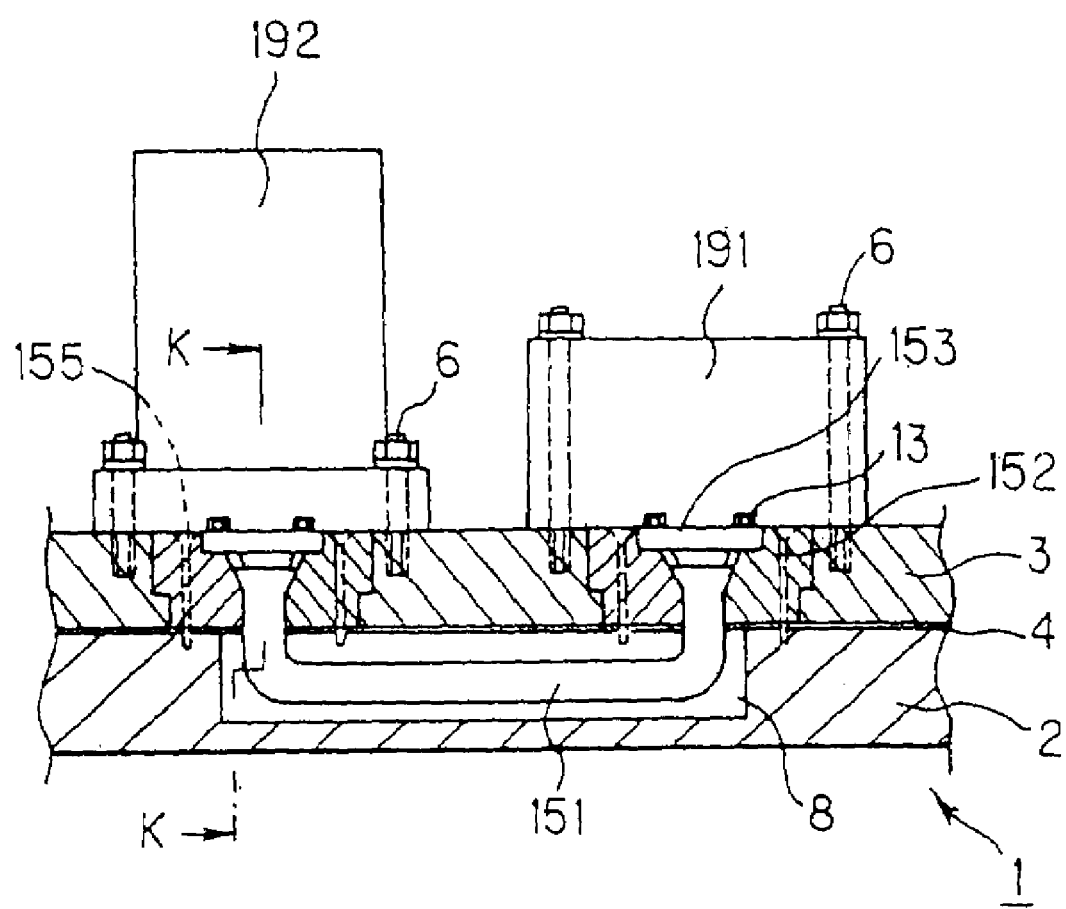
FIG. 25 is a sectional structural drawing of the above integrated piping plate.
Figure 26:
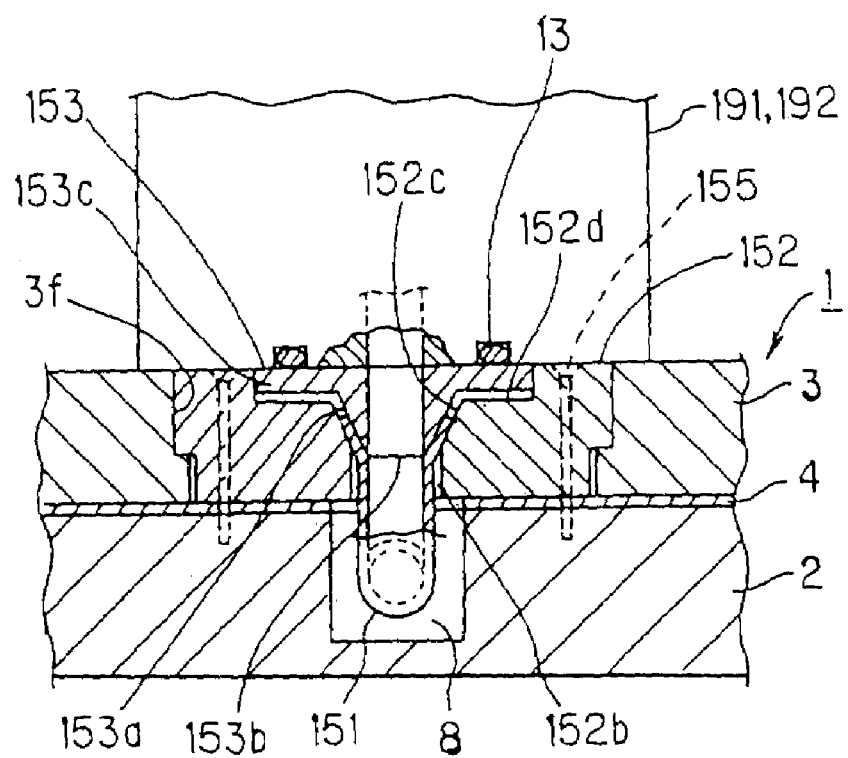
FIG. 26 is an enlarged sectional view taken on line K-K of FIG. 25.

The opposite end portions of the corrosion resistant piping 151 are each joined (fixed) by the bearer 152 and the top-shaped component 153, as shown in FIGS. 25 and 26. That is, the end portion of the corrosion resistant piping 151 is inserted into the through-hole 152b of the bearer 152, and the body portion 153b of the top-shaped component 153 is inserted, under pressure, into the end portion of the corrosion resistant piping 151. By so doing, the end portion of the corrosion resistant piping 151 is broadened by the conical surface 153a of the body portion 153b, and the conical surface 153a of the body portion 153b is fitted to the conical surface 152c of the bearer 152. As a result, the end portion of the corrosion resistant piping 151 is joined (fixed), with its outer diameter side being supported by the conical surface 152c of the bearer 152, and its inner diameter side being supported by the conical surface 153a of the top-shaped component 153. On this occasion, the head portion 153c of the top-shaped component 153 is fitted onto the stepped portion 152d of the bearer 152. Thus, the corrosive fluid flows through the corrosion resistant piping 151 between the instrument 191 and the component 192. At this time, the corrosive fluid can be prevented from leaking from the end of the corrosion resistant piping 151.

Figure 27:
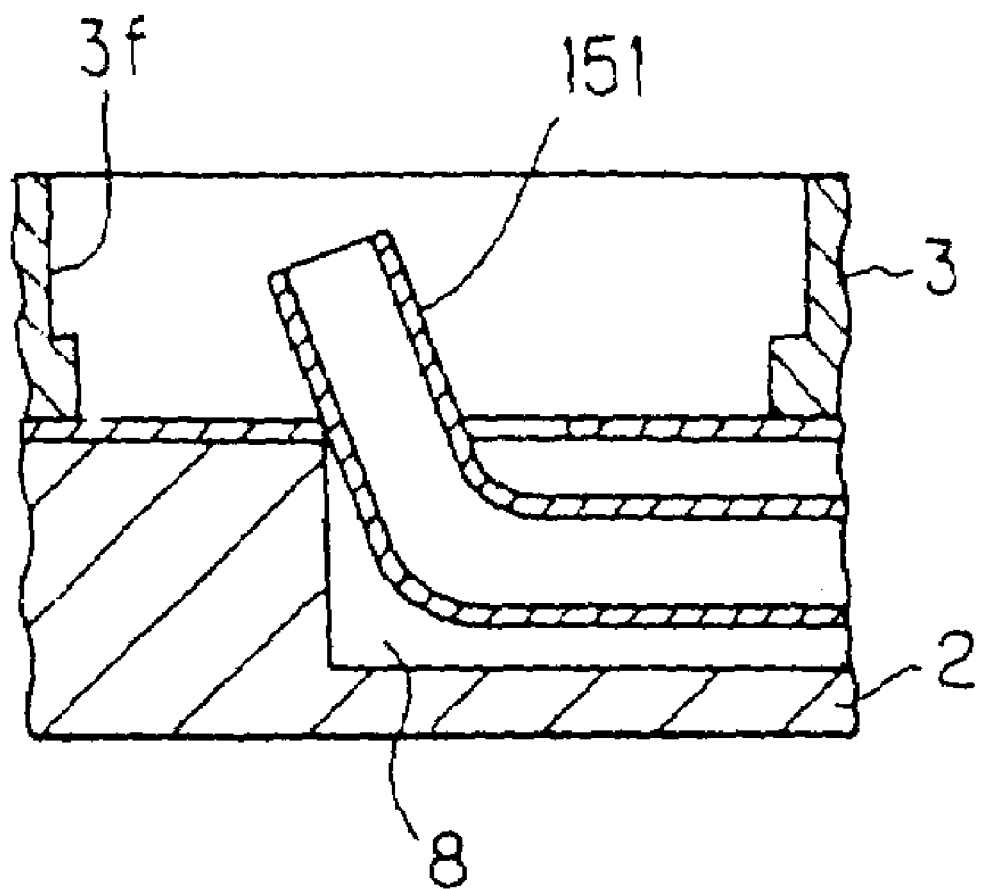
FIG. 27 is an explanation drawing of the use of corrosion resistant piping made of a high rigidity material.

It is normally preferred for the bearer 152 to be integrally shaped. If the corrosion resistant piping 151 of a highly rigid material is used, however, the end portion of the corrosion resistant piping 151 is in a toppled state as shown in FIG. 27. If a plurality of lines of the corrosion resistant piping 151 are joined to one bearer 152, the end portions of the lines of the corrosion resistant piping 151 are in disorderly directions. Thus, the integral bearer 152 poses difficulty in an operation for joining the ends of the lines of the corrosion resistant piping 151 (it is conceivable to lengthen the corrosion resistant piping 151, and cut the end of the corrosion resistant piping 151 after its insertion into the bearer 152, but this is a difficult operation, because the position of cutting is inside the bearer 152). In this case, the bearer 152 is halved as in the present embodiment, and one half of the bearer 152 is inserted into the fitting hole 3f, where after the other half of the bearer 152 is inserted into the fitting hole 3f, whereby the efficiency of the joining operation is improved. In this case, the number of divisions of the bearer 152 is not restricted to two, but may be three or more.

Figure 28:
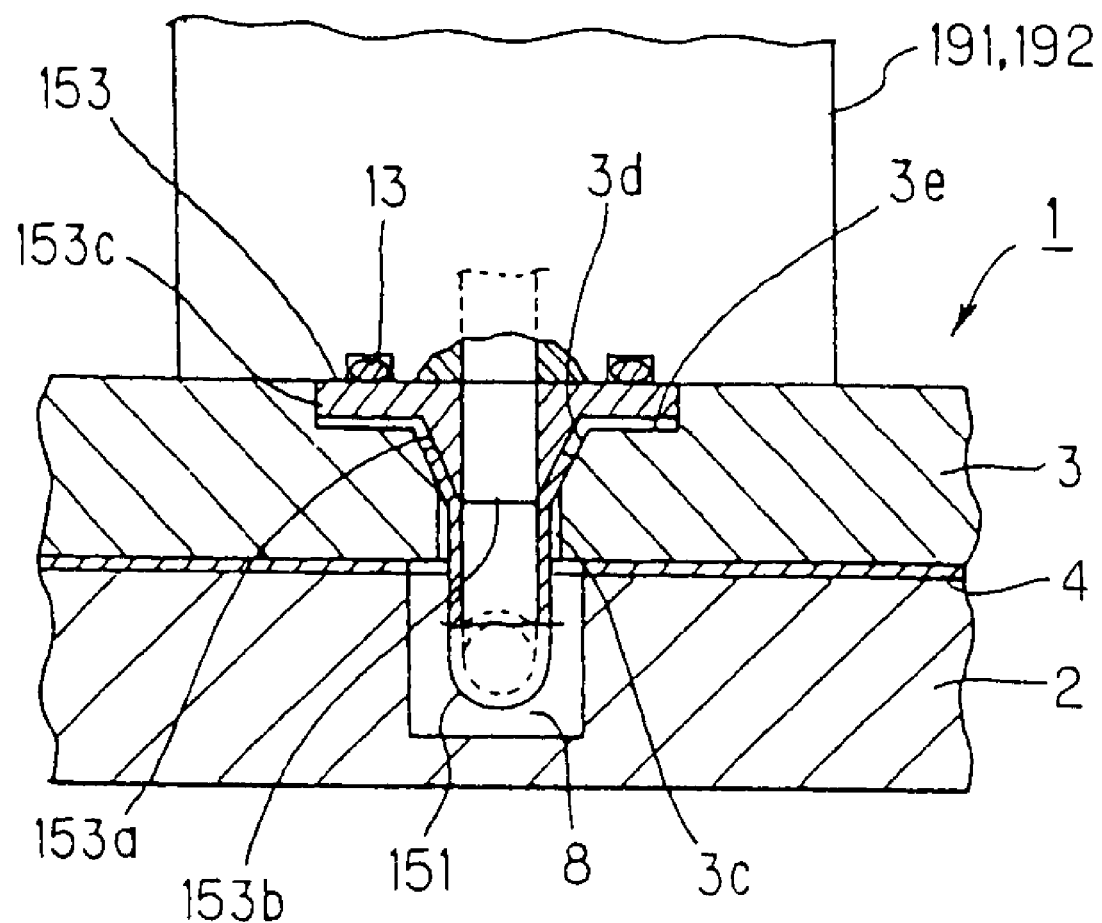
FIG. 28 is a sectional view showing another example of joining at an end portion of the corrosion resistant piping.
Figure 29:
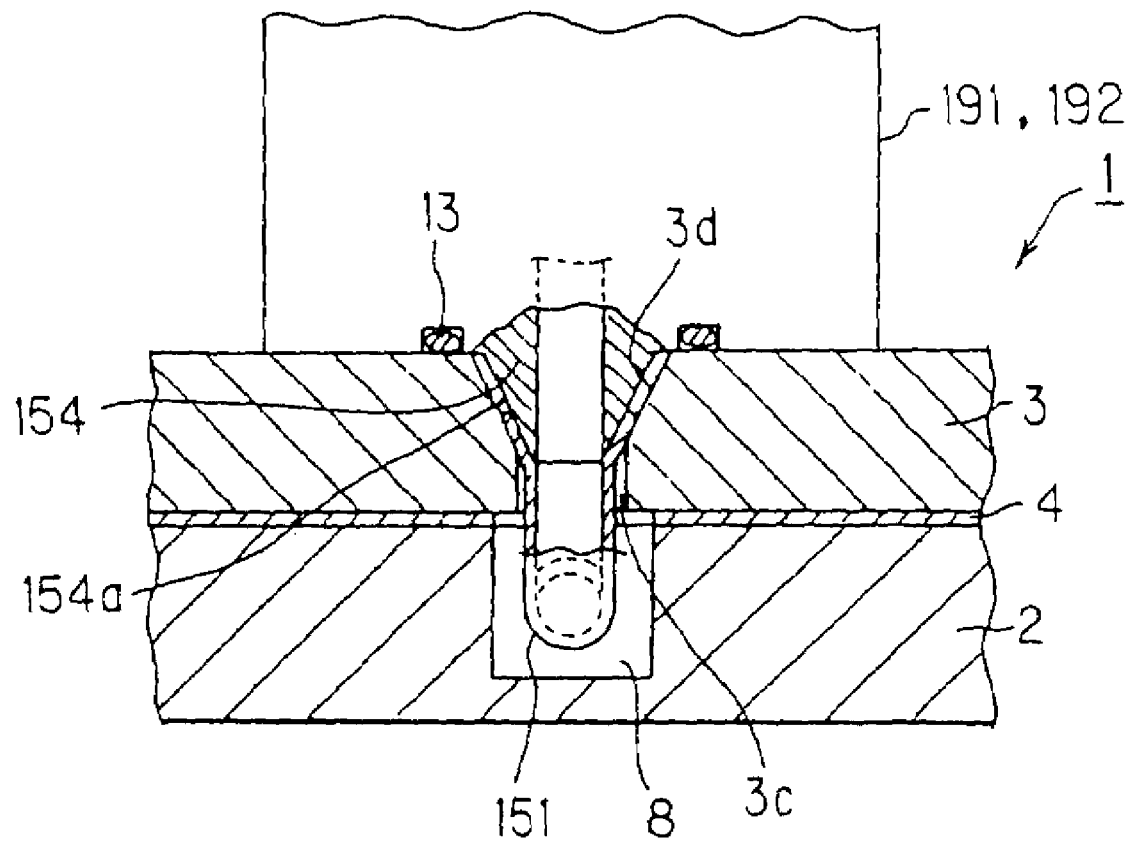
FIG. 29 is a sectional view showing still another example of joining at an end portion of the corrosion resistant piping.

FIGS. 28 and 29 show other examples of joining of the end of the corrosion resistant piping 151. They are useful for application to cases in which the piping paths (grooves 8) are simple, or in which the corrosion resistant piping 151 of a low rigidity material is used.

With an integrated piping plate 1 shown in FIG. 28, the bearer 152 and plate 3 shown in FIG. 26 are integrally shaped. That is, a through-hole 3c is formed in the plate 3, and a conical surface 3d is formed in part of the inner peripheral surface of the through-hole 3c. A stepped portion 3e is formed above the conical surface 3d by further widening the inner peripheral surface of the through-hole 3c.

In this case, the end portion of the corrosion resistant piping 151 is inserted into the through-hole 3c of the plate 3, and the body portion 153b of the top-shaped component 153 is inserted, under pressure, into the end portion of the corrosion resistant piping 151. By so doing, the end portion of the corrosion resistant piping 151 is broadened by the conical surface 153a of the body portion 153b, and the conical surface 153a of the body portion 153b is fitted to the conical surface 3d of the plate 3. At this time, the head portion 153c of the top-shaped component 153 is fitted to the stepped portion 3e of the plate 3. As a result, the end portion of the corrosion resistant piping 151 is joined firmly without leakage of the fluid, with its outer diameter side being supported by the conical surface 3d of the plate 3, and its inner diameter side being supported by the conical surface 153a of the top-shaped component 153.

With an integrated piping plate 1 shown in FIG. 29, the bearer 152 and plate 3 shown in FIG. 26 are integrally shaped, and the top-shaped component 153 and instrument 191 or component 192 are integrally shaped. That is, a through-hole 3c is formed in the plate 3, and a conical surface 3d is formed in part of the inner peripheral surface of the through-hole 3c. Also, a truncated cone-shaped joining portion 154 having a conical surface 154a formed on an outer peripheral surface thereof is shaped integrally with the instrument 191 or component 192 on the lower surface of the instrument 191 or component 192.

In this case, the end portion of the corrosion resistant piping 151 is inserted into the through-hole 3c of the plate 3, and the joining portion 154 of the instrument 191 or component 192 is inserted, under pressure, into the end portion of the corrosion resistant piping 151. By so doing, the end portion of the corrosion resistant piping 151 is broadened by the conical surface 154a of the joining portion 154, and the conical surface 154a of the joining portion 154 is fitted to the conical surface 3d of the plate 3. Thus, the end portion of the corrosion resistant piping 151 is joined firmly so as not leak the fluid, with its outer diameter side being supported by the conical surface 3d of the plate 3, and its inner diameter side being supported by the conical surface 154a of the joining portion 154.

As stated earlier, in a unit of the fuel cell power generation system composed of many instruments and components as shown in FIG. 49, these numerous instruments and components are connected by the grooves 8. Thus, as shown in FIG. 21, the number of the grooves 8 is very large, and some grooves 8 need to be bypassed greatly in order to prevent crossing or interference of the grooves 8 with each other.

Furthermore, these grooves 8 (channels) are designed, with their sectional areas being calculated, so as to ensure proper flow rates adapted for their uses. Thus, the grooves 8 with large widths may be needed. In this case, a sufficient space for forming the wide grooves 8 needs to be secured. Besides, some of the fluids flowing through these grooves 8 (channels) are different in temperature, so that proper dimensions for separation need to be secured to avoid thermal influences on each other.

Hence, the grooves 8 (channels) often have to run complicatedly like a maze. In this case, designing and manufacturing of the integrated piping plate (machining of grooves) become tiresome. Moreover, the size of the plate, i.e., the size of the integrated piping plate, may be made very large in order to bypass the grooves 8 or increase the widths of the grooves 8. In this view, the configurations of three-dimensional integrated piping plates capable of making the layout of the grooves 8 (channels) simple and compact even in such cases will be described based on FIGS. 30 to 35.

Figure 30:
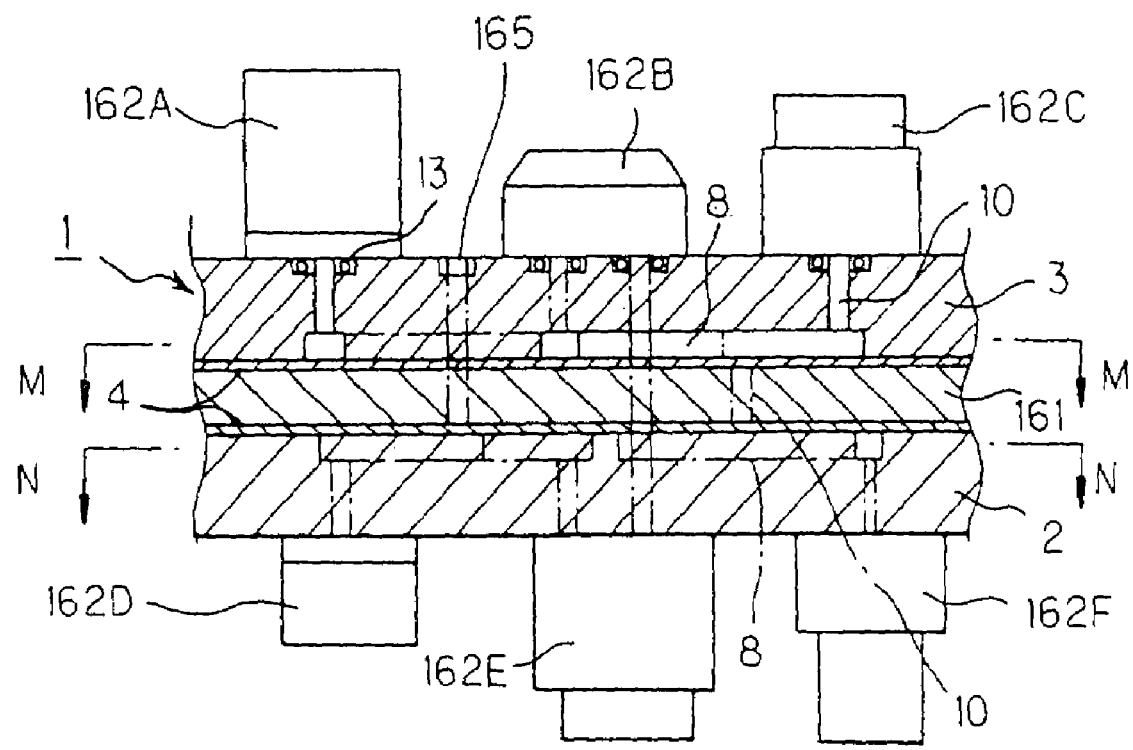
FIG. 30 is a configurational drawing of a three-dimensional integrated piping plate.

In FIG. 30, an intermediate plate 161 is provided between a plate 2 and a plate 3, and these three plates 2, 3 and 161 are joined by an adhesive 4 or the like for integration, thereby constituting a three-dimensional integrated piping plate 1. A component 162A, an instrument 162B and an instrument 162C of a fuel cell power generation system are arranged on one surface of the three-dimensional integrated piping plate 1 (an outer surface of the plate 3), and fixed by fixing means such as stud bolts and nuts (not shown). A component 162D, a component 162E and an instrument 162F of a fuel cell power generation system are arranged on the other surface of the three-dimensional integrated piping plate 1 (an outer surface of the plate 2), and fixed by fixing means such as stud bolts and nuts (not shown).

Grooves 8, which serve as channels for fluids, are formed in joining surfaces of the plate 3 and the intermediate plate 161 (in the illustrated example, the joining surface of the plate 3) and in joining surfaces of the plate 2 and the intermediate plate 161 (in the illustrated example, the joining surface of the plate 2), respectively. These grooves 8 and the component 162A, instrument 162B, instrument 162C, component 162D, component 162E and instrument 162F are connected by communication holes 10 formed in the plates 2, 3, 161. That is, the component 162A, instrument 162B, instrument 162C, component 162D, component 162E and instrument 162F are connected three-dimensionally by the grooves 8 provided at upper and lower stages in plate joining surfaces at two locations. The sectional areas of the grooves 8 are properly calculated for respective fluids, and determined.

Figure 31:
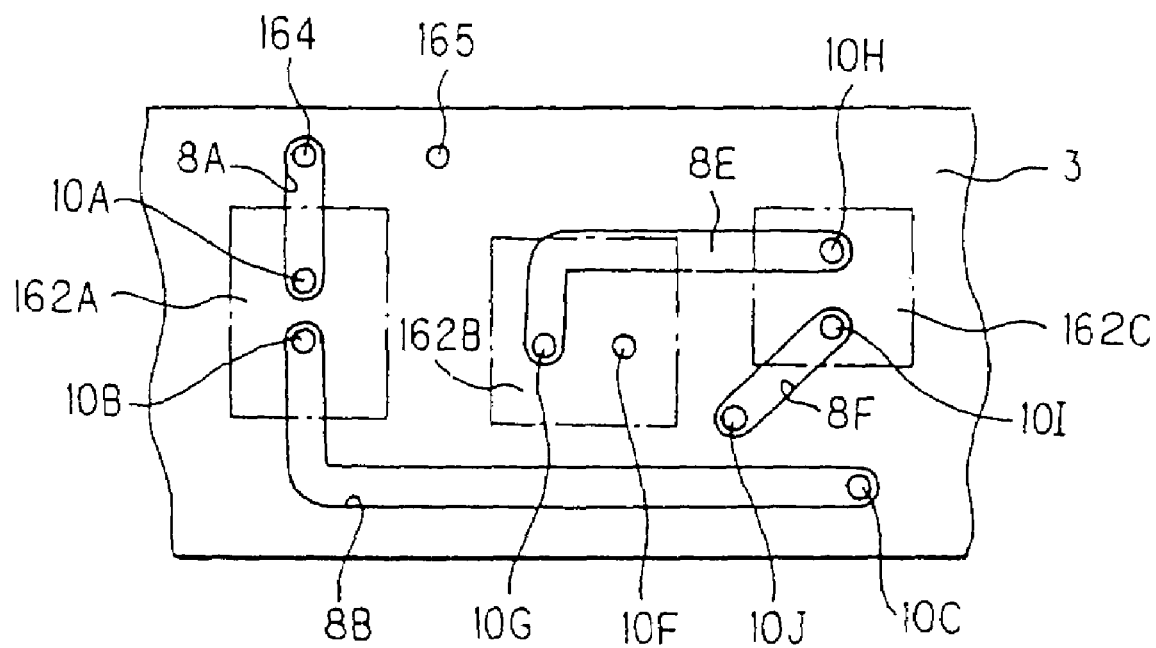
FIG. 31 is a sectional view taken on line M-M of FIG. 30.
Figure 32:
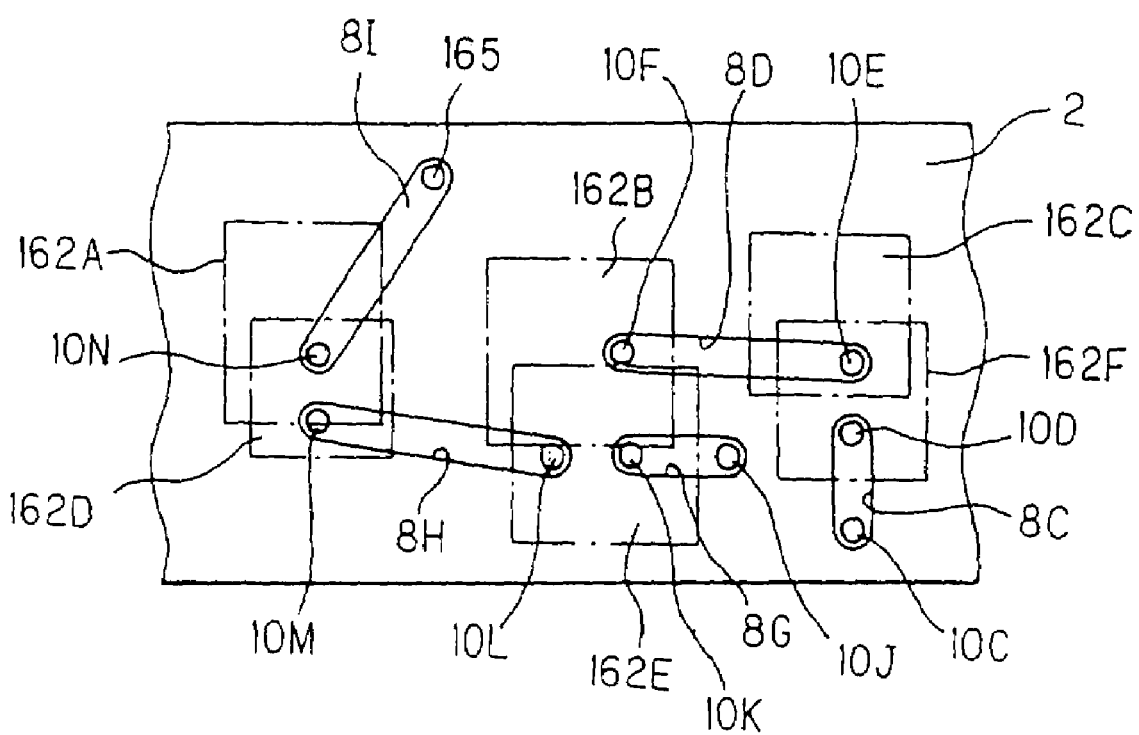
FIG. 32 is a sectional view taken on line N-N of FIG. 30.

FIGS. 30, 31 and 32 illustrate the layout relationship among the grooves 8, communication holes 10, component 162A, instrument 162B, instrument 162C, component 162D, component 162E and instrument 162F which define a path, like fluid supply port 164→component 162A→instrument 162F→instrument 162B→instrument 162C→component 162E→component 162D→fluid discharge port 165. If described in detail based on FIGS. 31 and 32, this path follows fluid supply port 164→groove 8A→communication hole 10A→component 162A→communication hole 10B→groove 8B→communication hole 10C→groove 8C→communication hole 10D→instrument 162F→communication hole 10E→groove 8D→communication hole 10F→instrument 162B→communication hole 10G→groove 8E→communication hole 10H→instrument 16C→communication hole 10I→groove 8F→communication hole 10J→groove 8G→communication hole 10K→component 162E→communication hole 10L→groove 8H→communication hole 10M→component 162D→communication hole 10N→groove 8I→fluid discharge port 165.

Figure 33:
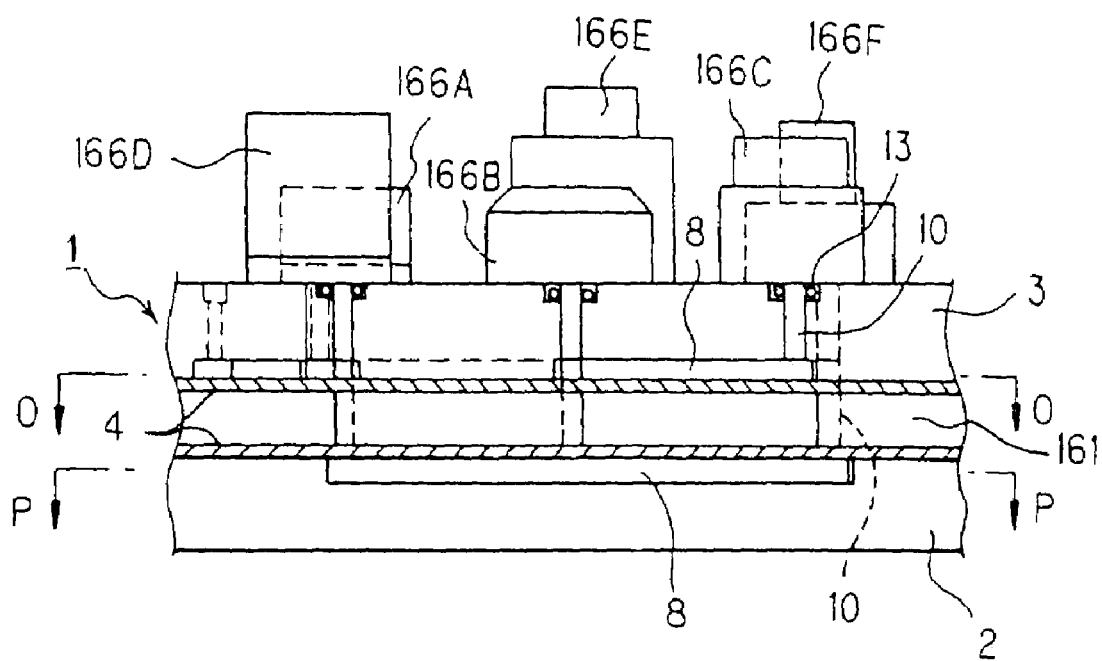
FIG. 33 is a configurational drawing of another three-dimensional integrated piping plate.

In FIG. 33, an intermediate plate 161 is provided between a plate 2 and a plate 3, and these three plates 2, 3 and 161 are joined by an adhesive 4 or the like for integration, thereby constituting a three-dimensional integrated piping plate 1. A component 166A, an instrument 166B, an instrument 166C, a component 166D, a component 166E, and an instrument 166F of a fuel cell power generation system are arranged on only one surface of the three-dimensional integrated piping plate 1 (an outer surface of the plate 3), and fixed by fixing means such as stud bolts and nuts (not shown).

Grooves 8, which serve as channels for fluids, are formed in joining surfaces of the plate 3 and the intermediate plate 161 (in the illustrated example, the joining surface of the plate 3) and in joining surfaces of the plate 2 and the intermediate plate 161 (in the illustrated example, the joining surface of the plate 2), respectively. These grooves 8 and the component 166A, instrument 166B, instrument 166C, component 166D, component 166E and instrument 166F are connected by communication holes 10 formed in the plates 2, 3, 161. That is, the component 166A, instrument 166B, instrument 166C, component 166D, component 166E and instrument 166F are connected three-dimensionally by the grooves 8 provided at two stages in plate joining surfaces at two locations. The sectional areas of the grooves 8 are properly calculated for respective fluids, and determined.

Figure 34:
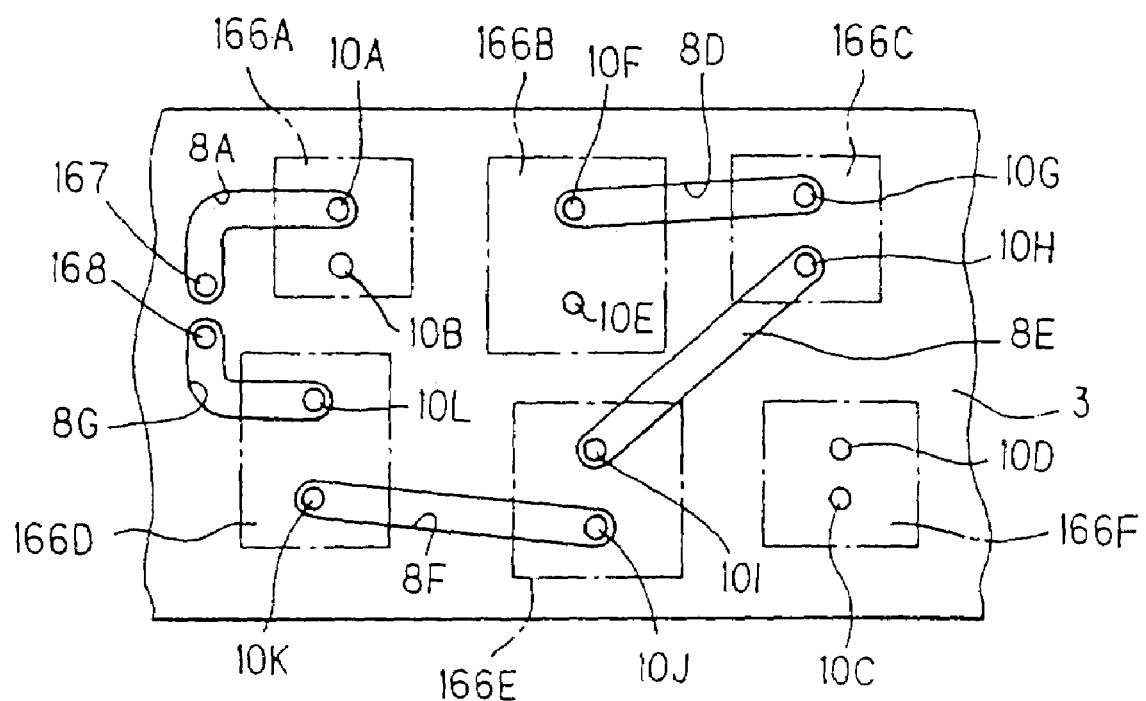
FIG. 34 is a sectional view taken on line O-O of FIG. 33.
Figure 35:
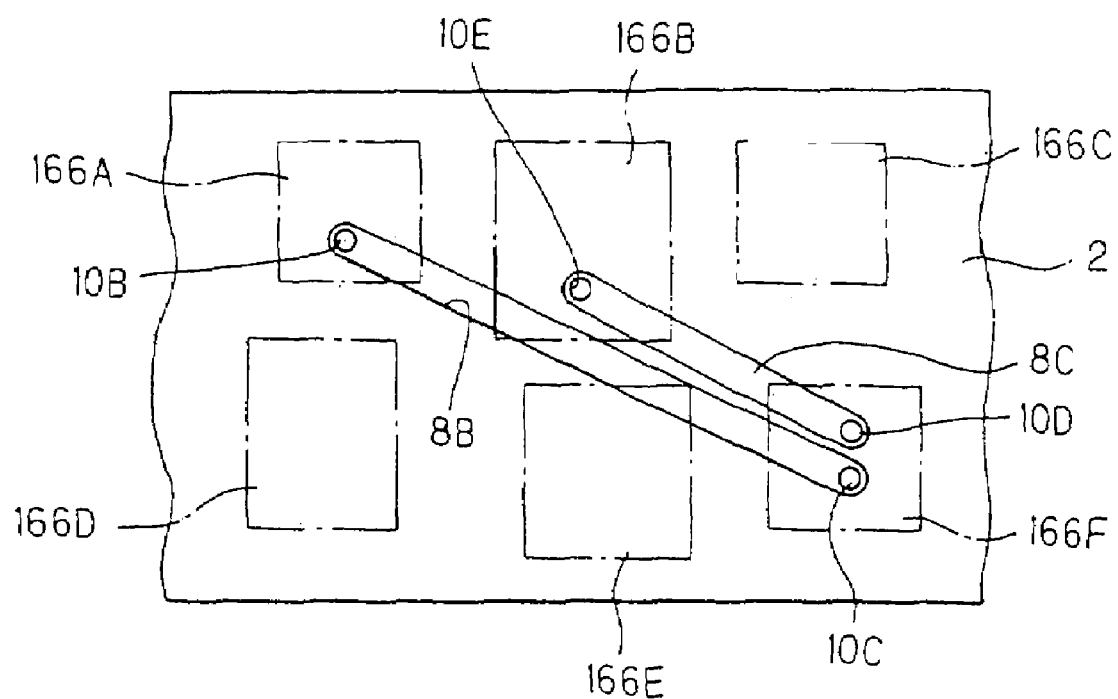
FIG. 35 is a sectional view taken on line P-P of FIG. 33.

FIGS. 33, 34 and 35 illustrate the layout relationship among the grooves 8, communication holes 10, component 166A, instrument 166B, instrument 166C, component 166D, component 166E and instrument 166F which define a path, like fluid supply port 167→component 166A→instrument 166F→instrument 166B→instrument 166C→component 166E→component 166D→fluid discharge port 168. If described in detail based on FIGS. 34 and 35, this path follows fluid supply port 167→groove 8A→communication hole 10A→component 166A→communication hole 10B→groove 8B→communication hole 10C→instrument 166F→communication hole 10D→groove 8C→communication hole 10E→instrument 166B→communication hole 10F→groove 8D→communication hole 10G instrument 166C→communication hole 10H→groove 8E→communication hole 10I→component 166E→communication hole 10J→groove 8F→communication hole 10K→component 166D→communication hole 10L→groove 8G→fluid discharge port 168.

Figure 36:
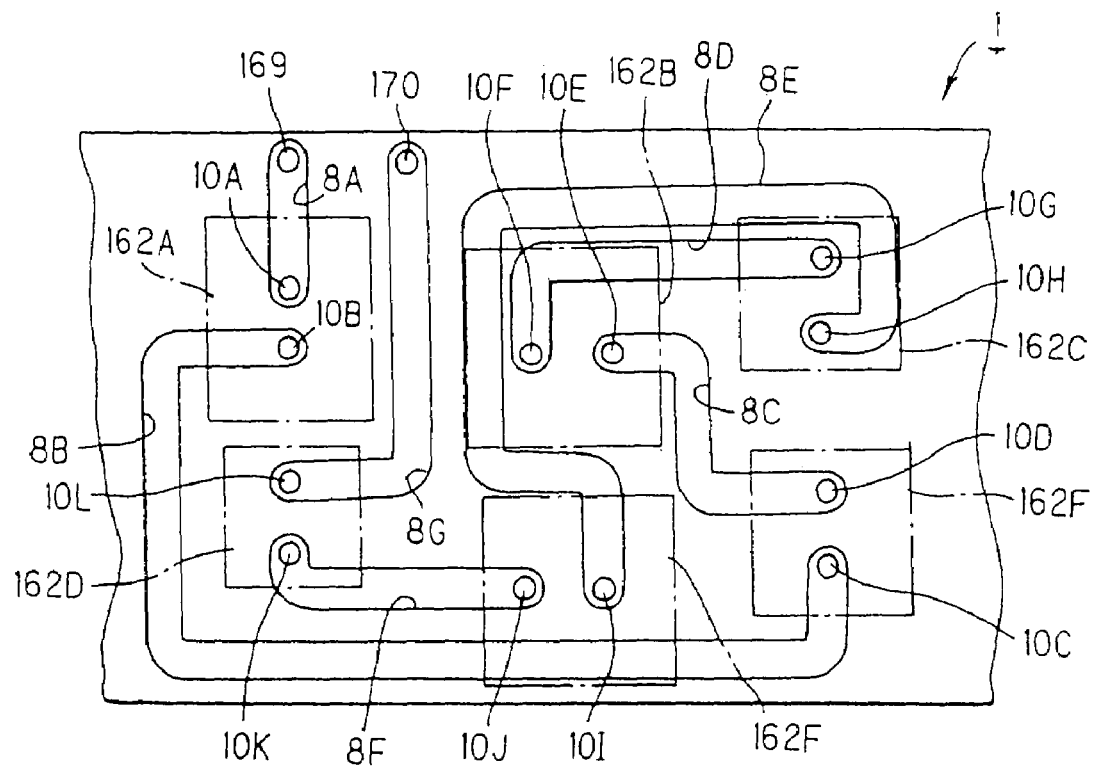
FIG. 36 is an explanation drawing in which the instruments and components shown in FIG. 30 are connected by grooves formed in one plane.
Figure 37:
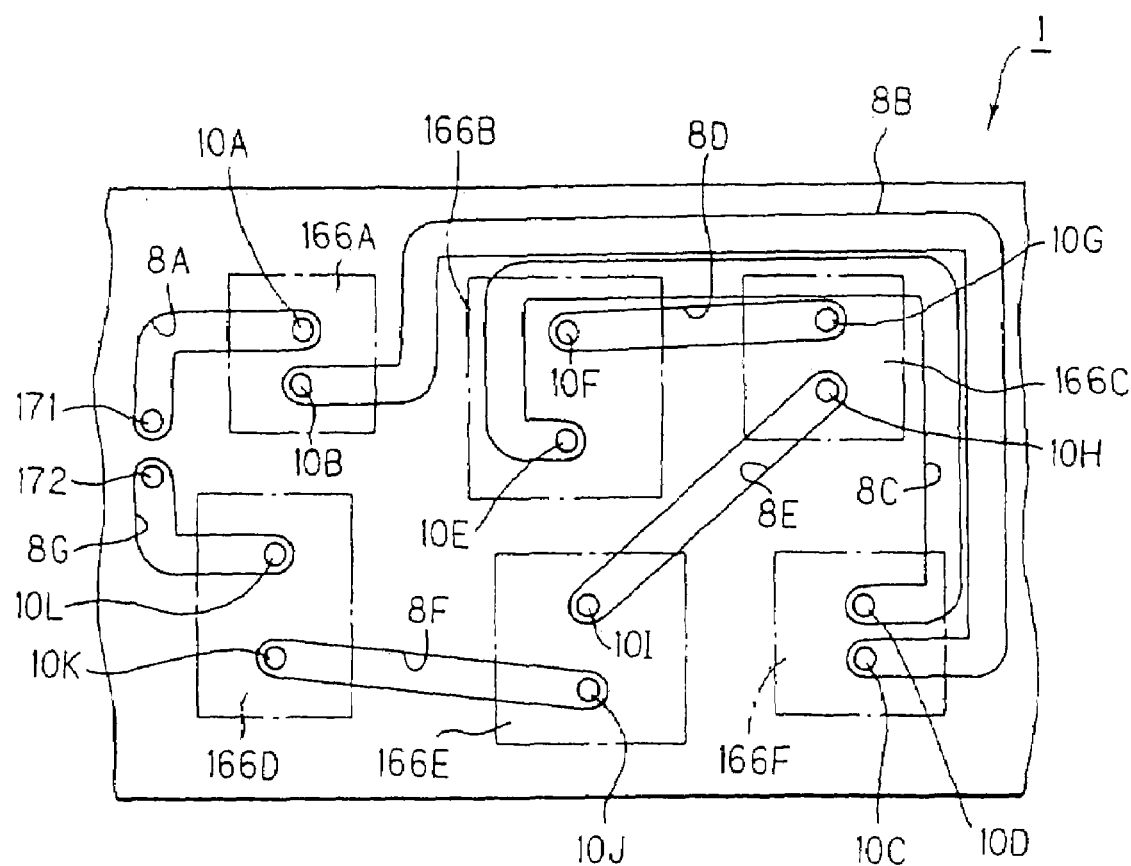
FIG. 37 is an explanation drawing in which the instruments and components shown in FIG. 33 are connected by grooves formed in one plane.

For comparison, FIG. 36 illustrates an example in which the component 162A, instrument 162B, instrument 162C, component 162D, component 162E and instrument 162F shown in FIG. 30 are arranged on an integrated piping plate 1 comprising two plates joined together. FIG. 37 illustrates an example in which the component 166A, instrument 166B, instrument 166C, component 166D, component 166E and instrument 166F shown in FIG. 33 are arranged on an integrated piping plate 1 comprising two plates joined together.

FIG. 36 shows a path following fluid supply port 169→groove 8A→communication hole 10A→component 162A→communication hole 10B→groove 8B→communication hole 10C→instrument 162F→communication hole 10D→groove 8C→communication hole 10E→instrument 162B→communication hole 10F→groove 8D→communication hole 10G→instrument 162C→communication hole 10H→groove 8E→communication hole 10I→component 162E→communication hole 10J→groove 8F→communication hole 10K→component 162D→communication hole 10L→groove 8G→fluid discharge port 170.

FIG. 37 shows a path following fluid supply port 171→groove 8A→communication hole 10A→component 166A→communication hole 10B→groove 8B→communication hole 10C→instrument 166F→communication hole 10D→groove 8C→communication hole 10E→instrument 166B→communication hole 10F→groove 8D→communication hole 10G→instrument 166C→communication hole 10H→groove 8E→communication hole 10I→component 166E→communication hole 10J→groove 8F→communication hole 10K→component 166D→communication hole 10L→groove 8G→fluid discharge port 172.

In the integrated piping plate 1 having the two plates thus joined together, all the grooves 8 (channels) are formed in one plane, and the grooves 8 (channels) may have to be bypassed. To bypass the grooves 8, the size of the integrated piping plate 1 may have to be increased.

In FIGS. 36 and 37, the number of the instruments and components is small, and the number of the grooves 8 (channels) is also small, so that their differences are not very marked. Actually, however, many instruments and components as shown in FIG. 49 are connected together. Thus, as shown in FIG. 21, the grooves 8 (channels) are also so many as to make a maze. As a result, it is often difficult to secure the necessary channel sectional areas, or to accommodate the instruments and components in a compact manner while securing dimensions for separation among the fluids with different temperatures. In the three-dimensional integrated piping plates of FIGS. 30 to 35, the instruments and components are connected three-dimensionally by the two-stage grooves 8 (channels), so that the layout of the grooves 8 can be simplified, and the instruments and components can be disposed in a compact state. In FIGS. 30 to 35, the grooves 8 are provided in the joining surface of the plate 2 and the joining surface of the plate 3, but the grooves 8 may be formed in the joining surfaces of the intermediate plate 161.

Figure 38:
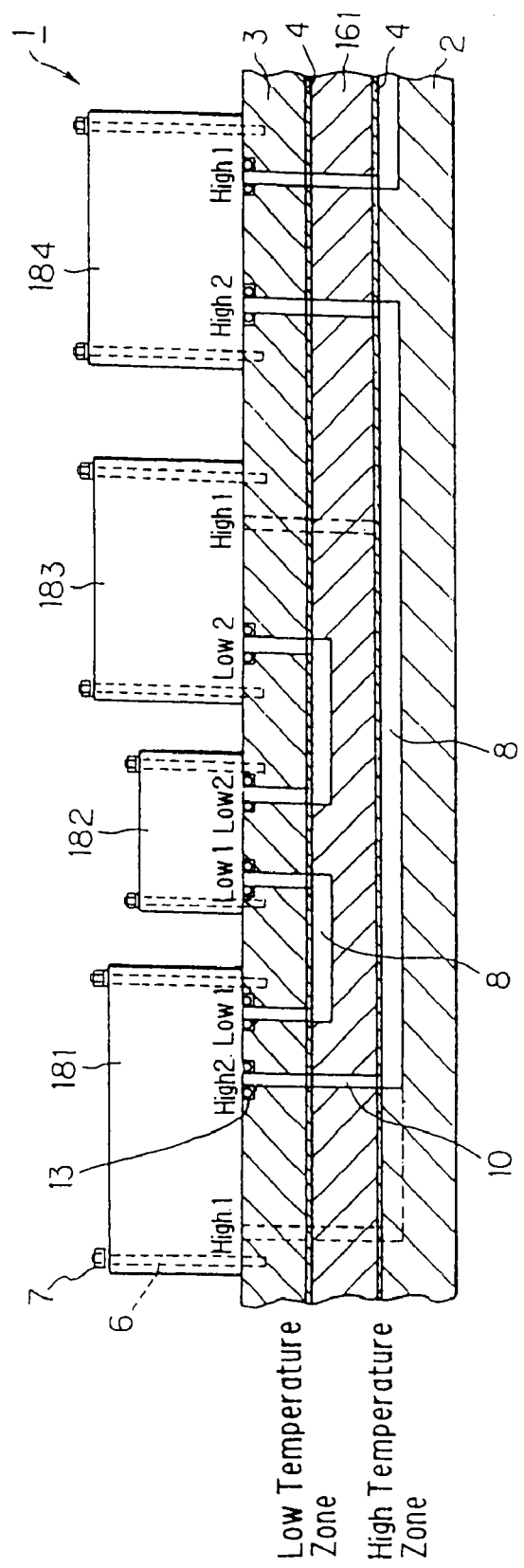
FIG. 38 is a configurational drawing showing a high temperature zone and a low temperature zone divided using the three-dimensional integrated piping plate.
Figure 39:
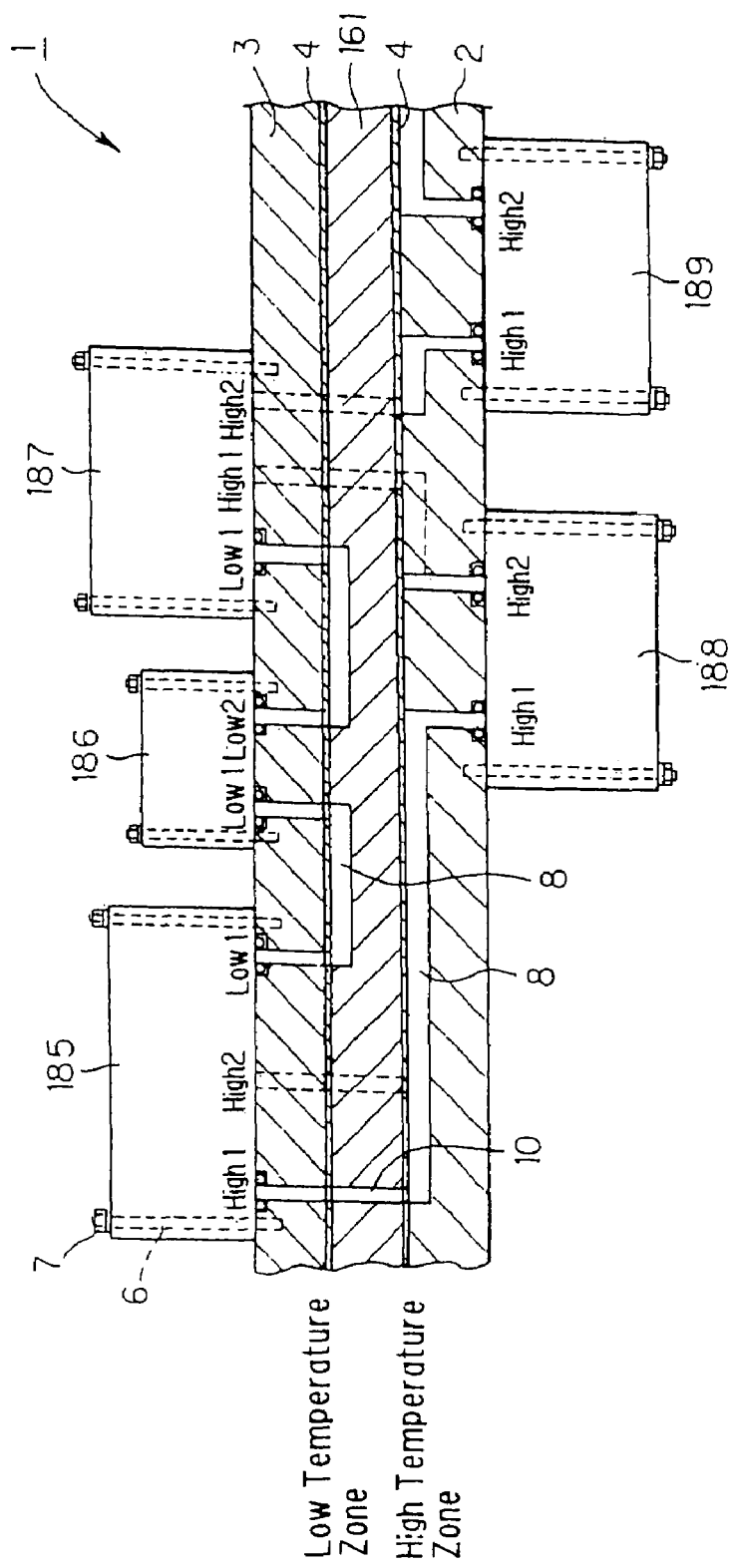
FIG. 39 is another configurational drawing showing a high temperature zone and a low temperature zone divided using the three-dimensional integrated piping plate.

FIGS. 38 and 39 show configuration examples in which a high temperature zone and a low temperature zone are separated using a three-dimensional integrated piping plate.

In FIG. 38, a low temperature/high temperature mixed instrument 181, a low temperature instrument 182, a low temperature/high temperature mixed instrument 183, and a high temperature instrument 184 are disposed on one surface of a three-dimensional integrated piping plate 1 (a surface of a plate 3). Grooves 8 connecting these instruments are formed in two stages, i.e., in joining surfaces of the plate 3 and an intermediate plate (in the illustrated example, the joining surface of an intermediate plate 161) and joining surfaces of a plate 2 and the intermediate plate 161 (in the illustrated example, the joining surface of the plate 2), and the upper-stage grooves 8 define a low temperature zone where a low temperature fluid flows, while the lower-stage grooves 8 define a high temperature zone where a high temperature fluid flows.

In FIG. 39, a low temperature/high temperature mixed instrument 185, a low temperature instrument 186, and a low temperature/high temperature mixed instrument 187 are disposed on one surface of a three-dimensional integrated piping plate 1 (a surface of a plate 3), while a high temperature instrument 188 and a high temperature instrument 189 are disposed on the other surface of the three-dimensional integrated piping plate 1 (a surface of a plate 2). Grooves 8 connecting these instruments are formed in two stages, i.e., in joining surfaces of the plate 3 and an intermediate plate 161 (in the illustrated example, the joining surface of the intermediate plate 161) and joining surfaces of the plate 2 and the intermediate plate 161 (in the illustrated example, the joining surface of the plate 2), and the upper-stage grooves 8 define a low temperature zone where a low temperature fluid flows, while the lower-stage grooves 8 define a high temperature zone where a high temperature fluid flows.

In this case, it is effective to provide a heat insulator between the plate 2 and the intermediate plate 161, although this is not shown.

In the foregoing description, the provision of one intermediate plate 161 between the plates 2 and 3 is described. However, this is not limitative, and two or more intermediate plates may be provided between the plate 2 and the plate 3. That is, four or more plates may be joined to constitute the three-dimensional integrated piping plate. When two or more intermediate plates are provided, the grooves 8 (channels) are also formed in joining surfaces between the intermediate plates, whereby even more grooves 8 (channels) can be provided.

As described above, according to the integrated piping plate of the present embodiment, the constituent instruments and components are connected by the grooves 8 provided in the plate 2 or plate 3. Thus, the channels corresponding to the conventional piping are present in the integrated piping plate, and small instruments, such as valves, electrical components, such as sensors or switches, and electrical wiring can also be assembled into the plate 2, or plate 3, or plate 2 and plate 3. Thus, the entire apparatus such as the fuel cell power generation system, etc. can be easily modularized, and downsized. Moreover, it suffices to assemble the respective constituent instruments and components to predetermined positions, and there is no need for a complicated pipe laying operation in a narrow space. Thus, the assembly work is easy and the work efficiency is increased. Furthermore, there are few seams, reducing the risk of fluid leakage.

In addition, joining surfaces 2a and 3b of the plate 2 and the plate 3, and the grooves 8 are coated with or lined with fluorocarbon resin, such as polytetrafluoroethylene, or covered with an aluminum oxide film to form a corrosion-proof layer 29. By so doing, corrosion of the grooves 8 by a corrosive fluid flowing through the grooves 8, or corrosion of the plate joining surface by ingredients contained in the adhesive 4 can be prevented to ensure the long life of the integrated piping plate 1. This technique of providing the corrosion-proof layer can, of course, be applied not only to one integrated piping plate, but a plurality of integrated piping plates. For example, the corrosion-proof layer may be provided on the grooves or plate joining surface in the three-dimensional modules of FIGS. 7 to 13, or the corrosion-proof layer may be provided on the grooves or plate joining surface in the rest module of FIG. 14, although these modes are not shown. Further, the corrosion-proof layer can be provided on the grooves or plate joining surface in three-dimensional integrated piping plates having an intermediate plate as shown in FIGS. 30 to 35 or FIGS. 38 and 39.

Besides, the plate 2 and the plate 3 are welded at the position of the weld line 30 surrounding the periphery of the groove 8, whereby a fluid flowing through the groove 8 can be sealed up reliably at the site of the weld line 30. This weld sealing technique is, of course, not restricted to the integrated piping plate in a configuration as shown in FIG. 5, and can be applied, for example, to integrated piping plates in any configurations, such as the three-dimensional modules shown in FIGS. 7 to 13, the rest module shown in FIG. 14, and the three-dimensional integrated piping plate shown in FIG. 30, although these applications are not shown.

In addition, a plurality of integrated piping plates 1 (1A, 1B, etc.) having respective components and instruments assembled thereto are three-dimensionally modularized, with their back surfaces being superposed. By so doing, further downsizing can be achieved, the channels and control system for fluids can be shortened, response can be quickened, and control can be facilitated.

Also, a plurality of integrated piping plates 1 (1A, 1B, etc.) are integrally fixed via a heat insulator 16a to constitute a heat insulating three-dimensional module 18A. This measure makes it possible, for example, to dispose low temperature instruments 28a, 28b, such as control instruments, in the integrated piping plate 1B in proximity to high temperature instruments 27a, 27b disposed in the integrated piping plate 1A.

Also, a heat insulating three-dimensional module 18B is constituted by integrally connecting and fixing a plurality of integrated piping plates 1 (1A, 1B, etc.) via separators 31. By so doing, it is possible, for example, to separate the high temperature integrated piping plate 1A having high temperature instruments 27a, 27b disposed there on, and the low temperature integrated piping plate 1 having low temperature instruments 28a, 28b disposed thereon by the separators 31. Thus, thermal influence from each other can be avoided. Moreover, a heat insulating effect can be further enhanced by interposing heat insulators 130 between the back surfaces 2b of the plural integrated piping plates 1 (1A, 1B, etc.) and the separators 31.

Also, constituent instruments 139, 140 of the apparatus are interposed between the back surfaces 2b's of a plurality of integrated piping plates 1 (1A, 1B, etc.), whereby the spacing between the integrated piping plates can be effectively used, and the apparatus can be further downsized. Furthermore, the integrated piping plates are separated from each other by the constituent instruments 139, 140, so that a heat insulating effect can be expected. Particularly when the heat insulators 130 are interposed between the instruments 139, 140 and the integrated piping plates 1A, 1B, the heat insulating effect becomes marked.

Also, a plurality of integrated piping plates 1 (1A, 1B, etc.) are disposed on the same rest 32 with a heat insulating spacing L, so that these integrated piping plates 1 (1A, 1B, etc.) can ignore (prevent) thermal influence from each other. If a heat insulator 145 is interposed between the integrated piping plates 1 (1A, 1B, etc.) and the rest 32, a heat insulating effect is further enhanced.

Also, a heat shutoff groove 35 is provided between a high temperature zone where high temperature instruments 33a, 33b, 33c are disposed, and a low temperature zone where low temperature instruments 34a, 34b are disposed, on the same integrated piping plate 1. Thus, heat from the high temperature zone can be shut off to avoid thermal influence on the low temperature zone. Furthermore, a heat insulator is filled into the heat shutoff groove 35, or a refrigerant, such as air or water, is flowed into the heat shutoff groove 35, whereby the heat shutoff effect becomes very high.

Also, instead of forming the corrosion-proof layer in the groove 8, corrosion resistant piping 151 is accommodated in the groove 8, and a corrosive fluid is flowed through the corrosion resistant piping 151. By so doing, even if the grooves 8 (channels) are numerous and complicated, corrosion resistance to the corrosive fluid can be easily ensured, without need for an advanced machining technology. Moreover, it is possible to select and use the corrosion resistant piping 151 of a material adapted for the properties of the corrosive fluid, so that the reliability of corrosion resisting performance is increased. Furthermore, treatment for corrosion resistance (channel formation using corrosion resistant piping) can be restricted to the channels for the corrosive fluid. Thus, machining man-hours are reduced, and the integrated piping plate 1 can be provided for a low price. Besides, when corrosion resisting performance declines because of secular changes, corrosion resisting performance can be resumed simply by replacing the corrosion resistant piping 151 accommodated in the integrated piping plate 1, rather than replacing the integrated piping plate 1. Thus, the cost of maintenance can be reduced.

Also, when a flexible material is used as the material for the corrosion resistant piping 151, the corrosion resistant piping 151 can be inserted into the groove 8 after integration of the integrated piping plate 1, or the corrosion resistant piping 151 can be replaced. Thus, operationability can be improved.

Also, the end portion of the corrosion resistant piping 151 is joined with the use of a bearer 152 having a through-hole 152*b* having a conical surface 152*c* formed in an inner peripheral surface thereof, and a top-shaped component 153 having a conical surface 153*a* formed in an outer peripheral surface thereof. By this measure, an operation for joining the corrosion resistant piping 151 can be performed easily, and leakage of fluid can be prevented reliably. Furthermore, as shown in FIG. 28, a bearer 152 and a plate 3 are integrally formed, or as shown in FIG. 29, an instrument 191 or a component 192 and the top-shaped component 153 are integrally formed. By this measure, the number of components is decreased, and the joining operation is facilitated. If the corrosion resistant piping 151 of a highly rigid material is used, or the path of piping is complicated, the efficiency of the joining operating can be improved by dividing the bearer 152 into a plurality of portions.

Also, there may be a case in which three or more plates 2, 3, 161 are joined to constitute a three-dimensional integrated piping plate 1, and grooves 8 are formed in joining surfaces between the plate 2 and the intermediate plate 161, in joining surfaces between the plate 3 and the intermediate plate 161, and if two or more of the intermediate plates 161 are provided, in joining surfaces between the intermediate plate 161 and the intermediate plate 161, whereby many grooves 8 are provided in agreement with many instruments and components. Even in this case, the layout of the grooves 8 is simplified, and the instruments and components can be arranged compactly. In this three-dimensional integrated piping plate 1, moreover, grooves 8 in a plurality of stages are allocated to a high temperature zone and a low temperature zone, as illustrated in FIGS. 38 and 39. Consequently, thermal influence from each other can be eliminated.

In the above descriptions, stud bolts 6 are used as the fixing bolts for the instrument and the component, but they are not limitative, and ordinary bolts or through bolts may be used. In the above examples, an O ring 13 is used to seal the instrument or component, but it is not limitative, and a gasket or the like may be used.

In the above descriptions, the fuel cell power generation system is described, but it is not limitative. The present invention is effective for various types of apparatus, such as a fixed unit having piping and wiring built into the apparatus, e.g., pneumatic or hydraulic control device or combustion device for the general industry, and for a unit integrated so as to be capable of assembly and transportation.

In the above examples, integrated piping plates in various configurations are described. These configurations may be combined, where necessary. This is true of the integrated piping plates to be described later on.

Embodiment 2

Figure 40A:
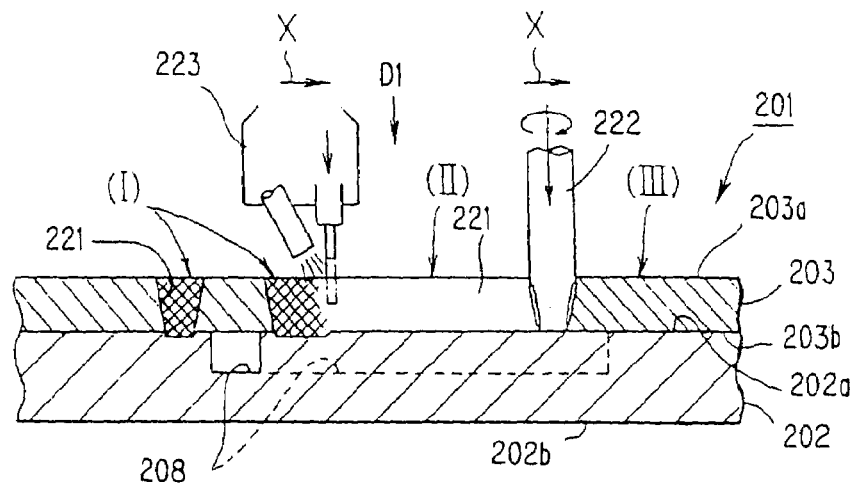
FIG. 40A is a sectional view (a sectional view taken on line C1-C1 of FIG. 40B) showing a machining method for the integrated piping plate according to the embodiment of the present invention.
Figure 40B:
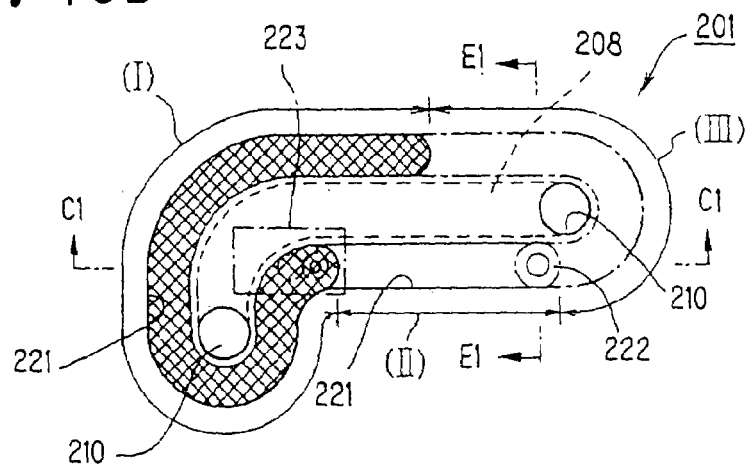
FIG. 40B is a view (plan view) taken in a direction of D1 in FIG. 40A.
Figure 40C:
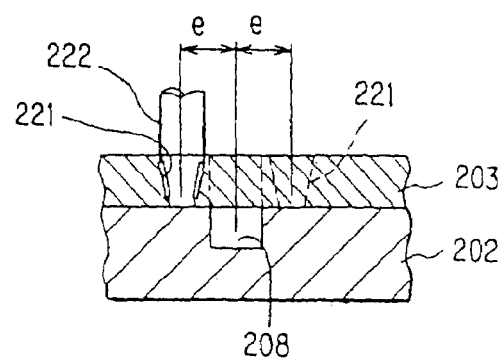
FIG. 40C is a sectional view taken on line E1-E1 of FIG. 40B.

A machining method for an integrated piping plate 201 according to the present embodiment will be described based on FIGS. 40A, 40B and 40C. As shown in FIGS. 40A, 40B and 40C, when a plate 202 and a plate 203 are to be joined for integration, the first step is to superpose the plate 202 and the plate 203. In the plate 202, a groove 208 to serve as a channel for a fluid (liquid or gas) has been machined. In the plate 203, communication holes 210 as a communication between the fluid channel groove 208 and instruments or components constituting an apparatus, such as a fuel cell power generation system, have been machined. In this superposed state, a groove 221 to serve as a weld groove is machined in the plate 203 so as to extend along the entire periphery of the fluid channel groove 208. Then, this groove 221 for the weld groove is welded.

The fluid channel groove 208 is not restricted to a joining surface 202*a* of the plate 202, but may be formed in a joining surface 203*b* of the plate 203, and the communication holes 210 are not restricted to the plate 203, but may be formed in the plate 202. The instrument and component are not restricted to a surface 203*a* of the plate 203, but may be formed on a surface 202*b* of the plate 202, or may be formed on the surfaces 202*b*, 203*a* of both plates 202, 203. That is, the instrument and component can be provided on one of or both of the surfaces of the integrated piping plate 201. Nor is the groove 221 for the weld groove restricted to the plate 203, but the groove 221 may be formed in the plate 202.

FIGS. 40A, 40B and 40C show the state in course of machining. In these drawings, (I) portion shows a portion in which the groove 221 as the weld groove has been machined and welded, whereby the plates 202 and 203 have been integrated. (II) portion shows a portion in which the groove 221 as the weld groove has been machined and is scheduled to be welded to integrate the plates 202 and 203. (III) portion shows a portion in which the groove 221 as the weld groove is scheduled to be machined and welded to integrate the plates 202 and 203. Actually, the shape of the fluid channel groove 208 formed in the plate 202 is complicated, for example, as shown in FIG. 21, but in FIGS. 40 to 44, is shown in a simplified manner for convenience of explanation.

This machining method will be described in further detail. The plate 203 having the communication holes 210 machined therein is superposed on the plate 202 having the fluid channel groove 208 machined therein. Then, a weld groove machining tool 222 is moved while tracing the outer periphery of the fluid channel groove 208, as indicated by an arrow X in FIG. 40A, in accordance with numerical control (tracer control) based on machining data (numerical control data) on the fluid channel groove 208. By this measure, the groove 221 for a weld groove is formed in the plate 202. That is, when the surroundings of the fluid channel groove 208 shown in FIG. 40B are to be welded, a weld line for extending along the entire periphery of the fluid channel groove 208 is formed at a suitable distance e from the fluid channel groove 208, as shown in FIG. 40C, based on the machining data obtained when machining the fluid channel groove 208 in the plate 202. The weld groove machining tool 222 is run along this weld line to machine the groove 221 for the weld groove.

After the groove 221 for the weld groove is formed, a welding machine 223 is caused to move while tracing the outer periphery of the fluid channel groove 208 (along the weld line), as indicated by the arrow X in FIG. 40A, to weld the groove 221 for the weld groove, thereby integrating the plate 202 and the plate 203. At this time, travel control of the welding machine 223 (control of the welding position) is performed in accordance with numerical control (tracer control) based on machining data on the fluid channel groove 208 (numerical control data), as in the case of the weld groove machining tool 222, or based on machining data on the weld groove machining tool 222 (numerical control data). Weld groove machining and welding are performed continuously on one station, as shown in FIGS. 40A and 40B. That is, welding is started in succession to weld groove machining.

The reason for the initiation of welding in succession to weld groove machining (the reason for start of welding before completion of weld groove machining) is as follows: If weld groove machining is completed before start of welding, an island-like portion surrounded with the weld 221 for the weld groove, which has been formed by the weld groove machining, becomes free, and this portion cannot be held at a fixed position. The timing of starting welding may be immediately after start of weld groove machining, or may be a predetermined time after start of weld groove machining. This timing can be set as desired.

FIGS. 40A, 40B and 40C show the state in which the groove 221 for the weld groove has been welded up to the surface 203a of the plate 203. However, this mode is not limitative, but welding may be kept within the leg length which enables the joining of the plates 202 and 203 to be maintained. As the method of welding for the groove 221 for weld groove, MIG welding (metal inert gas sealed welding) or TIG welding (tungsten inert gas sealed welding) is suitable, but other welding method may be used.

According to the machining method of the present embodiment, joining surfaces 202a, 203b of the plates 202, 203 are welded so as to extend along the entire periphery of the fluid channel groove 208, whereby the plates 202 and 203 are welded. This type of welding, compared with joining of the plates 202 and 203 by an adhesive, increases the durability of the plate joining portion, and constructs a firm weld structure, thus increasing pressure resistance. Also, the coupling bolts for the plates 202, 203 become unnecessary, so that the entire integrated piping plate can be further downsized. Furthermore, this machining method facilitates the line operation of joining procedure, and thus increases the work efficiency, contributing to a low cost.

Figure 41A:
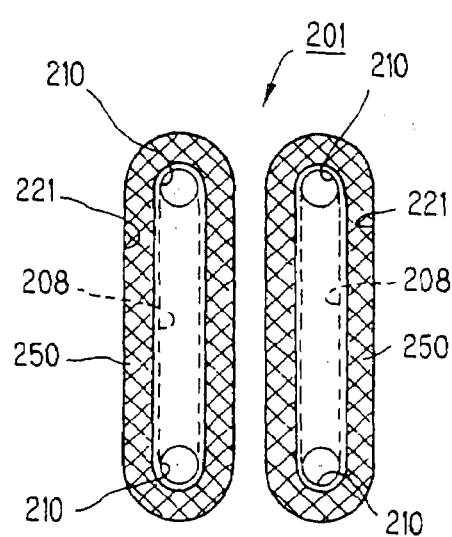
FIG. 41A is an explanation drawing of welding performed in grooves for weld grooves such that the weld surrounds the entire perimeter of each groove.
Figure 41B:
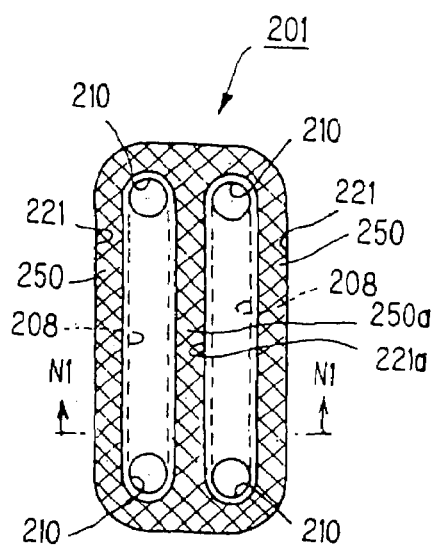
FIG. 41B is an explanation drawing in which a weld line is shared between the adjacent grooves for weld grooves.
Figure 41C:
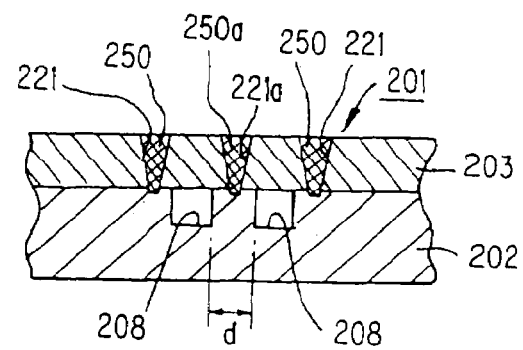
FIG. 41C is a sectional view taken on line N1-N1 of FIG. 41B.

The welding of the joining surfaces 202a, 203a of the plates 202, 203 so as to extend along the entire periphery of the fluid channel groove 208 is not restricted to welding so as to extend along the entire periphery of each fluid channel groove 208 as shown in FIG. 41A, but includes sharing of one weld line 250 (weld line sharing portion 250a) between the adjacent grooves 208 for weld grooves as shown in FIGS. 41B and 41C. In FIGS. 41B and 41C, the adjacent fluid channel grooves 208 are close to each other with a narrow gap d. For these fluid channel grooves 208, therefore, only one weld line 250 (weld line sharing portion 250a) extending along the entire periphery of one of the fluid channel grooves 208 is formed, and this weld line sharing portion 250a is shared with the weld line 250 extending along the entire periphery of the other fluid channel groove 208. Of course, the formation of the groove 221 for weld groove so as to extend along the entire periphery of the fluid channel groove 208 is not restricted to forming the groove 221 for weld groove so as to extend along the entire periphery of each fluid channel groove 208 as shown in FIG. 41A, but includes sharing of one groove 221 for weld groove (portion 221a which shares the groove for weld groove) between the adjacent fluid channel grooves 208 as shown in FIGS. 41B and 41C.

Figure 42A:
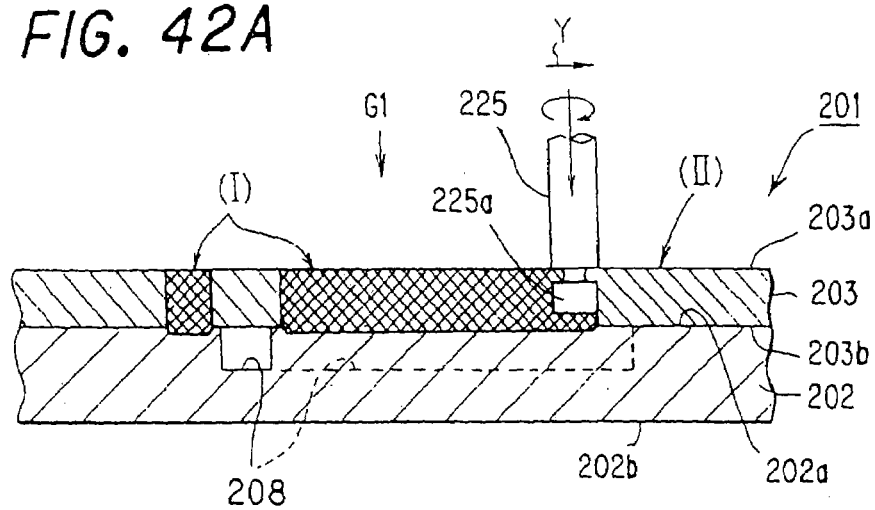
FIG. 42A is a sectional view (a sectional view taken on line F1-F1 of FIG. 42B) showing another machining method for the integrated piping plate according to the embodiment of the present invention.
Figure 42B:
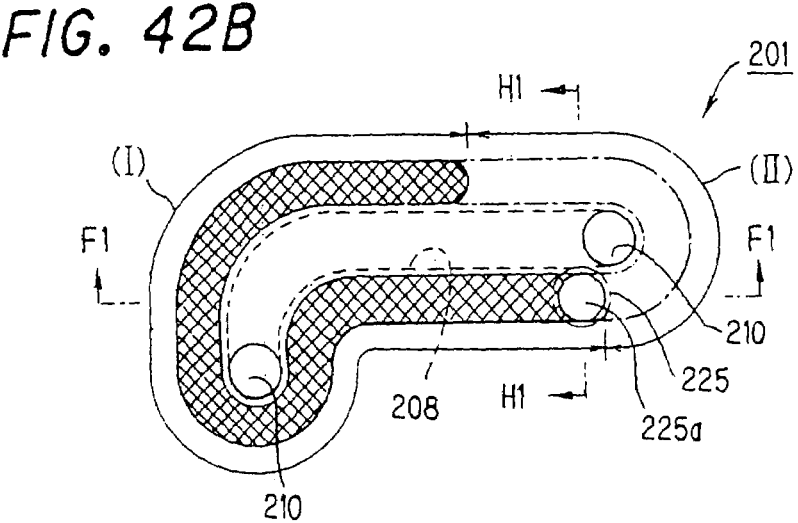
FIG. 42B is a view (plan view) taken in a direction of G1 in FIG. 42A.
Figure 42C:
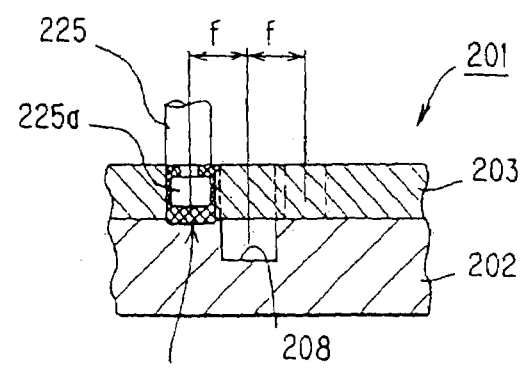
FIG. 42C is a sectional view taken on line H1-H1 of FIG. 42B.

Other machining method for an integrated piping plate 201 will be described based on FIGS. 42A, 42B and 42C. FIGS. 42A, 42B and 42C show a method for integrating a plate 202 and a plate 203 by use of friction stir welding (hereinafter referred to as FSW), a welding technique rendered publicly known by patent gazettes (Japanese Patent Nos. 2792233 and 2712838).

As shown in FIG. 42A, the plate 203 having communication holes 210 machined therein is superposed on the plate 202 having a fluid channel groove 208 machined therein. Then, as shown in FIG. 42B, the surroundings of the fluid channel groove 208 of the plate 202 are welded. That is, as shown in FIG. 42C, joining surfaces 202a, 203b of the plates 202, 203 are welded so as to extend along the entire periphery of the fluid channel groove 208 at a suitable distance f from the fluid channel groove 208 to weld the plate 202 and the plate 203. This mode is the same as in the machining method shown in FIGS. 40A, 40B and 40C, and so detailed explanations for it are omitted. The differences from the machining method shown in FIGS. 40A, 40B and 40C will be described in detail below.

With the machining method shown in FIGS. 42A, 42B and 42C, machining of the groove for weld groove is not performed. First, a tip tool 225a of an FSW welding machine 225 for FSW welding is located at a start point at which the welding is started. Its rotation is started, and an axial pressure is applied to it to insert the tip tool 225a into the plate 203 up to a position in a height direction which is suitable for integration. By starting the rotation of the tip tool 225a, frictional heat is generated. Also, the tip tool 225a is moved while tracing the outer periphery of the fluid channel groove 208 as shown by an arrow Y in FIG. 42A to weld the joining surfaces 202a, 203b of the plates 202, 203 so as to extend along the entire periphery of the fluid channel groove 208. At this time, travel control of the FSW welding machine 225 (control of the welding position) is performed in accordance with numerical control (tracer control) based on machining data on the fluid channel groove 208 (numerical control data), like travel control of the welding machine 223.

FIGS. 42A, 42B and 42C show the state in course of machining. In these drawings, (I) portion shows a portion in which the plates 202 and 203 have been integrated by welding. (II) portion shows a portion in which welding is scheduled to be performed to integrate the plates 202 and 203.

The insertion of the tip tool 225a into the plate 203 can be facilitated by machining beforehand a hole for insertion of the tip tool 225a at the position of the start point of FSW welding. However, this hole is not a prerequisite. The insertion is not restricted to the plate 203, but the tip tool 225a may be inserted into the plate 202, and welding may be performed at the plate 202.

According to the machining method of the present embodiment, the joining surfaces 202a, 203b of the plates 202, 203 are welded so as to extend along the entire periphery of the fluid channel groove 208 (of course, the welding is not restricted to welding so as to extend along the entire periphery of each fluid channel groove 208, but includes sharing of one weld line (weld line sharing portion) between the adjacent grooves 208 for weld grooves), whereby the plates 202 and 203 are joined. This type of welding, compared with joining of the plates by an adhesive, increases the durability of the plate joining portion, and constructs a firm weld structure, thus increasing pressure resistance. Also, the coupling bolts for the plates 202, 203 become unnecessary, so that the entire integrated piping plate can be further downsized. Furthermore, this machining method facilitates the line operation of joining procedure, and thus increases the work efficiency, contributing to a low cost. Besides, the adoption of FSW welding makes it unnecessary to machine a groove for a weld groove, and thus can achieve an even lower cost.

Figure 43A:
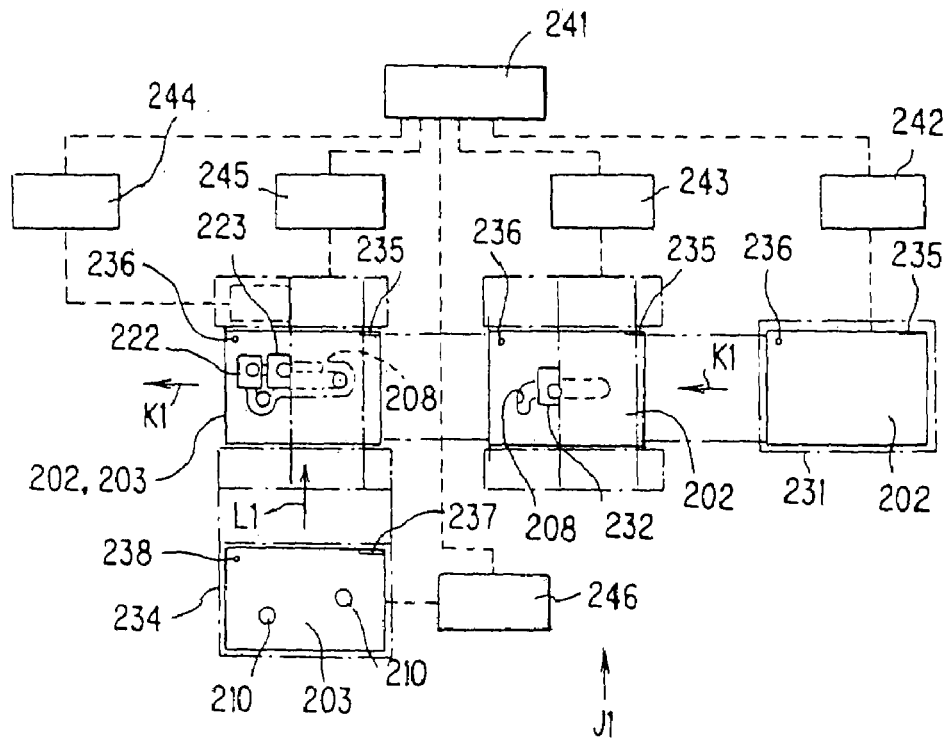
FIG. 43A is a constitution drawing (plan view) of a machining line for the integrated piping plate which actualizes the machining method shown in FIGS. 40A, 40B and 40C.
Figure 43B:
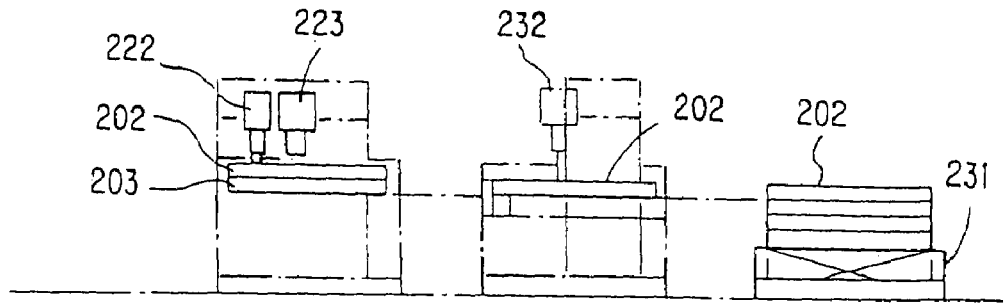
FIG. 43B is a view (side view) taken in a direction of J1 in FIG. 43A.

A description is given of a machining line for implementing the machining method for an integrated piping plate shown in FIGS. 40A, 40B and 40C. As shown in FIGS. 43A and 43B, the machining line (machining equipment) for an integrated piping plate comprises a plate supply device 231, a groove machining device 232, a weld groove machining tool 222, and a welding machine 223 arranged in a row in the direction of an arrow K1 in the drawing, and also has a plate supply device 234 placed laterally of the weld groove machining tool 222 in a direction (direction of an arrow L1) perpendicular to the direction of the arrow K1. The weld groove machining tool 222 and the welding machine 223 are provided in the same step.

A plurality of plates 202 piled on the plate supply device 231 are in a wait state. These plates 202 are fed, one by one, in the direction of arrow K1 by the plate supply device 231, as desired, and transported to the groove machining device 232 in the following step. The plate 202 on standby in the plate supply device 231 is provided beforehand with a machining reference surface 235, or a machining reference point 236, or the machining reference surface 235 and the machining reference point 236, any of which has been machined in the plate 202.

In the groove machining device 232, the fluid channel groove 208 is machined in the plate 202, which has been fed from the plate supply device 231, by numerical control based on the machining reference surface 235, or machining reference point 236, or machining reference surface 235 and machining reference point 236. In providing the communication holes 210 as well in the plate 202, the communication holes 210 may be machined in the plate 202 by the groove machining device 232. As the groove machining device 232, a milling device, a laser cutting device, or an end mill device is used. In FIGS. 43A and 43B, one groove machining device 232 machines the fluid channel groove 208 and/or communication holes 210 in one step. Depending on the volume of machining, however, it is preferred that a plurality of the groove machining devices 232 are provided, and the fluid channel grooves 208 and communication holes 210 are machined in a plurality of steps.

The plate 202 having the fluid channel groove 208 and/or communication holes 210 machined therein is fed from the groove machining device 232 in the direction of arrow K1, and supplied to a subsequent step where the weld groove machining tool 222 and the welding machine 223 are disposed. The plate 202, in which the fluid channel groove 208 and communication holes 210 have been machined by the groove machining device provided at a site other than that on the machining line shown in FIGS. 43A and 43B, may be fed from the plate supply device 231 to the step where the weld groove machining tool 222 and the welding machine 223 are disposed. In this manner, the groove machining device 232 may be omitted from the machining line shown in FIGS. 43A and 43B.

A plurality of plates 203 are piled in a wait state in the plate supply device 234. These plates 203 on standby in the plate supply device 234 are also provided beforehand with a machining reference surface 237, or a machining reference point 238, or the machining reference surface 237 and the machining reference point 238 which has or have been machined. In the plate 203, communication holes 210 are machined beforehand. When the plate 202 is supplied from the groove machining device 232 (plate supply device 231 if the groove machining device 232 is omitted) to the step where the weld groove machining tool 222 and the welding machine 223 are disposed, the plate supply device 234 also feeds the plate 203 in the direction of arrow L1 into this step.

In forming the fluid channel groove 208 in the joining surface 203b of the plate 203, the groove machining device for forming the fluid channel groove 208 may be provided between the step where the plate supply device 234 is disposed, and the step where the weld groove machining tool 222 and the welding machine 223 are disposed. Moreover, the communication holes 210 may also be formed by this groove machining device.

In the step where the weld groove machining tool 222 and the welding machine 223 are disposed, the plate 203 supplied from one direction is superposed on the plate 202 supplied from another direction, with the machining reference surfaces 235 and 237 in alignment, to fix the positional relationship between the plates 202 and 203. Then, the joining method explained based on FIGS. 40A, 40B and 40C is performed. That is, machining of the groove 221 for weld groove is started by the weld groove machining tool 222. Successively, welding of the groove 221 for weld groove is started by the welding machine 223 to weld the joining surfaces 202a, 203b of the plates 202, 203 so as to extend along the entire periphery of the fluid channel groove 208. As the weld groove machining device 222, a milling device, a laser cutting device, or an end mill device is used. As the welding machine 223, an MIG welding machine or a TIG welding machine is used.

The plate supply device 231, groove machining device 232, weld groove machining tool 222, welding machine 223, and plate supply device 234 are adapted to be controlled by control panels, i.e., a plate supply device control panel 242, a groove machining device control panel 243, a weld groove machining tool control panel 244, a welding machine control panel 245, and a plate supply device control panel 246, in accordance with instructions from a central control panel 241. That is, these control panels 242, 243, 244, 245 and 246 perform machining of the plate 202 or plate 203 and tracer control for position, by commands from the central control panel 241, based on the machining reference surface 235 or machining reference point 236 or machining reference surface 235 and machining reference point 236 provided in the plate 202, or based on the machining reference surface 237 or machining reference point 238 or machining reference surface 237 and machining reference point 238 provided in the plate 203.

According to the machining line of the present embodiment, coherent machining of the plates 202, 203 constituting the integrated piping plate 1 can be easily performed, thus contributing to low-cost equipment.

Next, a machining line for implementing the machining method for an integrated piping plate shown in FIGS. 42A, 42B and 42C will be explained based on FIGS. 44A and 44B.

Figure 44A:
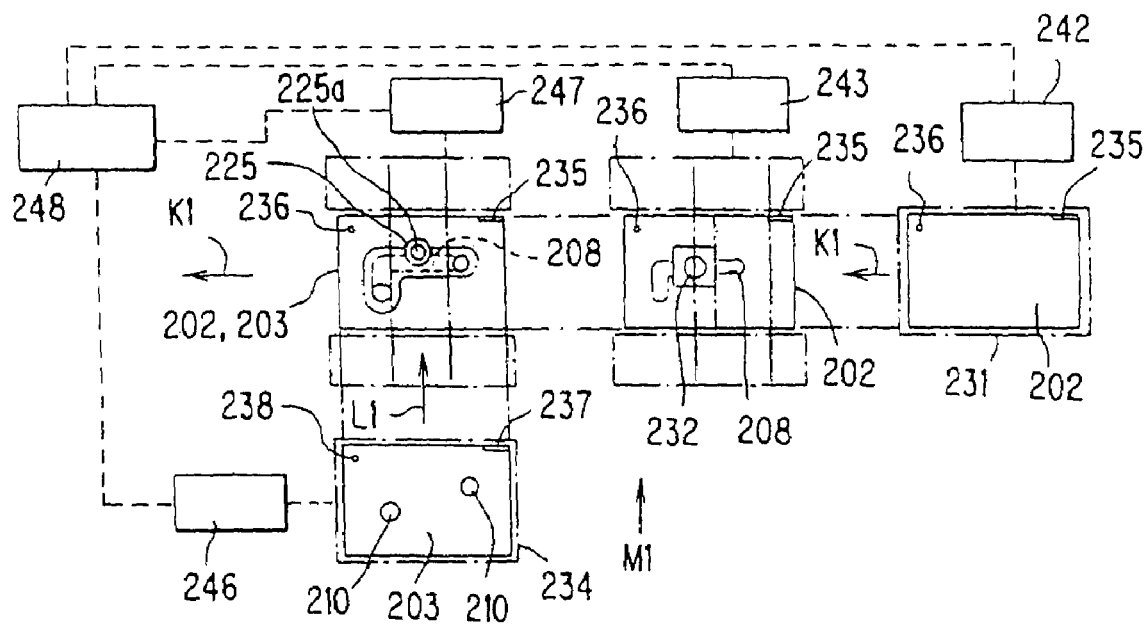
FIG. 44A is a constitution drawing (plan view) of a machining line for the integrated piping plate which actualizes the machining method shown in FIGS. 42A, 42B and 42C.
Figure 44B:
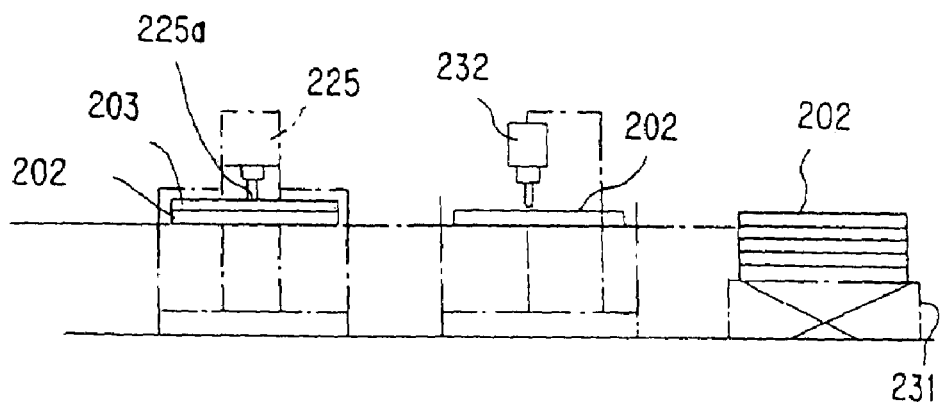
FIG. 44B is a view (side view) taken in a direction of M1 in FIG. 44A.

The difference of the machining line in FIGS. 44A and 44B from the machining line in FIGS. 43A and 43B is that an FSW welding machine 225 and an FSW welding machine control panel 246 shown in FIGS. 44A and 44B are installed instead of the weld groove machining tool 222, welding machine 223, weld groove machining tool control panel 244 and welding machine control panel 245 shown in FIGS. 43A and 43B. Thus, this difference is described, and other features are not described.

As shown in FIGS. 44A and 44B, when the plate 202 is supplied from the groove machining device 232 (plate supply device 231 if the groove machining device 232 is omitted) to the FSW welding machine 225, the plate supply device 234 also feeds the plate 203 to the FSW welding machine 225.

In the FSW welding machine 225, the plate 203 supplied from one direction is superposed on the plate 202 supplied from another direction, with the machining reference surfaces 235 and 237 in alignment, to fix the positional relationship between the plates 202 and 203. Then, the joining method explained based on FIGS. 42A, 42B and 42C is performed. That is, the joining surfaces 202a, 203b of the plates 202, 203 are welded by the tip tool 225a of the FSW welding machine 225 so as to extend along the entire periphery of the fluid channel groove 208.

The plate supply device 231, groove machining device 232, FSW welding machine 225, and plate supply device 234 are adapted to be controlled by control panels, i.e., a plate supply device control panel 242, a groove machining device control panel 243, an FSW welding machine control panel 247, and a plate supply device control panel 246, in accordance with instructions from a central control panel 248. That is, these control panels 242, 243, 247 and 246 perform machining of the plate 202 or plate 203 and tracer control for position, by commands from the central control panel 248, based on the machining reference surface 235 or machining reference point 236 or machining reference surface 235 and machining reference point 236 provided in the plate 202, or based on the machining reference surface 237 or machining reference point 238 or machining reference surface 237 and machining reference point 238 provided in the plate 203.

According to the machining line of the present embodiment, coherent machining of the plates 202, 203 constituting the integrated piping plate 201 can be easily performed, thus contributing to the cost reduction of the equipment. Furthermore, the adoption of the FSW welding machine 225 makes machining of the groove for weld groove unnecessary, and thus can achieve a further cost reduction.

The machining method (joining method) of the present invention is not necessarily restricted to joining of the two plates 202 and 203, but is applicable to joining of three or more plates. To join three plates, for example, the first plate and the second plate may be joined by the machining method (joining method) of the present invention, and then the second plate and the third plate may be joined thereby.

Also, the present invention can be applied not only to machining of the integrated piping plate for use in a fuel cell power generation system, but also to machining of the integrated piping plate for use in various devices.

Embodiment 3

Figure 45A:
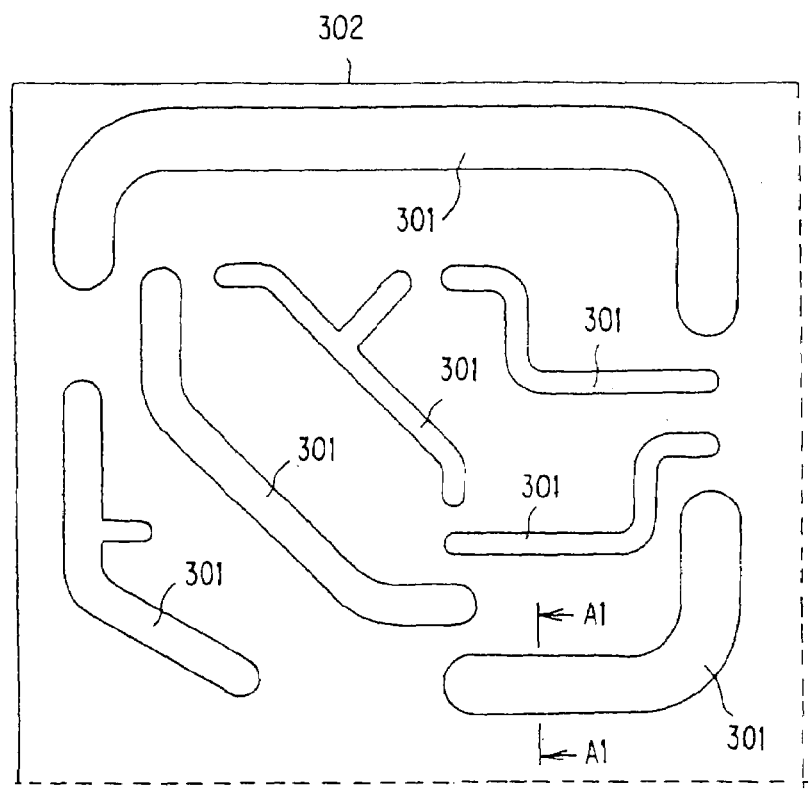
FIG. 45A is a plan view of a plate representing an embodiment of the integrated piping plate according to the present invention.

FIG. 45A shows a plate 302 produced by forming depressions (hereinafter referred to as grooves 301) of predetermined shapes, which serve as fluid channels, as a result of press working of an aluminum plate or an aluminum alloy plate.

Press working is performed by plastic working a metal plate of a highly plastic metallic material under pressure with the use of a mold having an arbitrary shape. This is a machining technique with dimensional accuracy and excellent volume productivity. This technique can select a corrosion resistant material as an object to be machined.

Figure 45B:
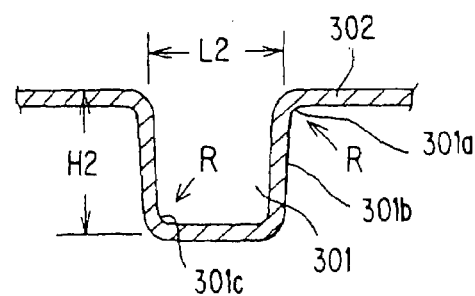
FIG. 45B is a sectional view taken on line A1-A1 of FIG. 45A.

FIG. 45B is a cross sectional view taken on line A1-A1 of the plate 302 in FIG. 45A.

As shown in FIG. 45B, the cross sectional shape of the groove 301 is a rectangular depression having a suitable width L2 and a suitable depth H2. For easy press working, a corner 301a has suitable roundness R, and a side wall portion 301b of the groove 301 is suitably inclined.

To maintain the flow velocity of a fluid, flowing through the groove 301, at a predetermined value, it is necessary to vary the sectional area of the groove 301 according to each groove 301. In doing so, it is advantageous in terms of assembly to keep the depth H2 of the groove 301 constant and vary its width L2, where necessary, thereby ensuring a predetermined sectional area.

Since a corner 301c at the bottom of the groove 301 has suitable roundness R, it is possible to minimize the difference in flow velocity between the center of the fluid and the periphery of the fluid in contact with the corner 301c of the groove 301, thus decreasing stagnation of the fluid.

Figure 45C:
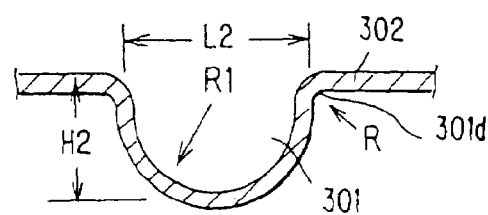
FIG. 45C is a sectional view taken on line A1-A1 of FIG. 45A.

FIG. 45C is a cross sectional view taken on line A1-A1 of the plate 302 in FIG. 45A, which represents another example. As shown in FIG. 45C, the cross sectional shape of the groove 301 is an arc-shaped groove in which the bottom of the groove 301 has a suitable radius R1.

The features and functions of this arced groove are the same as the rectangular groove 301 explained in FIG. 45B. For easy press working, a corner 301d of the arcuate groove has suitable roundness R, and the sectional area of the groove 301 is varied according to each groove 301 so that the flow velocity of a fluid, flowing through the groove 301, is kept at a predetermined value.

Since the groove 301 is an arcuate groove having the radius R1 at the bottom, it is possible to minimize the difference in flow velocity between the center of the fluid and the periphery of the fluid in contact with the groove 301, thus decreasing stagnation of the fluid.

FIGS. 45A, 45B and 45C show the examples produced by press working. However, the manufacturing method for the plate 302 having the grooves for fluid channels is not restricted to press working, but may be shaping by precision casting. This machining method can prepare a casting with material uniformity and high dimensional accuracy, i.e., a plate having grooves for fluid channels, by forming a mold and pouring an arbitrary alloy or the like into the mold. With precision casting, unlike press working, a material other than a highly plastic material, such as aluminum, can be selected as a material for the plate, and like press working, a corrosion resistant material can also be selected. Also, a plate of a complicated shape can be formed using a mold, and its surface can be smoothed as in press working. Thus, it is possible to form grooves, without increasing excess resistance (conductance) in the grooves for flow of fluids. Even according to this method, grooves as in FIGS. 45B and 45C can be formed.

Welding of the plates is performed by superposing the plate 303 having communication holes 311 machined therein onto the plate 302 having fluid channel grooves 301 formed therein, machining grooves for weld grooves in the plate 303 at suitable distances from the fluid channel grooves 301 so as to extend along the entire peripheries of the fluid channel grooves 301, and then welding the grooves for weld grooves by electromagnetic force-controlled hybrid welding or the like, with the plates being gripped at a strong pressure. As a result, the plates are welded, and the fluids flowing through the fluid channel grooves can be sealed up reliably at the sites of the grooves for weld grooves. The welding method for the grooves as weld grooves may be MIG welding, TIG welding, or other welding method.

Figure 46A:
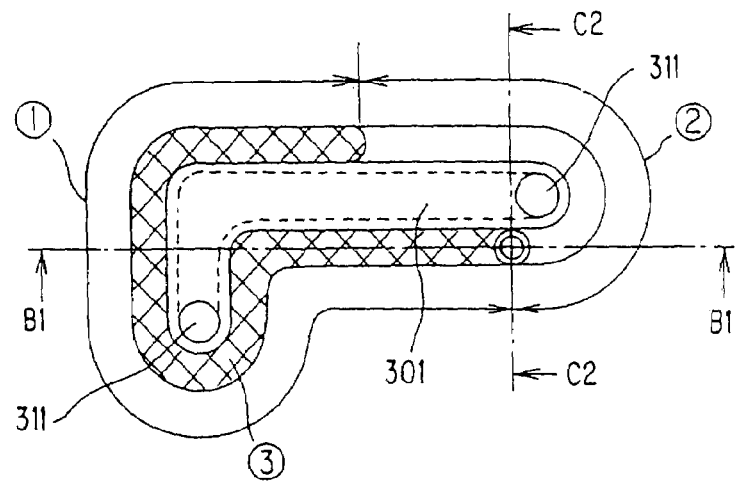
FIG. 46A is a plan view of the integrated piping plate showing a joining method for an embodiment of the integrated piping plate according to the present invention.
Figure 46B:
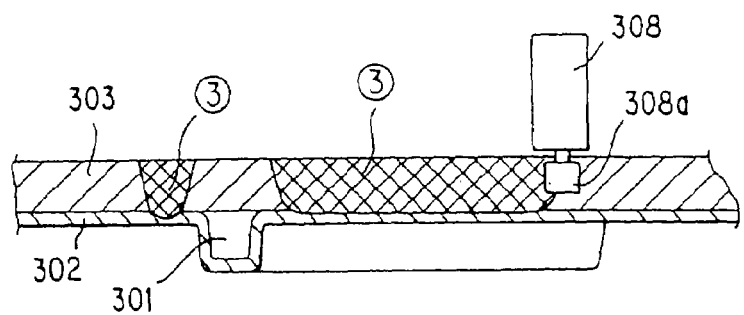
FIG. 46B is a sectional view taken on line B1-B1 of FIG. 46A.
Figure 46C:
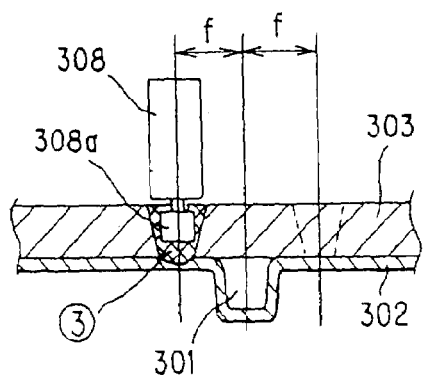
FIG. 46C is a sectional view taken on line C2-C2 of FIG. 46A.

FIGS. 46A, 46B and 46C show another example of the joining method for an integrated piping plate according to the present invention. A method for joining a plate 302 and a plate 303 by friction stir welding to integrate them is shown below.

As stated earlier, friction stir welding (FSW method) is a welding method rendered publicly known by Japanese Patent No. 2792233 and so on. The FSW method uses a material, which is harder than a base material to be joined, as a probe (tip tool 308a in FIG. 46B), presses the probe against the base material to be joined, periodically moves the probe in circular motions, etc. relative to the base material to generate frictional heat. As a result, the base material is fused to create a plastic region. The plastic region is fused and solidified together with another base material to be joined, whereby both base materials are welded.

The FSW method, unlike other welding method, can weld base materials, without necessarily requiring a groove for weld groove during welding. Thus, the FSW method is suitable for an efficient machining operation. Apparatus involved in the FSW method does not need a great input power, but is capable of welding with a high efficiency. Thus, this method is economical, and can contribute to cost reduction. The method is also easy to control, and has high positional accuracy, so that it is suitable for automation and volume production.

According to the FSW method, as shown in FIGS. 46A and 46B, the plate 303 having communication holes 311 machined therein is superposed on the plate 302 having a groove 301 machined therein. Then, as shown in FIG. 46C, the surroundings of the groove 301 of the plate 302 are welded at a position separated by a suitable distance f so as to extend along the entire periphery of the groove 301 to perform welding.

Concretely, a tip tool 308a of a welding machine 308 for the FSW method is set at a start point at which the welding is started. Starting at this point, the tip tool 308a is rotated to generate frictional heat, and fuse the plate 303. During this course, the tip tool 308a is inserted under pressure to a predetermined depth. A fusion zone of the plate 303 undergoes fusion and solidification together with the plate 302, whereby the plate 302 and the plate 303 are welded and integrated.

In FIG. 46A, a region indicated by arrows in ① shows a portion of the plate 303 integrated by the FSW welding, and a region indicated by arrows in ② shows a portion of the plate 303 before being integrated by welding. ③ shows a portion of the plates 302 and 303 fused and solidified as a result of the FSW method.

Figure 47A:
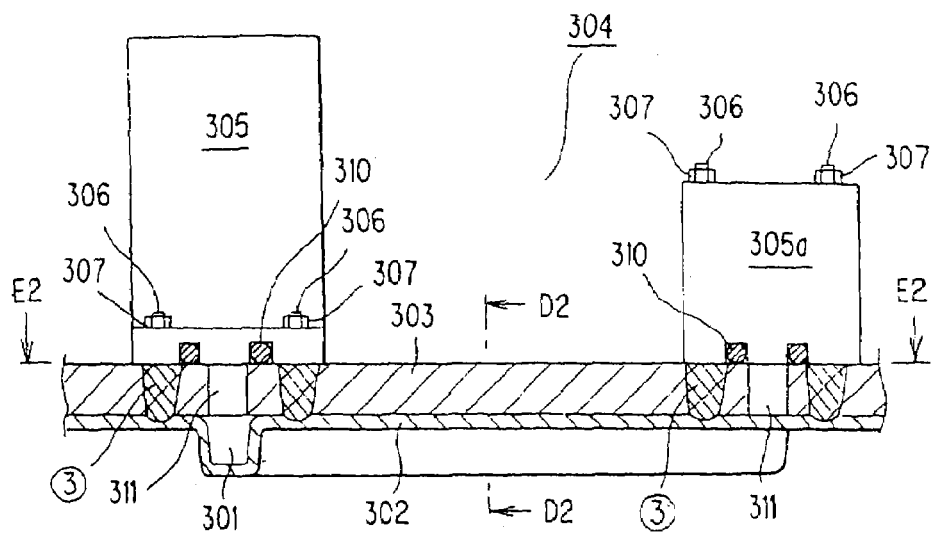
FIG. 47A is a side view of the integrated piping plate representing an embodiment of the integrated piping plate according to the present invention.
Figure 47B:
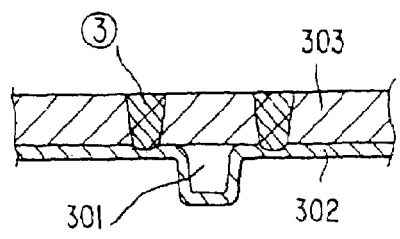
FIG. 47B is a sectional view taken on line D2-D2 of FIG. 47A.
Figure 47C:
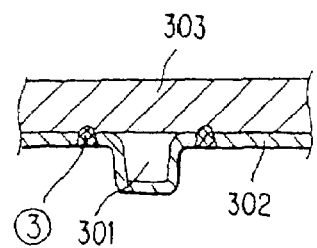
FIG. 47C is a sectional view taken on line D2-D2 of FIG. 47A.

As shown in FIG. 47C to be described later on, joining may be performed by the FSW method applied in the plate 302.

FIGS. 47A, 47B, 47C and 47D show an example of an integrated piping plate according to the present invention.

FIG. 47A shows a side view of an integrated piping plate 304, which comprises a plate 302 and a plate 303 joined by FSW welding. A bracket of an instrument 305 and a component 305a itself located on the plate 303 are fixed by stud bolts 306 implanted in the plate 303 and nuts 307 via sealing materials 310, such as O rings. The instrument 305 and component 305a fixed on the plate 303 communicate with each other by a groove 301 having a suitable sectional area through communication holes 311, thus being capable of flowing a high temperature, high pressure fluid.

Figure 47D:
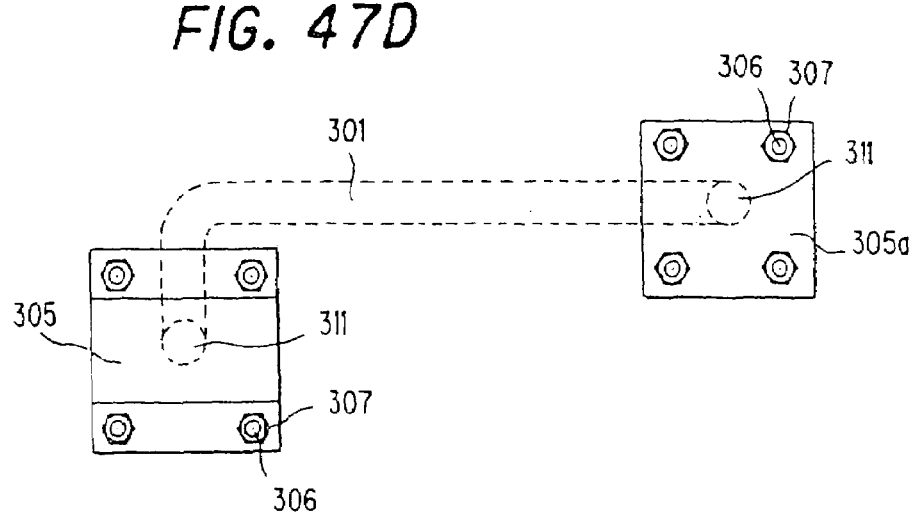
FIG. 47D is a view taken on line E2-E2 of FIG. 47A.

FIG. 47B shows joining by FSW welding to the plate 302 applied from the plate 303, while FIG. 47C shows joining by FSW welding to the plate 303 applied from the plate 302. Since FSW welding does not require a groove for a weld groove, the degree of freedom during machining is high as shown in these drawings. FIG. 47D shows, in a plan view, that the instrument 305 and the component 305a are connected by the groove 301 through the communication holes 311.

FIGS. 48A and 48B show an example of an integrated piping plate in a three-dimensional configuration.

FIG. 48A is a side view of an example of the integrated piping plate according to the present invention constituted in a three-dimensional configuration. Two integrated piping plates 304 and 304' are mounted to each other in a vertically opposed manner, and end portions of plates 302 and 302' are sealed by bolts 312 and nuts 313 via sealing materials to constitute the three-dimensional integrated piping plate. Not only are the integrated piping plates made three-dimensional in a vertically opposed manner as in the present structure, but can the integrated piping plates be located, for example, in a perpendicular relationship to form the three-dimensional integrated piping plate. By so doing, the space can be used without waste, thus resulting in a very compact configuration. Furthermore, a refrigerant, such as air, is flowed through a space Q formed by the plates 302 and 302' of the upper and lower integrated piping plates 304 and 304', whereby a high temperature fluid flowing through a groove 301 can be cooled. In this case, the plates 302, 302' do not have an excess portion acting as a heat storage portion, because the plates 302, 302' are shaped by press working or precision casting. Moreover, the surface area for the refrigerant is so wide that cooling can take plate with high efficiency.

Joining of the opposed plates 302 and 302' of the integrated piping plates 304 and 304' may be performed by the FSW method as shown in FIG. 48B, as well as by the use of the bolts 312 and nuts 313.

Next, a fuel cell power generation system will be described as an example of application of the integrated piping plate for use in a fixed unit incorporating piping and wiring into an apparatus, and a transportable integrated unit.

FIG. 49 shows an example of a system diagram of an ordinary fuel cell power generation system. As shown in FIG. 49, a liquid fuel 441a, such as methanol, is vaporized by a carburetor 442 with the use of waste heat or the like of a reformer 449, and heated by a heat exchanger 443. Then, the vapor is introduced into a desulfurization device 444 together with part of a hydrogen-rich gas from a CO converter 446 to have its sulfur content removed. A gaseous fuel 441b, such as natural gas, on the other hand, bypasses the carburetor 442, and is directly supplied to the heat exchanger 443. If a fuel with a low sulfur content is used, the desulfurization device 444 may be omitted.

The fuel gas, which has been desulfurized, is heated by a heat exchanger 448 together with steam 447 generated by a steam separator 445, and is then fed to the reformer 449. In the reformer 449, the fuel gas is reformed to generate a reformed gas rich in hydrogen. The reformed gas from the reformer 449 is cooled by a heat exchanger 450, and then carbon monoxide in the reformed gas is converted to carbon dioxide in the CO converter 446.

The reformed gas from the CO converter 446 is further cooled by a heat exchanger 451, and then introduced into a condenser 452, where unreacted steam is removed by condensation. Condensate separated from the condenser 452 is sent to the steam separator 445, and fed again as steam 447 to the reformer 449. The reformed gas departing from the condenser 452 is heated by a heat exchanger 453, and then fed to a fuel cell body 454, where hydrogen in the reformed gas is used for a cell reaction.

Air 458 supplied as an oxidizing agent is heated in a heat exchanger 459, and introduced into the fuel cell body 454, where oxygen in the air 458 is used in the cell reaction.

An exhaust gas from the fuel cell body 454 is heated in a heat exchanger 460, and brought into a condenser 461, where water formed is removed upon condensation, and discharged to the outside of the system. The resulting water is also fed to the steam separator 445, where it is used as steam 447. Since the cell reaction in the fuel cell body 454 is an exothermic reaction, the fuel cell body 454 and peripheral devices are generally provided with a cooling device 462 using water or air as a refrigerant.

Another exhaust gas containing unreacted hydrogen from the fuel cell body 454 passes through a splitting machine 472, and is used, together with external air 468, as a heating fuel 467 for the reformer 449 performing an endothermic reaction. The remaining exhaust gas is treated with a burner 473, and then discharged. If the heating fuel 467 is insufficient at this time, part of an outlet gas from the desulfurization device 444 is used as an auxiliary fuel 476. A combustion exhaust gas from the reformer 449 is partly used as a heat source for the carburetor 442. The remainder is cooled in a heat exchanger 474, then fed to a condenser 475, and released into the atmosphere after separation of the resulting water. The resulting water is returned to the steam separator 445.

Next, an outline of control in the fuel cell power generation system will be described. First, the flow rate of the reformed gas to be fed to the fuel cell body 454 is controlled by detecting a load current to a load 466 by an ammeter I, sending its signals to a control device 469, and opening or closing a flow control valve 470a or 470b based on signals from the control device 469. The amount of supply of steam 447 necessary for reforming of the fuel gas is controlled by detecting the flow rate of the fuel gas by a flow meter 477, and opening or closing a steam flow control valve 471 based on signals from the control device 469. The temperature inside the reformer 449 is constantly monitored by a temperature sensor T, and controlled by flow control valves 470a, 470b for fuels 441a, 441b.

As described above, various instruments, components, wiring and control instruments are disposed in the fuel cell power generation system. Large piping and small piping are provided complicatedly so that fluids or gases with various properties, temperatures and pressures flow among these devices. Particularly in a transportable, integrated system for loading on a vehicle, efforts have been made to arrange numerous instruments and pipe lines at a high density in a narrow space for downsizing. The integrated piping plate is applied as means for this purpose. In fuel supply facilities of the fuel cell power generation system shown in FIG. 49, piping for fuel supply is the groove 301 in the plate 302, and the flow control valves 470a, 470b and flow meter 477 for flow rate control are disposed on the plate 303. These measures can result in an integrated piping plate for controlling the flow rate of fuel flowing through the groove 301.

In the above examples, the fuel cell power generation system has been illustrated. However, the present invention can be applied not only to an integrated piping plate for use in the fuel cell power generation system, but also to an integrated piping plate for use in various apparatuses.

While the present invention has been described by the present embodiment, it is to be understood that the invention is not limited thereto, but may be varied in many other ways. Such variations are not to be regarded as a departure from the spirit and scope of the invention, and all such modifications as would be obvious to one skilled in the art are intended to be included within the scope of the appended claims.

What is claimed is:

1. An integrated piping plate composed of two or more plates joined together, each plate having a back surface and an opposite joining surface, and in which at least two of an instrument and a component constituting an apparatus are disposed on one of surfaces of the integrated piping plate, grooves for serving as channels for fluids are formed in a joining surface of a said plate, and the at least two of the instrument and the component are connected, by the grooves, wherein a plurality of the integrated piping plates are provided, and the plurality of the integrated piping plates are integrally fixed, with the back surfaces of the plurality of the integrated piping plates being superposed, to constitute a three-dimensional module, a plurality of spaced separators are disposed along and interposed between the back surfaces of the plurality of the integrated piping plates to constitute a heat insulating three-dimensional module, and a heat insulator is interposed between at least one of the plurality of spaced separators and at least one of the back surfaces of the plurality of the integrated piping plates.

* * * * *